(12) United States Patent
Luzzato et al.

(10) Patent No.: US 11,565,506 B2
(45) Date of Patent: Jan. 31, 2023

(54) THERMOFORMED COVER GLASS FOR AN ELECTRONIC DEVICE

(71) Applicant: Apple Inc., Cupertino, CA (US)

(72) Inventors: Victor Luzzato, Santa Clara, CA (US); Christopher D. Prest, San Francisco, CA (US); Matthew S. Rogers, San Jose, CA (US); Dale N. Memering, Langhorne, PA (US); Christopher C. Bartlow, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 1073 days.

(21) Appl. No.: 16/143,309

(22) Filed: Sep. 26, 2018

(65) Prior Publication Data

US 2019/0022979 A1    Jan. 24, 2019

Related U.S. Application Data

(63) Continuation-in-part of application No. 15/676,860, filed on Aug. 14, 2017.
(Continued)

(51) Int. Cl.
*B32B 15/04* (2006.01)
*B32B 17/06* (2006.01)
(Continued)

(52) U.S. Cl.
CPC .............. *B32B 17/06* (2013.01); *B32B 7/12* (2013.01); *C03B 23/0302* (2013.01); *C03B 23/203* (2013.01); *C03C 17/225* (2013.01); *C03C 17/23* (2013.01); *C03C 21/002* (2013.01); *B32B 2255/20* (2013.01); *B32B 2307/536* (2013.01); *B32B 2307/584* (2013.01);
(Continued)

(58) Field of Classification Search
CPC ..................................................... C03C 21/002
USPC ......................................... 428/410, 426, 428
See application file for complete search history.

(56) References Cited

U.S. PATENT DOCUMENTS 2,795,084 A    6/1957  Littleton
3,410,673 A   11/1968  Marusak
(Continued)

FOREIGN PATENT DOCUMENTS

CN        101475300       7/2009
CN        103986803       8/2013
(Continued)

OTHER PUBLICATIONS

Moriceau et al., "Overview of recent direct wafer bonding advances and applications," Advances in Natural Sciences: Nanoscience and Nanotechnology, vol. 1, No. 043004, 11 pages, 2010.
(Continued)

*Primary Examiner* — Lauren R Colgan
(74) *Attorney, Agent, or Firm* — Brownstein Hyatt Farber Schreck, LLP

(57) ABSTRACT

Glass articles and methods for producing glass articles for a portable electronic device are disclosed. Properties of the glass articles, such as cover members, are improved through chemical strengthening, thermoforming, or a combination thereof. The glass articles may include barrier layers to prevent diffusion of ions between glass layers of the glass article, internal compressive stress regions, or a combination thereof.

14 Claims, 40 Drawing Sheets

Related U.S. Application Data

(60) Provisional application No. 62/648,615, filed on Mar. 27, 2018, provisional application No. 62/398,627, filed on Sep. 23, 2016, provisional application No. 62/398,616, filed on Sep. 23, 2016, provisional application No. 62/398,611, filed on Sep. 23, 2016.

(51) Int. Cl.

| | | |
|---|---|---|
| *B32B 7/12* | (2006.01) | |
| *C03B 23/03* | (2006.01) | |
| *C03C 17/23* | (2006.01) | |
| *C03C 21/00* | (2006.01) | |
| *C03C 17/22* | (2006.01) | |
| *C03B 23/203* | (2006.01) | |
| *C03C 27/10* | (2006.01) | |
| *C03C 19/00* | (2006.01) | |

(52) U.S. Cl.
CPC .......... *B32B 2457/20* (2013.01); *C03C 19/00* (2013.01); *C03C 27/10* (2013.01); *C03C 2217/213* (2013.01); *C03C 2217/22* (2013.01); *C03C 2217/228* (2013.01); *C03C 2217/281* (2013.01)

(56) References Cited

U.S. PATENT DOCUMENTS

| | | |
|---|---|---|
| 3,433,611 A | 3/1969 | Kubican |
| 3,464,880 A | 9/1969 | Rinehart |
| 3,737,294 A | 6/1973 | Dumbaugh, Jr. et al. |
| 3,746,526 A | 7/1973 | Giffon |
| 3,899,315 A | 8/1975 | Siegmund |
| 4,054,895 A | 10/1977 | Ham et al. |
| 4,070,211 A | 1/1978 | Haran et al. |
| 4,209,229 A | 6/1980 | Rittler |
| 4,339,300 A | 7/1982 | Noble et al. |
| 4,735,917 A | 4/1988 | Flatley et al. |
| 4,849,299 A | 7/1989 | Loth et al. |
| 5,122,177 A | 6/1992 | Yoshizama et al. |
| 5,173,453 A | 12/1992 | Beall et al. |
| 5,273,553 A | 12/1993 | Hoshi et al. |
| 6,055,053 A | 4/2000 | Lesniak |
| 6,067,005 A | 5/2000 | DeVolpi |
| 6,169,256 B1 | 1/2001 | Hanahara |
| 6,406,769 B1 | 6/2002 | Delabre et al. |
| 6,809,278 B2 | 10/2004 | Tsubaki |
| 6,928,224 B2 | 8/2005 | Beall et al. |
| 7,115,827 B2 | 10/2006 | Tseng |
| 7,240,519 B2 | 7/2007 | Schwartz et al. |
| 7,459,199 B2 | 12/2008 | Skeen |
| 7,497,093 B2 | 3/2009 | Rosenflanz |
| 7,507,918 B2 | 3/2009 | Kazama |
| 7,799,158 B2 | 9/2010 | Yokoyama et al. |
| 7,902,474 B2 | 3/2011 | Mittleman |
| 7,915,556 B2 | 3/2011 | Ou |
| 7,966,785 B2 | 6/2011 | Zadesky et al. |
| 8,003,217 B2 | 8/2011 | Rosenflanz |
| 8,050,019 B2 | 11/2011 | Wennemer |
| 8,092,737 B2 | 1/2012 | Chang et al. |
| 8,212,455 B2 | 7/2012 | Yura et al. |
| 8,277,704 B2 | 10/2012 | Matsushima et al. |
| 8,379,159 B2 | 2/2013 | Hsu |
| 8,431,849 B2 | 4/2013 | Chen |
| 8,446,264 B2 | 5/2013 | Tanase |
| 8,665,160 B2 | 3/2014 | Uttermann et al. |
| 8,717,513 B2 | 5/2014 | Park et al. |
| 8,783,065 B2 | 7/2014 | Schillert et al. |
| 8,840,997 B2 | 9/2014 | Koyama et al. |
| 8,898,824 B2 | 12/2014 | Neidich et al. |
| 9,001,503 B1 | 4/2015 | Hibino |
| 9,030,440 B2 | 5/2015 | Pope |
| 9,069,198 B2 | 6/2015 | Kim et al. |
| 9,125,298 B2 | 9/2015 | Russell-Clarke |
| 9,134,547 B2 | 9/2015 | McCabe et al. |
| 9,140,522 B1 | 9/2015 | Miller et al. |
| 9,154,678 B2 | 10/2015 | Kwong et al. |
| 9,193,625 B2 | 11/2015 | Bookbinder et al. |
| 9,232,672 B2 | 1/2016 | Kwong |
| 9,242,889 B2 | 1/2016 | Yamakaji et al. |
| 9,249,045 B2 | 2/2016 | Gabel et al. |
| 9,263,209 B2 | 2/2016 | Chen |
| 9,302,937 B2 | 4/2016 | Gulati et al. |
| 9,321,677 B2 | 4/2016 | Chang et al. |
| 9,359,251 B2 | 6/2016 | Bookbinder et al. |
| 9,375,900 B2 | 6/2016 | Tsuchiya et al. |
| 9,390,930 B2 | 7/2016 | Rogers et al. |
| 9,392,706 B2 | 7/2016 | Yoo et al. |
| 9,429,997 B2 | 8/2016 | Myers et al. |
| 9,474,174 B2 | 10/2016 | Motohashi |
| 9,516,149 B2 | 12/2016 | Wright et al. |
| 9,522,836 B2 | 12/2016 | Gulati et al. |
| 9,524,413 B2 | 12/2016 | Kim |
| 9,632,537 B2 | 4/2017 | Memering et al. |
| 9,674,322 B2 | 6/2017 | Motohashi et al. |
| 9,678,540 B2 | 6/2017 | Memering et al. |
| 9,697,409 B2 | 7/2017 | Myers |
| 9,718,727 B2 | 8/2017 | Bookbinder et al. |
| 9,728,349 B2 | 8/2017 | Huang |
| 9,840,435 B2 | 12/2017 | Ohara et al. |
| 9,846,473 B1 | 12/2017 | Kalscheur et al. |
| 9,870,880 B2 | 1/2018 | Zercoe |
| 9,890,074 B2 | 2/2018 | Liu |
| 9,897,574 B2 | 2/2018 | Roussev et al. |
| 9,902,138 B2 | 2/2018 | Edwards |
| 9,902,641 B2 | 2/2018 | Hall et al. |
| 9,941,074 B2 | 4/2018 | Tu |
| 9,946,302 B2 | 4/2018 | Franklin et al. |
| 10,133,156 B2 | 11/2018 | Pilliod et al. |
| 10,141,133 B2 | 11/2018 | Bae |
| 10,146,982 B2 | 12/2018 | Hsu |
| 10,189,228 B2 | 1/2019 | Couillard et al. |
| 10,286,631 B2 | 5/2019 | Alder et al. |
| 10,318,783 B2 | 6/2019 | Kang |
| 10,324,496 B2 | 6/2019 | Kwong et al. |
| 10,357,945 B2 | 7/2019 | Beall et al. |
| 10,425,994 B2 | 9/2019 | Weiss et al. |
| 10,494,860 B1 | 12/2019 | Jones et al. |
| 10,694,010 B2 | 6/2020 | Jones et al. |
| 10,702,211 B2 | 7/2020 | Clavelle et al. |
| 10,800,141 B2 | 10/2020 | Bartlow et al. |
| 10,827,635 B1 | 11/2020 | Limarga et al. |
| 10,875,277 B2 | 12/2020 | Aoki et al. |
| 10,917,505 B2 | 2/2021 | Jones et al. |
| 10,919,270 B2 | 2/2021 | Oh et al. |
| 11,192,823 B2 | 12/2021 | Li et al. |
| 11,199,929 B2 | 12/2021 | Poole et al. |
| 2003/0040346 A1 | 2/2003 | Fukuda et al. |
| 2003/0062490 A1 | 4/2003 | Fujieda |
| 2004/0003627 A1 | 1/2004 | Hashima |
| 2004/0041504 A1 | 3/2004 | Ozolins |
| 2004/0105026 A1 | 6/2004 | Campbell et al. |
| 2005/0135724 A1 | 6/2005 | Helvajian |
| 2005/0176506 A1 | 8/2005 | Goto |
| 2008/0049980 A1 | 2/2008 | Castaneda |
| 2009/0040737 A1 | 2/2009 | Shimura |
| 2010/0013786 A1 | 1/2010 | Nishikawa et al. |
| 2010/0108486 A1 | 5/2010 | Yoshida |
| 2010/0127420 A1 | 5/2010 | Dannoux |
| 2010/0148996 A1 | 6/2010 | Wang |
| 2010/0263708 A1 | 10/2010 | Reichart et al. |
| 2010/0279068 A1 | 11/2010 | Cook et al. |
| 2010/0285310 A1 | 11/2010 | Izutani et al. |
| 2010/0330814 A1 | 12/2010 | Yokota |
| 2011/0038115 A1 | 2/2011 | Halkosaari |
| 2011/0041987 A1 | 2/2011 | Hori et al. |
| 2011/0177300 A1 | 7/2011 | Hankey et al. |
| 2011/0253520 A1 | 10/2011 | Lim |
| 2012/0052271 A1 | 3/2012 | Gomez et al. |
| 2012/0176760 A1 | 7/2012 | Cohen et al. |
| 2012/0206669 A1 | 8/2012 | Kim |
| 2012/0236526 A1 | 9/2012 | Weber |
| 2012/0250273 A1 | 10/2012 | Kuo |
| 2012/0327325 A1 | 12/2012 | Park et al. |

(56) References Cited

U.S. PATENT DOCUMENTS

| | | |
|---|---|---|
| 2013/0128434 A1 | 5/2013 | Yamamoto et al. |
| 2013/0236699 A1 | 9/2013 | Prest et al. |
| 2014/0093702 A1 | 4/2014 | Kitajima |
| 2014/0116090 A1 | 5/2014 | Lee et al. |
| 2014/0151320 A1 | 6/2014 | Chang et al. |
| 2014/0272298 A1 | 9/2014 | Memering et al. |
| 2014/0285956 A1 | 9/2014 | Russell-Clarke et al. |
| 2014/0311882 A1 | 10/2014 | Terashita |
| 2015/0002993 A1 | 1/2015 | Lee |
| 2015/0030834 A1 | 1/2015 | Morey et al. |
| 2015/0030859 A1 | 1/2015 | Rogers et al. |
| 2015/0044445 A1 | 2/2015 | Garner et al. |
| 2015/0077830 A1 | 3/2015 | Lin et al. |
| 2015/0093581 A1 | 4/2015 | Murata et al. |
| 2015/0104618 A1 | 4/2015 | Hayashi et al. |
| 2015/0122406 A1 | 5/2015 | Fisher et al. |
| 2015/0163382 A1 | 6/2015 | Kwong et al. |
| 2015/0165548 A1 | 6/2015 | Marjanovic et al. |
| 2015/0202854 A1 | 7/2015 | Tsuchiya et al. |
| 2015/0212247 A1 | 7/2015 | Borrelli et al. |
| 2015/0232366 A1 | 8/2015 | Fredholm et al. |
| 2015/0241732 A1 | 8/2015 | Kim et al. |
| 2015/0245514 A1 | 8/2015 | Choung |
| 2015/0274572 A1 | 10/2015 | Wada et al. |
| 2015/0299036 A1 | 10/2015 | Ukrainczyk et al. |
| 2015/0376057 A1* | 12/2015 | Koch, III ................. G02B 1/10 428/336 |
| 2016/0028931 A1 | 1/2016 | Kwong et al. |
| 2016/0083282 A1 | 3/2016 | Jouanno et al. |
| 2016/0137550 A1 | 5/2016 | Murata et al. |
| 2016/0224142 A1 | 8/2016 | Yang et al. |
| 2016/0270247 A1 | 9/2016 | Jones et al. |
| 2016/0357294 A1 | 12/2016 | Czeki et al. |
| 2016/0377768 A1 | 12/2016 | Wilson et al. |
| 2017/0059749 A1 | 3/2017 | Wakatsuki et al. |
| 2017/0066223 A1 | 3/2017 | Notsu et al. |
| 2017/0282503 A1* | 10/2017 | Peng .................. C03B 17/064 |
| 2017/0300114 A1 | 10/2017 | Matsuyuki et al. |
| 2017/0305788 A1* | 10/2017 | Nikulin ................ C03B 17/064 |
| 2017/0311466 A1 | 10/2017 | Memering et al. |
| 2017/0334770 A1* | 11/2017 | Luzzato ................ C03C 17/001 |
| 2017/0340518 A1 | 11/2017 | Logunov et al. |
| 2017/0355633 A1 | 12/2017 | Cook et al. |
| 2017/0364172 A1 | 12/2017 | Kim et al. |
| 2018/0009697 A1 | 1/2018 | He et al. |
| 2018/0024274 A1 | 1/2018 | Rogers et al. |
| 2018/0067212 A1 | 3/2018 | Wilson et al. |
| 2018/0086026 A1 | 3/2018 | Nguyen et al. |
| 2018/0086663 A1* | 3/2018 | Luzzato .................. B32B 17/06 |
| 2018/0088399 A1 | 3/2018 | Fukushi et al. |
| 2018/0125756 A1 | 5/2018 | Gerrish et al. |
| 2018/0126704 A1 | 5/2018 | Zhang et al. |
| 2018/0134606 A1 | 5/2018 | Wagner et al. |
| 2018/0154615 A1 | 6/2018 | Dohn et al. |
| 2018/0237325 A1 | 8/2018 | Li et al. |
| 2018/0282207 A1 | 10/2018 | Fujii et al. |
| 2018/0304588 A1 | 10/2018 | Harris et al. |
| 2018/0304825 A1 | 10/2018 | Mattelet et al. |
| 2018/0326704 A1 | 11/2018 | Harris et al. |
| 2018/0370843 A1 | 12/2018 | Gross et al. |
| 2019/0022979 A1* | 1/2019 | Luzzato .................. B32B 17/06 |
| 2019/0023611 A1* | 1/2019 | Luzzato ................ C03C 21/002 |
| 2019/0030861 A1 | 1/2019 | Bellman et al. |
| 2019/0033144 A1 | 1/2019 | Andrews et al. |
| 2019/0037690 A1 | 1/2019 | Wilson et al. |
| 2019/0134944 A1 | 5/2019 | Dawson-Elli |
| 2019/0160787 A1 | 5/2019 | Bartlow et al. |
| 2019/0161402 A1 | 5/2019 | Harris et al. |
| 2019/0169061 A1 | 6/2019 | Jones et al. |
| 2019/0177215 A1 | 6/2019 | Jin et al. |
| 2019/0219463 A1 | 7/2019 | Orihara et al. |
| 2019/0263708 A1 | 8/2019 | Bookbinder et al. |
| 2019/0293838 A1 | 9/2019 | Haba et al. |
| 2020/0014780 A1 | 1/2020 | Jones et al. |
| 2020/0039186 A1 | 2/2020 | Yuan et al. |
| 2020/0055281 A1 | 2/2020 | Yoon et al. |
| 2020/0095159 A1 | 3/2020 | Marshall et al. |
| 2020/0301527 A1 | 9/2020 | Poole et al. |
| 2020/0323440 A1 | 10/2020 | Vule et al. |
| 2020/0339472 A1 | 10/2020 | Yoon et al. |
| 2020/0346525 A1 | 11/2020 | Mannheim Astete et al. |
| 2020/0369560 A1 | 11/2020 | Takeda et al. |
| 2020/0407266 A1 | 12/2020 | Suzuki et al. |
| 2021/0009469 A1 | 1/2021 | Marshall et al. |
| 2021/0014992 A1 | 1/2021 | Limarga et al. |
| 2021/0016547 A1 | 1/2021 | Bartlow et al. |
| 2021/0033757 A1 | 2/2021 | Wilson et al. |
| 2021/0072789 A1 | 3/2021 | Rogers et al. |
| 2021/0303031 A1 | 9/2021 | Poole et al. |
| 2021/0361233 A1 | 11/2021 | Wilson et al. |
| 2022/0009823 A1 | 1/2022 | Dejneka et al. |
| 2022/0117094 A1 | 4/2022 | Prest et al. |

FOREIGN PATENT DOCUMENTS

| | | |
|---|---|---|
| CN | 104837781 | 8/2015 |
| CN | 105765722 | 7/2016 |
| CN | 106007345 | 10/2016 |
| CN | 106341962 | 1/2017 |
| CN | 106485275 | 3/2017 |
| CN | 108017263 | 5/2018 |
| CN | 108285263 | 7/2018 |
| CN | 108545917 | 9/2018 |
| CN | 108600419 | 9/2018 |
| CN | 108632510 | 10/2018 |
| CN | 110857865 | 3/2020 |
| CN | 215010334 | 12/2021 |
| DE | 102016107630 | 10/2017 |
| JP | S6042176 | 9/1985 |
| JP | S6271215 | 5/1987 |
| JP | H03122036 | 5/1991 |
| TW | 201912602 | 4/2019 |
| WO | WO2010/077845 | 7/2010 |
| WO | WO2012/027660 | 3/2012 |
| WO | WO2012/074983 | 6/2012 |
| WO | WO2014/022356 | 2/2014 |
| WO | WO2014/022681 | 2/2014 |
| WO | WO2015/031420 | 3/2015 |
| WO | WO2015/095089 | 6/2015 |
| WO | WO2016/065118 | 4/2016 |
| WO | WO2017/196800 | 11/2017 |
| WO | WO2019/199791 | 10/2019 |
| WO | WO2019213364 | 11/2019 |

OTHER PUBLICATIONS

Decourcelle, et al., "Controlling Anisotropy," Conference Proceedings, All Eyes on Glass, Glass Performance Days, Tampere, Finland, Jun. 28-30, 2017.

Mao et al., "Fabrication and characterization of 20 nm planar nanofluidic channels by glass—glass and glass—silicon bonding," www.rsc.org/loc, 8 pages, Jun. 30, 2005.

Ungaro et al., "Using phase-corrected Bessel beams to cut glass substrates with a chamfered edge," Applied Optics, vol. 60, No. 3, p. 714, Dec. 10, 2020.

Aben et al., "A New Method for Tempering Stress Measurement in Glass Panels," Estonian Journal of Engineering, vol. 19, No. 4, pp. 292-297, 2013.

Bourhis, "Production Control of Residual Stresses," Glass Mechanics and Technology, Second Edition, pp. 236-243, 2014.

Dudutis et al., Bessel beam asymmetry control for glass dicing applications, Procedia CIRP 74, pp. 333-338, 2018.

Gottmann et al., "Microcutting and Hollow 3D Microstructures in Glasses by In-Volume Selective Laser-induced Etching," Journal of Laser Micro / Nanoengineering, vol. 8, No. 1, pp. 15-18, Jan. 2013.

Jenne et al., "High-quality Tailored-edge Cleaving Using Aberration-corrected Bessel-like Beams," arXiv:2010.10226v1 [physics. optics], May 8, 2018.

(56) References Cited

OTHER PUBLICATIONS

Author Unknown, "Handbook for Interior Designers," 3 pages, 1998.

\* cited by examiner

THERMOFORMED COVER GLASS FOR AN ELECTRONIC DEVICE

CROSS-REFERENCE TO RELATED APPLICATIONS

This application claims the benefit of U.S. Provisional Patent Application No. 62/648,615, filed on Mar. 27, 2018 and titled "Thermoformed Cover Glass for an Electronic Device" and this application is a continuation-in-part patent application of U.S. patent application Ser. No. 15/676,860, filed Aug. 14, 2017 and titled "Thermoformed Cover Glass for an Electronic Device," which claims the benefit of U.S. Provisional Patent Application No. 62/398,611, filed on Sep. 23, 2016 and titled "Thermoformed Cover Glass for an Electronic Device," U.S. Provisional Patent Application No. 62/398,616, filed on Sep. 23, 2016 and titled "Thermoformed Cover Glass for an Electronic Device," and U.S. Provisional Patent Application No. 62/398,627, filed on Sep. 23, 2016 and titled "Thermoformed Cover Glass for an Electronic Device," the disclosures of which are hereby incorporated by reference herein in their entireties.

FIELD

The described embodiments relate generally to glass articles. More particularly, the present embodiments relate to glass articles with improved performance attributes obtained through chemical strengthening and thermoforming, alone or in combination.

BACKGROUND

The cover sheet for a small form factor device, like a handheld electronic device, is typically made of polished glass. While polished glass is readily available and relatively inexpensive, it may be susceptible to damage due to an impact or fall. Additionally, glass sheets are typically flat, which may limit the form factor or shape of the electronic device. In some aspects, the articles, systems, and techniques described herein are directed to glass articles that have been strengthened in conjunction with a thermoforming process used to provide a contoured or curved shape.

SUMMARY

In embodiments described herein, properties of glass articles, such as glass cover members, are improved through chemical strengthening, thermoforming, or a combination thereof. Chemical strengthening through ion exchange can form one or more compressive stress regions or layers in the glass article, thereby improving the crack resistance of the cover member. The glass article may have a contoured or curved shape obtained through thermoforming. Thermoforming of the glass article can also improve various properties of the glass article such as hardness, strength, scratch resistance, crack resistance, tactile feel, superhydrophobicity, and elasticity.

In aspects of the disclosure, a glass article comprises multiple glass layers and a barrier layer between at least two of the glass layers (i.e., an internal barrier layer). The barrier layer limits diffusion of ions, such as alkali metal ions, between adjacent glass layers. Glass sheets may be thermoformed together with the barrier layer to form the glass article. The barrier layer may be thin relative to the glass layers. For example, the barrier layer may have a thickness of from about 20 nm to about 200 nm. Further, the barrier layer may comprise an inorganic material such as silicon nitride or silicon dioxide.

In embodiments, a cover member comprises a first glass layer, a second glass layer, and a barrier layer between the first glass layer and the second glass layer. The first glass layer may define an outer surface and the second glass layer may define an inner surface of the cover member. The inner surface may be generally opposite the outer surface. The first glass layer may comprise a first glass and the second glass layer may comprise a second glass.

In further embodiments, the first glass layer comprises a first set of alkali metal ions introduced via ion exchange and a compressive stress region formed, at least in part, due to the ion exchange. The compressive stress region may extend inward from the outer surface of the cover member. In various aspects described herein, the ion exchange operation may occur prior to thermoforming, during thermoforming, following thermoforming, or combinations thereof.

In additional embodiments, the second glass layer comprises a second set of alkali metal ions introduced via ion exchange and a second compressive stress region formed, at least in part, due to the ion exchange. The second compressive stress region may extend inward from the inner surface of the cover member. The cover member further comprises a tensile stress region between the first compressive stress region and the second compressive stress region.

In embodiments, the barrier layer is positioned between the first glass layer and the tensile stress region and configured to impede diffusion of the first set of alkali metal ions into the tensile stress region. The distribution of the first set of alkali metal ions may be more uniform in the presence of the barrier layer than in the absence of the barrier layer. Therefore, the compressive stress region in the first glass layer may be more uniform in the presence of the barrier layer than in the absence of the barrier layer. In embodiments, a profile of stress through a thickness of the cover member shows an abrupt transition (e.g., a step transition or step change) between compressive stress and tensile stress at the position of the barrier layer.

As an example, the barrier layer is positioned adjacent the first glass layer and the second glass layer. The second glass layer includes the tensile stress region, which is positioned between the second compressive stress region and the barrier layer. The second compressive stress region extends inward from the inner surface to a depth less than a thickness of the second glass layer.

An example cover member for an electronic device comprises a first glass layer defining an outer surface of the cover member, comprising a first set of alkali metal ions, and including a first compressive stress region extending inward from the outer surface. The cover member further comprises a second glass layer defining an inner surface of the cover member, comprising a second set of alkali metal ions, and including a second compressive stress region extending inward from the inner surface. In addition, the cover member comprises a tensile stress region between the first compressive stress region and the second compressive stress region and a barrier layer between the first glass layer and the tensile stress region and configured to impede diffusion of the first set of alkali metal ions into the tensile stress region.

As an additional example, the glass article further comprises a third glass layer positioned between the first glass layer and the second glass layer. The barrier layer may be positioned adjacent the first glass layer and the third glass layer, so that the third glass layer is positioned between the barrier layer and the second glass layer. In this case the third glass layer, rather than the second layer, includes the tensile stress region. In some embodiments, the cover member further comprises a second barrier layer positioned between the second glass layer and the third glass layer and configured to impede diffusion of the second set of alkali metal ions into the tensile stress region.

In additional aspects of the disclosure, glass articles having one or more internal compressive stress regions are described. The presence of a residual internal compressive stress region in the glass article may strengthen the glass article against cracking. For example, an internal compressive stress region may inhibit crack propagation from the outer surface to the inner surface. In further aspects, the glass articles include both surface compressive stress regions and internal compressive stress regions, where each compressive stress region is separated from other compressive stress regions by a tensile stress region.

In embodiments, a glass article including an internal compressive stress region can be formed by chemically strengthening a glass sheet prior to thermoforming and then using barrier layers to limit or prevent diffusion of ions from the glass sheet during thermoforming. For example, the glass sheet may comprise a first set of alkali metal ions after ion exchange and the barrier layer may limit or prevent diffusion of the alkali metal ions from the sheet during thermoforming.

An example cover member comprises a first glass layer defining an outer surface of the cover member, a second glass layer defining an inner surface of the cover member, and a third glass layer between the first glass layer and the second glass layer and comprising an internal compressive stress region. In embodiments, the internal compressive stress region may be formed, at least in part, due to ion exchange. The cover member further comprises a first barrier layer between the first glass layer and the third glass layer and a second barrier layer between the second glass layer and the third glass layer.

In further embodiments, the first glass layer and the second glass layer each further comprise a surface compressive stress region formed, at least in part, due to ion exchange. As an example, the first glass layer further comprises a first surface compressive stress region extending inward from the outer surface of the cover member and a first tensile stress region extending inward from the first surface compressive stress region. Further, the second glass layer further comprises a second surface compressive stress region extending inward from the inner surface of the cover member and a second tensile stress region extending inward from the second surface compressive stress region.

In embodiments, each of the first glass layer, the second glass layer, and the third glass layer comprises an ion exchangeable glass. In further embodiments, each of the first, the second, and the third alkali glass layers comprises a set of alkali metal ions introduced during ion exchange. In an example, the first glass layer comprises a first alkali aluminosilicate glass, the second layer comprises a second alkali aluminosilicate glass, and the third glass layer comprises a third alkali aluminosilicate glass. The first barrier layer and the second barrier layer may be configured to limit diffusion of the alkali metal ions.

An example cover member comprises a first glass layer defining an outer surface of the cover member and comprising a first alkali aluminosilicate glass, a second glass layer defining an inner surface of the cover member and comprising a second alkali aluminosilicate glass, and a third glass layer between the first glass layer and the second glass layer, including an internal compressive stress region, and comprising a third alkali aluminosilicate glass. The cover member further comprises a first barrier layer between the first glass layer and the third glass layer and configured to limit diffusion of alkali metal ions and a second barrier layer between the second glass layer and the third glass layer and configured to limit diffusion of the alkali metal ions.

In additional embodiments, a glass article having one or more internal compressive stress regions is formed through ion exchange of a single piece of glass. In further embodiments, the glass article is formed of glass sheets which are thermoformed together without including a barrier layer as described herein. and then ion exchanged.

In embodiments, a glass article includes multiple internal compressive stress regions. As an example, a glass cover member includes an outer surface, an outer surface compressive stress region extending inward from the outer surface, a first tensile stress region extending inward from the outer surface compressive stress region, and a first internal compressive stress region extending inward from the first tensile stress region. The glass cover member further includes an inner surface opposite the outer surface, an inner surface compressive stress region extending inward from the inner surface, a second tensile stress region extending inward from the inner surface compressive stress region, a second internal compressive stress region extending inward from the second tensile stress region; and a third tensile stress region between the first internal compressive stress region and the second internal compressive stress region.

In further aspects, an electronic device is described having a housing, a display positioned within the housing, and a cover member positioned over the display. The cover member may be as described herein. By the way of example, the cover member has a contoured shape formed by the thermoforming process and a chemically strengthened layer due to ion exchange.

In still further aspects of the disclosure, a glass article is formed by preparing each of the glass layers from a separate glass sheet, adding a barrier coating or layer between at least two of the sheets, and thermoforming the glass sheets together. The resultant glass article is a unitary glass article. As previously discussed, the unitary glass article can include stepwise chemical strengthening due to the presence of the barrier layer.

In embodiments, a method for forming a glass article such as a cover member comprises positioning a first barrier layer between a first glass sheet and a second glass sheet, the first barrier layer configured to limit ion diffusion between the first glass sheet and the second glass sheet. For example, the first barrier layer may be applied to the first glass sheet or the second glass sheet and then the first sheet and the second sheet positioned so that the barrier layer is between the two sheets.

The method further comprises applying heat to the first glass sheet, applying heat to the second glass sheet, and applying pressure to the first glass sheet and the second glass sheet, thereby bonding the first glass sheet to the second glass sheet through the first barrier layer to form the glass cover member. When a second barrier layer is included, the method further includes positioning a second barrier layer between the second glass sheet and a third glass sheet, the second barrier layer configured to limit ion diffusion between the second glass sheet and the third glass sheet. For example, the second barrier layer may be applied to the second sheet or the third sheet. The method further comprises applying heat to the third glass sheet, and applying pressure to a the third glass sheet, thereby bonding the second glass sheet to the third glass sheet through the second barrier layer. The method may further comprise cooling the glass article. For example, the glass article may be cooled after the layers of the sheet are bonded together. The resulting glass article may be as described herein.

In embodiments where the glass article is ion exchanged after or during thermoforming, the method further comprises performing an ion exchange along a surface of the glass article. For example, the method may further comprise performing a first ion exchange along the outer surface, thereby producing a first compressive stress in the first glass layer. In addition, the method may comprise performing a second ion exchange along the inner surface, thereby producing a second compressive stress in the second glass layer.

In additional aspects, methods for forming a glass cover sheet for an electronic device includes, applying a property-enhancing material to a surface of a glass sheet, where the glass sheet has a mechanical property or characteristic. The contoured sheet may be chemically modified by addition of the property-enhancing material during the heating and pressure application steps such that the mechanical characteristic is altered.

BRIEF DESCRIPTION OF THE DRAWINGS

The disclosure will be readily understood by the following detailed description in conjunction with the accompanying drawings, wherein like reference numerals designate like structural elements, and in which.

Figure 1:
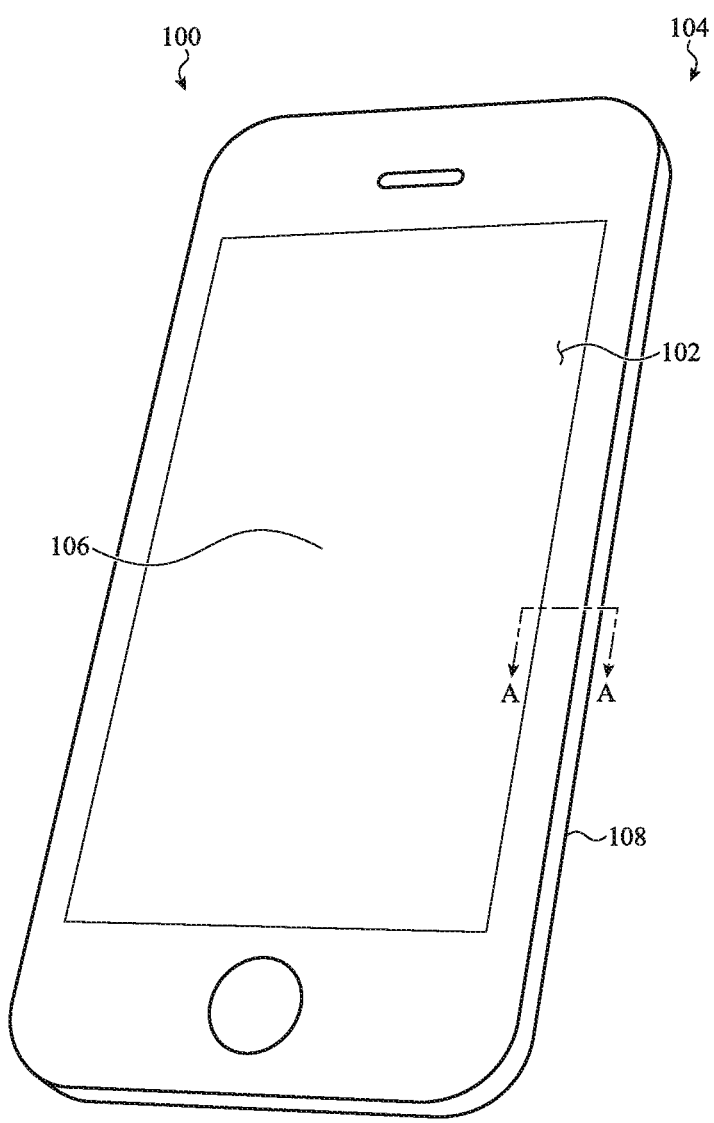
FIG. 1 shows an electronic device having a housing in accordance with embodiments herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

The following disclosure relates to glass articles, methods of producing glass articles, and to the utility of such glass articles in an electronic device. Embodiments also relate to an increase in the strength, hardness, and/or elasticity of glass, especially related to glass in an electronic device, as well as to the cosmetic feel or superhydrophobicity (a glass surface that is hydrophobic and prevents water retention) of glass in an electronic device. Methods of producing such glass articles relate to thermoforming glass to a desired contour or geometry while, at the same time, enhancing one or more of its mechanical characteristics or properties. For purposes herein, a mechanical characteristic or property refers to strength, hardness, elasticity, crack resistance, tactile feel, superhydrophobicity, and the like.

In embodiments, a cover member for an electronic devices comprises multiple zones. For example, a zone may be formed by a layer of glass which is thermoformed with one or more additional layers to form the glass cover member. Each of the layers of glass may have different material properties or some of the layers may have materials properties in common. For example, each of the zones may have a different ion diffusion properties. The cover member may comprise an outer surface and an inner surface, with the inner surface generally opposite the outer surface.

Aspects of the disclosure include thermoforming a glass sheet to a desired contoured shape and property attribute. Once heated and formed to the hold shape, the glass sheet is termed a contoured sheet. The glass sheet can have one or more mechanical characteristics. The mechanical characteristic is present in the glass sheet prior to the thermoforming processes described herein. Utilization of modified thermoforming processes alleviates the need for additional post processing treatments, particularly as these treatments relate to an electronic device. Modifications to the thermoforming process, thermoforming molds, and glass formed by thermoforming allows for a significant improvement in glass for a particular use, as well as to the methods for manufacturing the glass for a particular use. In this manner, the mechanical characteristic of the glass sheet is altered to an improved mechanical characteristic, for example, an improvement in glass strength, hardness, elasticity, texture, and the like.

In one example, the glass article may define an outer surface of an electronic device. The glass article may correspond to a cover member that helps form part of a display area, or, in some instances, be involved in forming part of the housing. In embodiments, a cover member may also be referred to herein as a cover sheet. A display may comprise a transparent window. As used herein, a glass article for an electronic device may include relatively small amounts of materials other than glass, such as barrier layers between layers of glass and ceramic particles embedded in a surface of a glass layer. Alternately, a glass article including relatively small amounts of materials other than a glass may be referred to as a glass-based article, a glass-based member, a glass-based cover sheet, etc.

The embodiments herein are particularly relevant for use in portable electronic devices and small form factor electronic devices, e.g., laptops, mobile phones, tablet computers, smart watches, media players, health-monitoring devices, remote control units, and the like. Typical glass articles herein are thin, typically less than 5 mm in thickness, and more typically less than 3 mm in thickness. In some aspects, the glass article can be from about 0.1 mm to 2 mm in thickness, and more typically from 0.15 mm to 1 mm in thickness.

These and other embodiments are discussed below with reference to FIGS. 1-33. However, those skilled in the art will readily appreciate that the detailed description given herein with respect to these Figures is for explanatory purposes only and should not be construed as limiting.

FIG. 1 illustrates one embodiment of a portable electronic device 100. The portable electronic device 100 includes a glass article 102 (shown as a cover sheet) and an enclosure or housing 104. The enclosure includes a housing body 108 and cover sheet 102 that together define an interior volume that is configured to enclose the various electronic components of the device 100. For example, the housing body 108 may define an opening in which a display is positioned. The cover sheet 102 is positioned over the display and forms a portion of the exterior surface of the device 100. The cover sheet 102 may also define a window region through which the display of the device 100 is visible. The display may include a liquid crystal display (LCD), an organic light-emitting diode (OLED) display, a transparent window, or other suitable display elements or components.

In embodiments, the various surfaces of the glass article may be referenced with respect to their orientation in an electronic device. For example, the glass article may have a surface which faces an exterior of the electronic device. This surface may also form an external surface of the electronic device. This surface may be referred to as an exterior surface or as an outer surface. The exterior surface may include a front surface of the glass article. Similarly, the glass article may have a surface which faces an interior of the electronic device. This surface may be referred to as an interior surface or an inner surface. The interior surface may include a back or rear surface of the glass article. The terms "interior," "exterior," "inner," "outer," "front," and "rear" are used to identify surfaces of the glass article relative to the electronic device; the orientation of the apparatus is not intended to limited by the use of these terms. Some glass articles may also include at least one side surface between the interior surface and the exterior surface. A periphery of the glass article may be defined at least in part by the at least one side surface. FIG. 1 shows front surface 106 of cover sheet 102; a back surface and side surfaces are not shown.

The cover glass may include multiple zones. In embodiments, a zone of a glass article may represent portions across the thickness of a glass article. For example, a zone of the glass article may be formed by a layer of glass which is thermoformed with one or more additional layers to form the glass cover member. Each of the layers of glass may have different material properties or some of the layers may have materials properties in common. A zone may be contiguous with or define an outer surface or an inner surface of the glass article. A zone may further define, in part, a side surface of the glass article. In additional embodiments, the various surfaces of the cover sheet can be composed of zones and/or portions. An example zone of the cover sheet could be the entire front surface 106, while the back surface would be considered a different zone.

Different locations of the glass article may experience different use conditions. For example, a front surface, exposed to the outside environment, may benefit from having a different property or characteristic, hardness for example, than the back surface, enclosed away from the environment. Therefore different zones of the glass article may have different properties. The property may be a mechanical property or a material property. A "material property" is any property that results from the structure and/or composition of the material, including, but not limited to, an ion diffusion coefficient, an ion implantation density (i.e., density of a particular type of ion introduced by ion exchange) and an ion implantation depth (e.g., depth of layer). Mechanical properties include, but are not limited to, properties of the glass or object and affect the mechanical performance of the object such as resistance to impact, crack resistance, tensile and/or compressive stresses and/or profiles, Young's modulus, resilience, brittleness, geometric stiffness, hardness, toughness, and so on.

Glass for use herein can include a combination of $SiO_2$, $Al_2O_3$, $B_2O_3$, $Na_2O$, $ZnO$, $Li_2O$, and other known constituents. In embodiments, the cover member includes an aluminosilicate glass or a boroaluminosilicate glass. As used herein, an aluminosilicate glass includes the elements aluminum, silicon, and oxygen, but may further include other elements. Similarly, a boroaluminosilicate glass includes the elements boron, aluminum, silicon, and oxygen, but may further include other elements. For example, an aluminosilicate glass or a boroaluminosilicate glass may further include monovalent or divalent ions which compensate charges due to replacement of silicon ions by aluminum ions. Suitable monovalent ions include, but are not limited to, alkali metal ions such as $Li^+$, $Na^+$, or $K^+$; aluminosilicate glasses including alkali metal ions may be termed alkali aluminosilicate glasses. Suitable divalent ions include alkaline earth ions such as $Ca^{2+}$ or $Mg^{2+}$. In embodiments, a glass may have a lattice or a silicate network structure having a defined density.

In typical embodiments, the glass is ion-exchangeable. Ion exchangeable glasses include, but are not limited to, aluminosilicate glasses and aluminoborosilicate glasses. For example, the ion exchangeable glass may include alkali metal ions, such as a lithium aluminosilicate glass or a sodium aluminosilicate glass. The alkali metal ions in the glass may be exchanged for alkali metal ions of a different type in an ion exchange process.

Glass sheets represent glass materials prior to thermoforming, and may include various types and kinds of glass feedstock. Glass sheets have a size, thickness, and composition useful for the intended use after thermoforming and property enhancement. In some aspects, the property or characteristic is a mechanical property or characteristic, and the glass sheet is described as having a first mechanical property or characteristic that is altered by the thermoforming process to a second mechanical property or characteristic. Glass sheets can also be described as having a glass substrate such that the glass substrate can be modified with a surface layer of performance-enhancing materials. Glass substrates typically are formed of glass silicates or similar type compounds as is known in the art. The glass may be transparent to wavelength in the visible spectrum, translucent, or opaque. In embodiments, the glass may have a specified transmittance in the visible spectrum, such as at least 50%.

In accordance with embodiments herein, the cover sheet 102 has been thermoformed to a required contoured shape for the electronic device, with enhanced properties. Enhanced properties can be localized to specific zones of the cover sheet 102 or can be globally modified during the thermoforming process. Some embodiments herein utilize property-enhancing materials to improve scratch resistance, crack resistance, hardness, and strength, and the like, for example. In FIG. 1. the contoured shape of the cover sheet 102 forms a continuous curved surface with the housing body 108.

Figure 2:
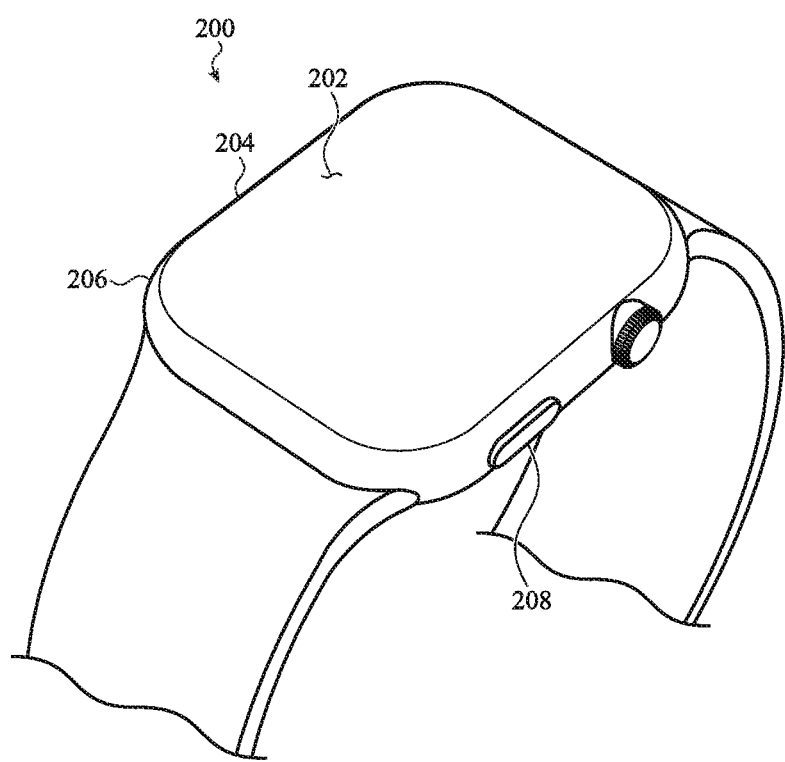
FIG. 2 shows a wearable electronic device having a housing in accordance with embodiments herein.

FIG. 2 illustrates another embodiment of a portable electronic device, in this case a wearable electronic device 200. The glass article 202 in this illustrative embodiment is a thermoformed cover sheet with enhanced strengthening. A watch housing body 204 captures the glass article 202. The cover sheet 202 has a complex shape that includes a pair of curved portions 206 that extend along a corresponding pair or edges of the contoured shape. The curved portions 206 can be configured during thermoforming to form a continuous curved surface with the housing of the electronic device 200. As can be appreciated, thermoforming various glass article geometries can eliminate the need for post processing steps and allows for improved manufacturing of electronic devices having a need for thin, complex shapes with high tolerances. Illustrative buttons 208 extend from the device 200 for user interface.

Figure 3A:
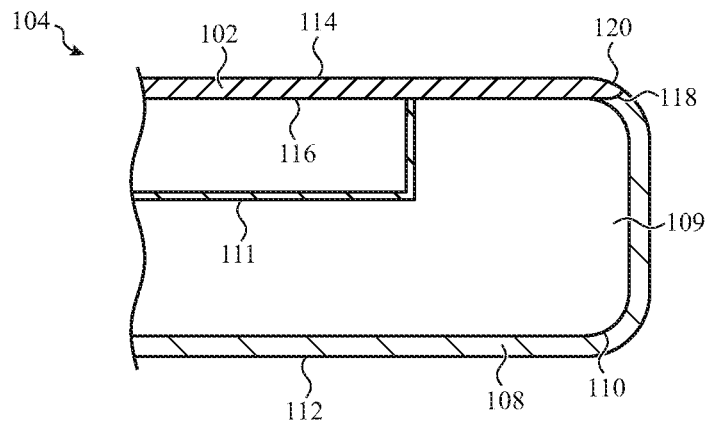
FIG. 3A is a cross-sectional view of an enclosure having a housing body and cover sheet in accordance with embodiments herein.

FIG. 3A is an illustrative cross-sectional view of an enclosure 104 along section A-A of a device similar to the one shown in FIG. 1. In particular, a housing body 108 composed of an aluminum alloy, ceramic, or other like material defines an opening. A thermoformed cover sheet 102 is attached to the housing body 108 to cover the opening and define an enclosed volume 109. Within the enclosed volume 109, the housing body 108 has internal surface 110 and external surface 112, where the internal surface 110 supports and surrounds various structural and electronic components of the mobile phone (not shown).

Figure 3B:
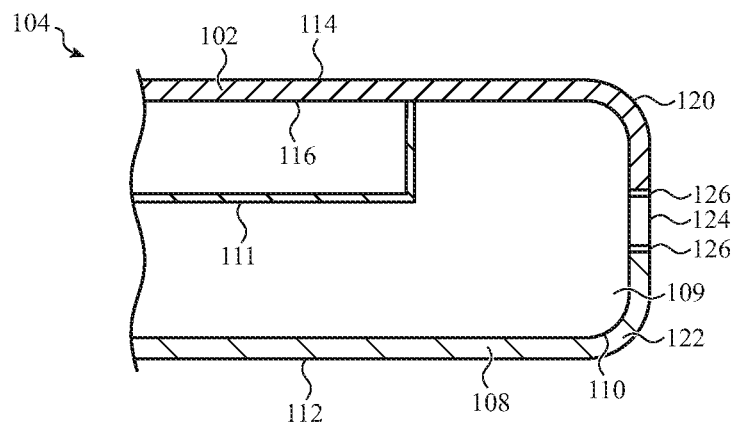
FIG. 3B is another cross-sectional view of an enclosure having a housing body and cover sheet in accordance with embodiments herein.
Figure 3C:
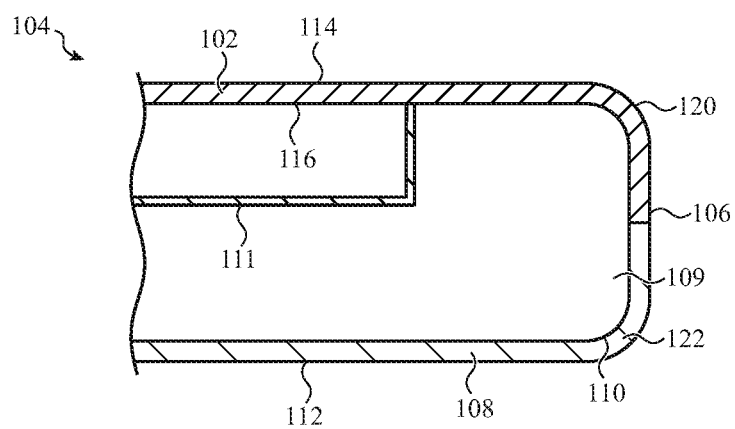
FIG. 3C is a still another cross-sectional view of an enclosure having a housing body and cover sheet in accordance with embodiments herein.

The cover sheet 102 has a front surface 114, back surface 116, and side surface 118. The cover sheet 102 is positioned over the display 111. Each surface of the cover sheet 102 can be composed of one or more zones or portions. The front surface 114 of the cover sheet 102 is exposed to the environment, while the back surface 116 is exposed to the enclosed volume 109 of the illustrative electronic device 100. The cover sheet 102 is thin, typically less than 5 mm in thickness, and in most cases less than 3 mm in thickness. In some aspects, the cover sheet 102 has a thickness of from about 0.1 mm and 2 mm, and in other aspects from about 0.15 mm to 1 mm. The cover sheet 102 can be shaped to a desired contour during thermoforming so as to fit the use, including at the side surfaces 118 (or edges), where a pair of curved portions can occur. As shown in FIGS. 3A-3C, the curved portions 120 can be configured to form a continuous curved surface with the housing body 108 of the electronic device 100.

FIG. 3B shows a similar cross-sectional view of an enclosure 104, as shown in FIG. 3A, except the thermoformed cover sheet 102 extends to form a top half of the enclosure 104, while the housing body 108 has a symmetrical curve 122 to form the bottom half of the enclosure. The cover sheet 102 in this embodiment shows a more pronounced curvature 120, as available through the thermoforming process. An antenna 124 and insulation 126 is also shown. As in FIG. 3A, a display is shown. Post machining the curvature 120 shown in the cover sheet 102 of FIG. 3B would be difficult to impossible to attain from a starting piece of flat glass sheet.

FIG. 3C shows another cross-sectional view of an enclosure 104, as shown in FIG. 3A, having a highly contoured cover sheet 102, matching housing body 108. As in FIG. 3B, the thermoformed glass shows a pronounced curvature 120, not available in post-processing of a flat glass sheet. A display 111 is provided for reference.

Figure 4:
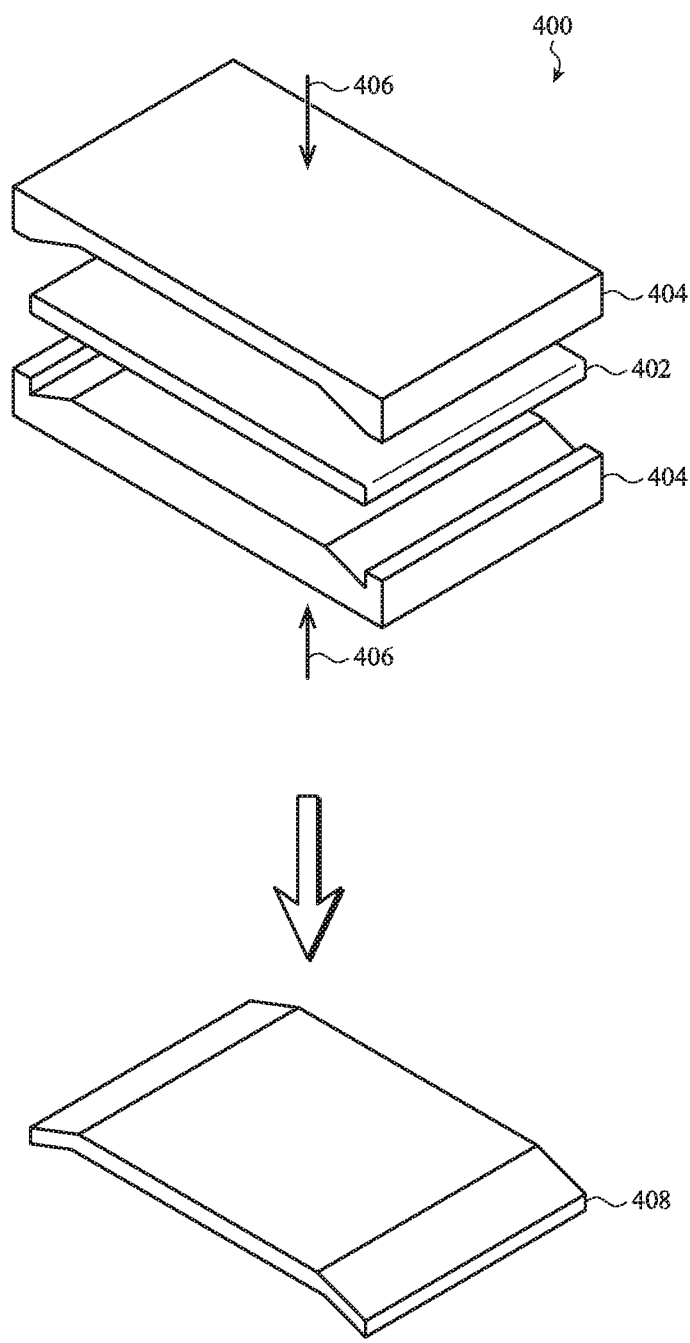
FIG. 4 shows a schematic of thermoforming a glass sheet into a contoured glass sheet.

FIG. 4 illustrates a simplified schematic 400 of thermoforming a glass sheet to a desired contoured shape in accordance with embodiments herein. A glass sheet 402 in need of a particular shape is heated under pressure to above its glass transition temperature to form the desired glass article. Heating of the glass sheet does not reach the glass melting point, as this would render the glass completely liquid. In this regard, a glass sheet 402 is heated to above its glass transition temperature, but below its melting temperature, and placed in an appropriate mold 404 (or the glass sheet is placed in a heated mold), and pressure applied (illustrated by arrow 406) to the glass sheet, in the presence or absence of an applied vacuum (not shown). Heating of the glass sheet 402 to above the glass transition temperature softens the glass of the sheet to a state where the glass is flexible and deformable. In some embodiments, the glass may be regarded as being in a rubbery state. This state of glass is receptive to pressure 406 and allows for contour modifications of the glass sheet 402, based on the contours and pressure points applied by the mold 404. The geometric shape and thickness of the glass sheet 402 can be modified to create the appropriate glass article 408, for example a cover sheet for an electronic device. Although typical cover sheets result with a uniform thickness across the entirety of the glass, cover sheets may be formed having non-uniform thickness where the utility of the sheet requires.

During this thermoforming process, the glass sheet 402 is also receptive to various property modifications. Glass that is thermoformed and being shaped is soft and compliable, and can accept various property modifications, for example, strength, surface hardness, scratch resistant surface, surface tactile feel, surface superhydrophobicity, and the like.

As such, during the thermoforming procedure, a property or characteristic of the glass may be modified or altered while the glass is in a soft or deformable state. The property being modified can correspond to a zone or portion of the surface of the glass (local), or can correspond to an entire surface (global). The property can be changed to a depth and/or distribution based on a penetration profile that results from the thermoforming process.

In one embodiment, a property-enhancing material is applied to the zones of a glass sheet in need of improvement. The glass sheet has a first mechanical property or characteristic. The property-enhancing material is applied prior to the glass thermoforming procedure. In some aspects, the property-enhancing material is applied to the one or more zones of the glass article by a mold, and a mold face or surface in particular. As such, a zone or portion of glass corresponds to a mold surface, or some portion of the mold surface, such that the mold applies the property-enhancing material to the glass sheet surface during the thermoforming process. The resultant glass has an altered mechanical property or characteristic due to the application of the property-enhancing material. In other embodiments, the property being modified in the glass is an intrinsic property, such as density. Here, the mold face or surface applies a change in thermoforming parameters, like temperature or pressure, to modify a property of the glass itself. Both embodiments, addition of a property-enhancing material, and modification of an intrinsic property of the glass, will be discussed in more detail below.

Figure 5:
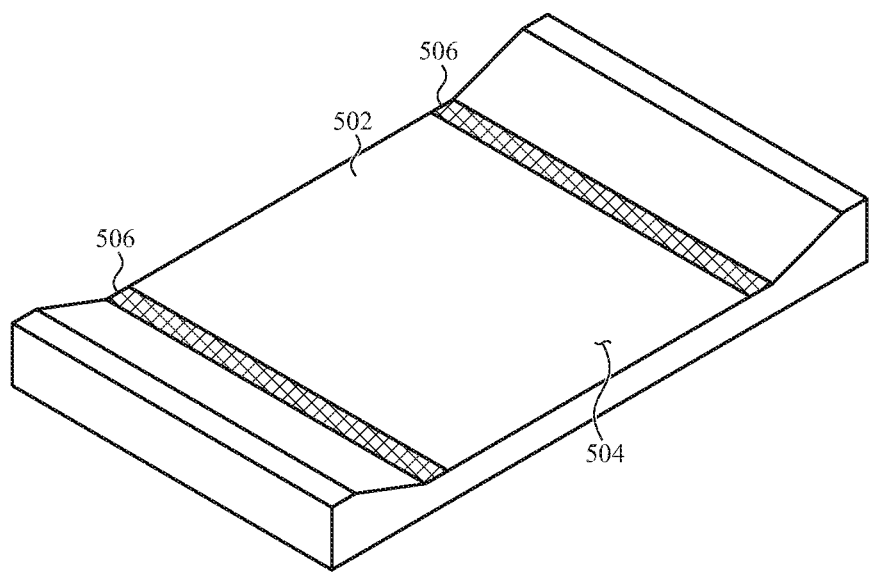
FIG. 5 shows an illustrative view of a female mold face or surface in accordance with embodiments herein.
Figure 6:
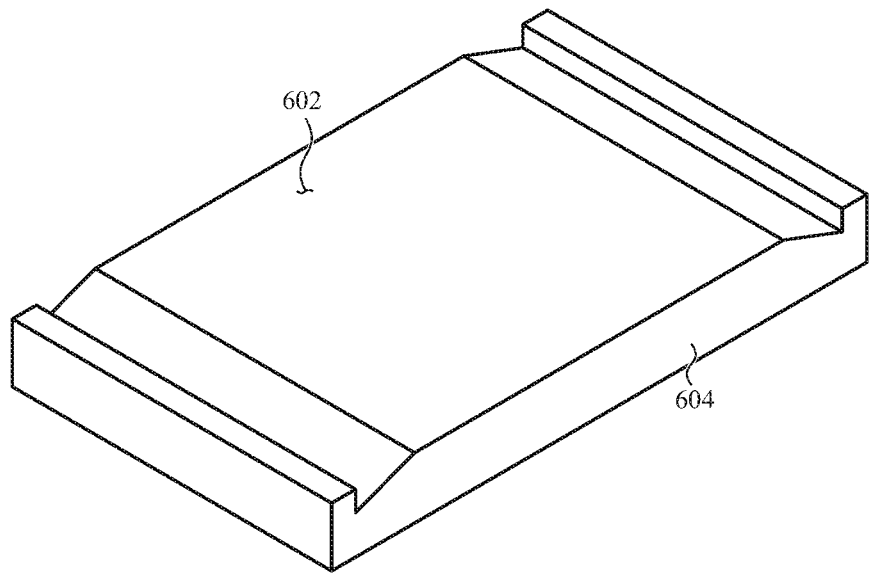
FIG. 6 shows an illustrative view of a male mold face or surface in accordance with embodiments herein.

FIG. 5 and FIG. 6 illustrate the inside face or surface of the top and bottom mold of FIG. 4, respectively. FIG. 5 shows that mold 504 has an inside surface 502 which is negatively contoured to provide the desired glass article shape during thermoforming. The mold surface 502, or some portion of the mold surface, can also be utilized to apply a property-enhancing material 506 to the glass sheet, while the glass sheet is in a softened or "thermoplastic" state. Similarly, FIG. 6 shows that mold 604 has inside surface 602 which is negatively contoured.

As noted above, modification of a glass property can be through application of a property-enhancing material 506, for example a mechanical property, to the glass surface (termed chemical strengthening) via the mold surface 502. In one embodiment, a hard ceramic powder is deposited locally or globally on the mold surface. In another embodiment, a source of alkali metal ions, such as a material comprising alkali metal ions, is deposited locally or globally on the mold surface. For purposes herein, the hard ceramic powder and material including alkali metal ions are referred to as property-enhancing materials. Also as noted above, the property-enhancing materials can also be applied to the glass sheet prior to placement in the mold. In such cases the material is coated directly on the glass sheet and then placed in an appropriate mold. Application of the property-enhancing material directly to the glass sheet can be prior to the glass sheet being heated, during heating of the glass sheet, or after the glass sheet has been appropriately heated, but prior to the glass sheet being placed in the mold.

Figure 7:
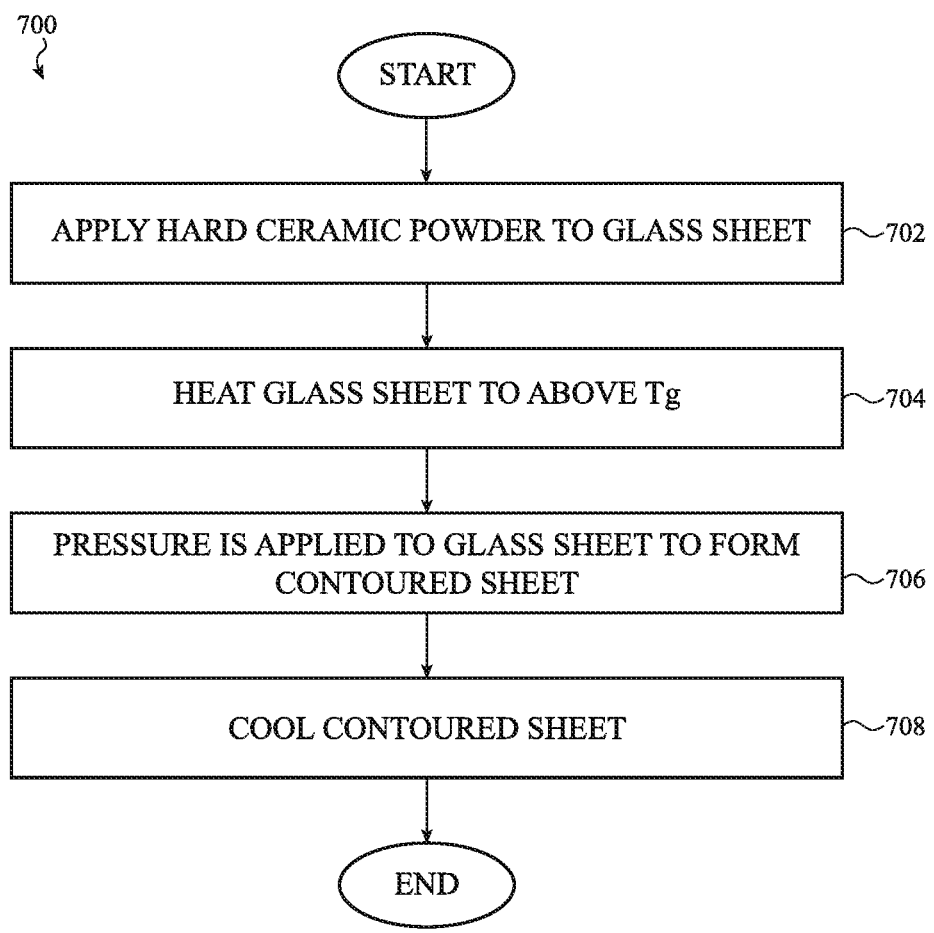
FIG. 7 shows a flow diagram for preparing a thermoformed glass article having hard ceramic powder embedded therein.

FIG. 7 is a flow diagram 700 illustrating a process for increasing the hardness and scratch resistance of one or more zones of a surface in a glass article (for example a cover sheet). A glass sheet that fits the required thickness and area for the intended use is obtained. For example, a glass sheet having a thickness and area that corresponds to a cover sheet for a handheld electronic device. In operation 702, an amount of hard ceramic powder is deposited on the appropriate surface of the glass sheet. The glass sheet has a first mechanical property associated with its hardness. In one aspect, the hard ceramic powder is deposited directly to the appropriate glass surface, prior to placement in the mold. In another aspect, the hard ceramic powder is applied by an appropriately coated mold surface(s). An amount and type of hard ceramic powder to modify the hardness and scratch resistant properties of the cover sheet is utilized. Hard ceramic powders for use herein include zirconium (powdered zirconia), sapphire (sapphire powder), and spinel ($MgAl_2O_4$ powder), although other like ceramic powders can be used.

Once deposited on the glass sheet, in operation 704, the glass sheet is heated to above its glass transition temperature. In operation 706, pressure is applied through the mold to conform the glass sheet to a contoured shape of the mold to form a contoured sheet. The hard ceramic powder located on the mold surface becomes embedded in the corresponding zone or zones of the contoured sheet. An appropriate amount of heat and pressure is used to deposit the hard ceramic powder to an appropriate depth and distribution in the contoured sheet, termed the penetration profile. In operation 708, the cover sheet forms during cooling of the contoured sheet, having a penetration profile for the hard ceramic powder embedded in its surface. The embedded hard ceramic powder gives the cover sheet improved hardness and scratch resistance wherever the powder has been incorporated. Increased hardness and scratch resistance enhances the damage resistance of the cover sheet. In some embodiments, one, two or more, three or more, four or more, etc. different hard ceramic powders can be used to provide a desired hardness/scratch resistance. The hard ceramic powders can be used alone in a zone, or can be combined and then used in a zone. In some embodiments, a uniform distribution of hard ceramic powder is incorporated into the surface of the entire cover sheet. In one example, the entire front surface of a cover sheet can be embedded with hard ceramic powder, while the back surface remains untreated. In another example, only a portion of the front surface of the cover sheet is embedded with hard ceramic powder, the portion corresponding to greater user interaction.

Thermoforming parameters (heat, pressure, cooling rate, presence of vacuum, and the like) on a glass sheet herein can be altered or modified to embed the property-enhancing material to a required depth in the glass article. The resultant inclusion of the property-enhancing material provides a penetration profile for that material. For example, use of higher pressure, greater temperature, or both, will typically result in a profile having a deeper distribution of the property-enhancing material into the glass thickness.

Figure 8:
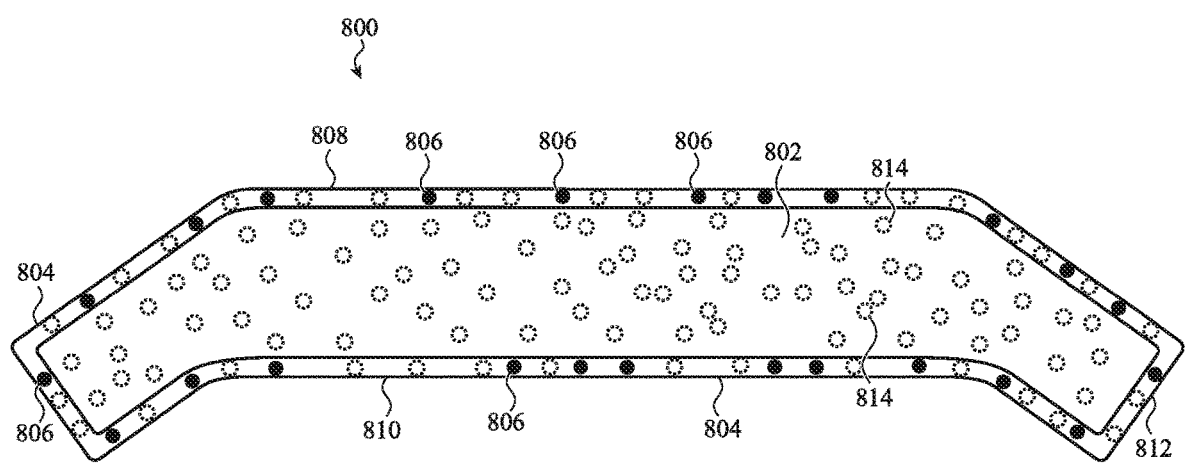
FIG. 8 shows a cross-sectional schematic view of a cover sheet having hard ceramic powder embedded therein by thermoforming.

FIG. 8 shows the differential incorporation of hard ceramic powder into a surface of a glass article upon thermoforming 800. The glass article 802, along any surface area 804, can incorporate the hard ceramic powder 806 to a particular depth and concentration based on the thermoforming parameters and the amount of hard ceramic powder 806 deposited on the glass surface, and therefore incorporated into the glass article 802 when thermoformed. The hard ceramic powder 806 modifies the glass surface and glass internal stress relationship. The incorporation of the hard ceramic powder 806 generally increases the glass compression and adds hard powder to the glass composition, the combination of which provides a hardened, and scratch resistant, surface. In FIG. 8, the front 808, back 810 and side 812 surfaces of the cover sheet 802 have been modified to include hard ceramic powder 806. The hard ceramic powder 806 was embedded to a consistent depth and distribution penetration profile. Features 814 schematically illustrate the original glass composition. As discussed above, numerous embodiments are available to alter the penetration profile, for local distribution of the hard ceramic powder, or for differences in the depth and concentration of the hard ceramic powder into a surface of the glass article, and the like.

Figure 9:
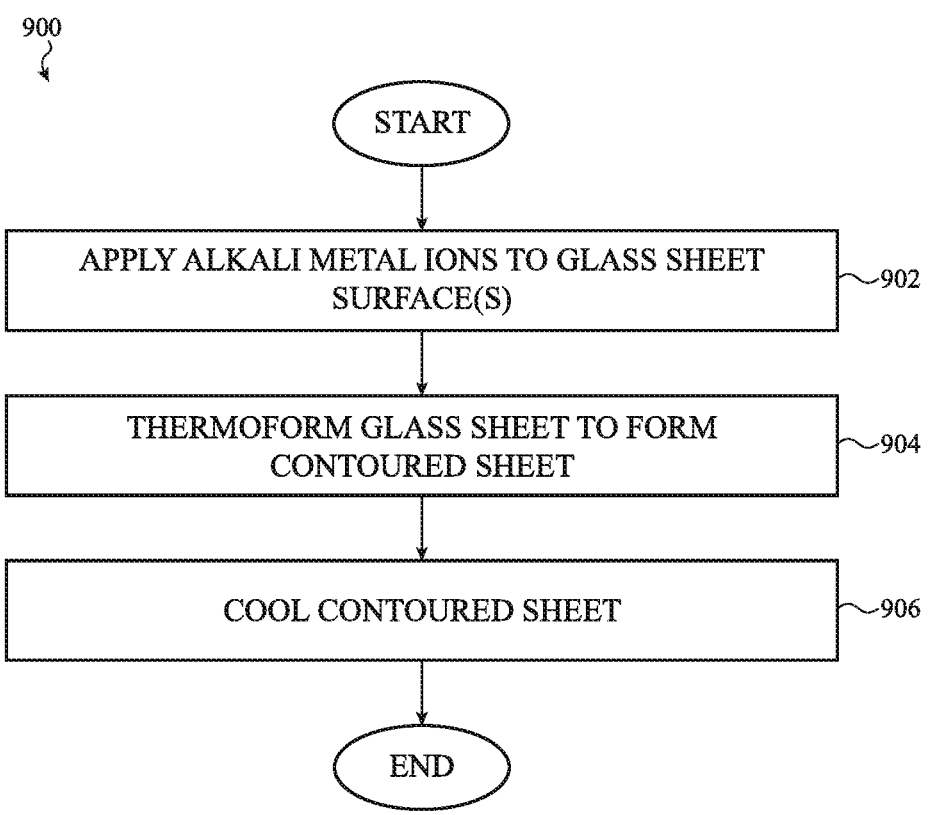
FIG. 9 shows a flow diagram for preparing a thermoformed glass article incorporating alkali metal ions.

FIG. 9 is a flow diagram 900 illustrating a process for chemically strengthening one or more zones of a surface in a glass article. As shown, the glass article may be strengthened via introduction of alkali metal ions (e.g., via exchanging the alkali metal ions to be introduced for alkali metal ions in the glass). Introduction of alkali metal ions into the glass article effectively strengthens the surface of glass by adding compressive stress at the surface of the glass. Typically, the combination of stresses on a glass article are budgeted to avoid failure and maintain safety, i.e., if there is too much stress put into a glass article, the energy will eventually cause the glass article to break or fracture. Therefore, each glass article has a stress budget, i.e., an amount of compressive stress versus tensile strength that provides a safe and reliable glass article.

In the present embodiment, alkali metal ions, e.g., lithium, sodium, potassium, cesium, and the like, are introduced into a surface region of the glass article to a depth of particular utility. In some embodiments, ions that diffuse into the surface region of the glass article form a compressive stress region that enhances the strength of the surface region. In embodiments, the compressive stress region is in the form of a layer (i.e., a compressive stress layer). Diffusion of the alkali metal ions into the glass article is similar to the discussion above for the hard ceramic powder, with the thermoforming parameters being used to increase depth of ion penetration.

A glass sheet that fits the required thickness and area for the intended use is obtained; for example, the glass sheet(s) may have a thickness and area that corresponds to a cover sheet for a smart phone. The required contoured shape and strength is identified for the cover sheet, including zones or portions of the cover sheet in need of an increase in strength. Both symmetric and asymmetric chemical strengthening is contemplated for this embodiment. In some embodiments, asymmetrically chemically strengthening the glass sheet during thermoforming will keep the inner portion of the cover sheet under tension, while the chemically strengthened layer will be under compression.

The depth and compression of the chemically strengthened layer will vary upon the requirements of a particular use, but will depend on the type of alkali metal ions incorporated into the glass (partly based on the ions' size and ability to add compression to the limited volume of the glass) and the thermoforming parameters used to diffuse the ions into the softened glass. When a portion of the thermoforming process takes place above the glass transition temperature for the glass, the lattice or silicate network may relax to some extent as the alkali metal ions are introduced into the glass. The relaxation of the lattice or silicate network may be greater than occurs at ion exchange processes occurring at lower temperatures, affecting the level of compressive stress produced by the ion exchange. The alteration in the mechanical property of the glass will result in a penetration profile for the glass sheet.

Still referring to FIG. 9, in operation 902, a source of alkali metal ions is deposited on a glass sheet surface, typically via direct contact with the glass sheet or through contact via a corresponding mold face or surface. The glass sheet has a first mechanical property, in this case strength, prior to the thermoforming process. In one aspect, the source of alkali metal ions is deposited on the mold surface via an alkali metal rich liner, or via a coating or paste. In one embodiment, the alkali metal is sodium, particularly where the glass is a silicate or soda lime glass, or where the glass has been enriched with lithium. Here, the sodium ions will diffuse into the thermoformed glass surface and form a local or global (depending on the deposit to the mold surface) surface compression layer. In another embodiment, the alkali metal is potassium, particularly where the glass article already incorporates sodium, and requires a larger ion to add compression to the surface.

In operation 904, the glass sheet is thermoformed (heated first and pressure added second) into the correct contoured shape (contoured sheet), while incorporating the alkali metal ions into the glass surface. In operation 906, the contoured sheet is cooled into a cover sheet, having a distributed alkali metal ion, like sodium or potassium, diffused in the surface of the target zones (penetration profile). The first mechanical property has now been altered to a second mechanical property consistent with the incorporation of the alkali metal ion. Where the same amount and type of alkali metal ion is coated on both sides of the mold, the strengthening of the cover sheet is symmetric. Where only one side, or zone of one side, for example, of the mold surface is coated, the glass can be strengthened asymmetrically. Asymmetric strengthening allows for an increase in strengthening at that localized portion or zone of the glass, i.e., a strengthened layer, as the surface compression layer is localized to one side of the glass (front versus back in this example).

Additional embodiments herein include immersing the thermoformed and chemically strengthened glass article, for example a cover sheet, in an ion solution bath to further modify and/or enhance the glass article's strength. For example, a glass article having been thermoformed and strengthened by addition of sodium ions (for example, by immersion in a sodium salt bath), may be further strengthened by addition of potassium ions (for example, by immersion in a potassium salt bath) at an appropriate temperature, typically 250° C. to 500° C., and for an appropriate amount of time, typically from about two to about six hours. A glass article may include multiple zones of symmetric and asymmetric chemical strengthening, formed through a combination of thermoformed chemical strengthening followed by chemical strengthening in ion solution baths. It is also envisioned that a glass article feedstock could first be chemically strengthened via ion bath immersion, for example in a sodium salt solution, followed by targeted strengthening during thermoforming to the geometric shape of the glass article, for example, lining one zone of a mold surface with potassium ions. Chemical bath strengthening may also include use of masking or ion-diffusion barriers to cover portions of the glass article surface prior to immersion in the ion containing baths, or can include materials to promote ion diffusion into the glass article, e.g., high concentration ion pastes or coatings.

The techniques described above are applicable to glass articles in which two or more sheets of glass are thermoformed and alkali metal ions introduced into the glass article during thermoforming. By the way of example, two glass sheets having different ion diffusion capacity may joined together via thermoforming to form a cover sheet with a desired contoured shape. For example, the diffusion capacity of a glass may be assessed, at least in part, by the diffusion coefficient of a particular ion in the glass. The difference in ion diffusion capacity may lead to asymmetric chemical strengthening of the glass article even when the same amount and type of alkali metal ion is coated on both sides of the mold.

In some embodiments, the combination of thermoforming (adding heat and pressure to the outer and opposing surfaces of a glass article) and chemical strengthening, can be used to form glass articles having one or more internal compressive stress layers, e.g., layers of compressive stress separated from the outer and inner surfaces of the glass article by layers of tensile stress. Internal compressive stress layers differ from surface compressive stress layers in that the alkali metal ions in the internal compressive stress layer are diffused into the glass to the point where the ions are no longer adjacent or contiguous with a surface of the glass. For a compressive stress layer to be an internal compressive stress layer, a region of tensile stress or neutral separates the internal compressive stress layer from both the top and bottom surfaces of the glass article or from other internal compressive stress layers. In embodiments, multiple internal stress layers are separated from each other by tensile stress layer and from the outer and inner surfaces by tensile stress layers.

Internal compressive stress layers provide additional impediments to stop or limit crack propagation from either the outer or inner surface into the glass. This is particularly true where the internal compressive stress layer is separated from a surface compressive stress layer at either of the inner or outer surfaces. In embodiments, stress is positioned across a thickness of the glass article so as to provide a stress profile of alternating compressive and tensile layers. In some embodiments, a glass article has a top surface compression layer of a given depth that gives way to multiple alternating internal tensile stress layers or regions and internal compressive stress layers or regions.

The stress pattern is developed across the thickness of the glass article, which both hinders crack propagation and maintains a safe and balanced compressive to tensile stress ratio. Internal stress zones dampen energy as it dissipates across the thickness of the glass article, and, in some cases, forces the energy from a crack to turn or follow along the internal stress layer rather than making its way across the glass to the opposite surface. Each additional internal compressive stress layer provides another interface for cracks to dissipate energy and alter or otherwise change direction.

In yet another embodiment, a glass article having internal compressive stress layers is described. The glass article has an outer surface and an opposing inner surface, with a first zone adjacent the outer surface, a third zone adjacent the inner surface, and a second zone sandwiched between the first and third zones. A chemically strengthened layer is positioned in the second zone, such that the chemically strengthened layer inhibits crack propagation from the outer surface to the inner surface. The chemically strengthened layer has compressive stress and is separated from the first zone and third zone tensile stress. Aspects of the glass article can include chemically strengthened layers that present at the outer surface and/or at the inner surface to predetermined depths. Aspects can also include glass articles having both surface compressive stress layers and internal compressive stress layers where each compressive layer is separated from other compressive layers by tensile stress.

Embodiments herein include glass articles that have an outer surface and an opposing inner surface. First and second tensile stress layers are between the outer surface and inner surface. A first compressive stress layer is between the first and second tensile stress layers such that the first tensile stress layer separates the first compressive stress layer from the outer surface and the second tensile stress layer separates the compressive stress layer from the inner surface. Aspects include a second compressive stress layer that extends from the outer surface and a third compressive stress layer that extends from the inner surface. The second and third compressive stress layers are separated from the first compressive stress layer by the first and second tensile stress layers, respectively. In typical embodiments, the first compressive stress layer comprises sodium ions and the second and third compressive stress layers comprise potassium ions. The tensile stress layers are typically comprised of lithium and/or cesium ions.

Figure 10A:
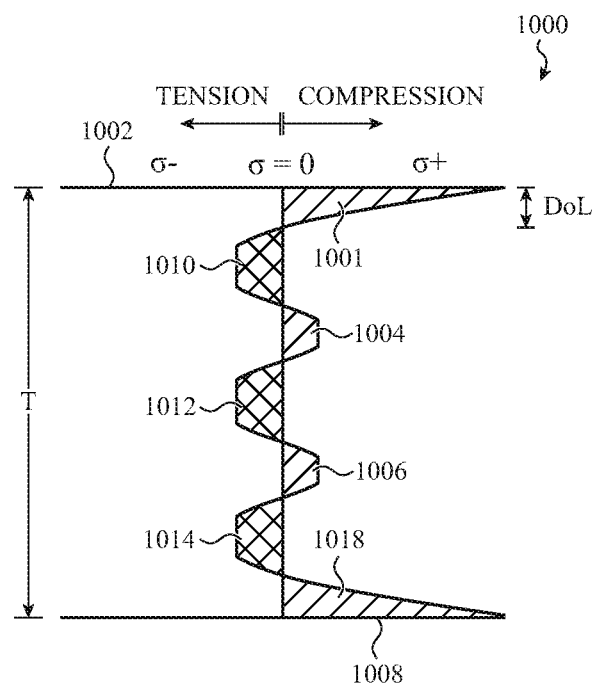
FIG. 10A is a stress profile for a glass article having an outer surface, inner surface, and two internal compressive stress layers.

FIG. 10A illustrates a layered stress profile for a glass article 1000 where an outer surface 1002 has a compressive stress layer 1001 extending into the glass article 1000 to a particular depth (DoL) of layer. Generally, the DoL is the thickness of a layer of compressive stress or tensile stress within the glass. A layer ends when the tensile stress or the compressive stress (depending on the stress of the layer) reaches zero. Put another way, each layer ends when its stress goes to zero. This is shown as the Y axis (e.g., sigma=zero). As the outer surface 1002 appears as the top surface in FIG. 10A, outer surface 1002 may alternately be referred to as a top surface, the inner surface 1008 may referred to as a bottom surface, and the surface stress layers also referred to accordingly in the following discussion of FIGS. 10A through 11C.

A minus sigma legend indicates a layer or zone having a tensile stress, while a plus sigma legend indicates layer or zone having compressive stress. The vertical line (sigma equals zero) designates crossover between compression and tension. Two compressive stress layers 1004 and 1006 are internal to the glass, e.g., between, but not extending to, the outer surface 1002 and opposing inner surface 1008. Each of these compressive stress layers 1004, 1006 are separated by a tensile stress layer 1012. Likewise, tensile stress layers 1010, 1014 separate the compressive stress layers 1004, 1006 from outer 1001 and inner 1018 compressive stress layers. The first or outer surface compressive stress layer 1001 extends from the outer surface 1002 into the glass while the fourth or inner surface stress layer 1018 extends into the glass from the inner surface 1008. A layer (or region) "extends from" a surface if the surface forms part of the layer (or region). Typically, the surface forms a boundary of a layer. Put another way, if a surface is under compressive or tensile stress, then a compressive or tensile layer (or region) extends from that surface.

Additionally, tensile stress layer 1010 may be referred to as a first tensile stress layer, tensile stress layer 1014 may be referred to as a second tensile stress layer, and tensile stress layer 1012 may be referred to as a third tensile stress layer. First tensile stress layer 1010 is inward of outer surface compressive stress layer 1001 (i.e., towards a midpoint of the thickness of the glass article). Second tensile stress layer 1014 is inward of inner surface compressive stress layer 1018. Third tensile stress layer 1012 is between the first internal compressive stress layer and the second internal compressive stress layer.

A layer or region is "contiguous with" a surface if the layer stops at that surface. Thus, if a surface (for example) defines a boundary of a layer, the layer both extends from and is contiguous with that surface. In the embodiment shown in FIG. 10A, compressive layer 1001 both extends from and is contiguous with outer surface 1002, and compressive layer 1018 both extends from and is contiguous with inner surface 1008. If the stress at outer surface 1002 equaled zero, then compressive stress layer 1001 would be contiguous with, but not extend from, the outer surface 1002.

Accordingly, the sample glass article 1000 includes an outer surface compressive stress layer 1001, an inner surface compressive stress layer 1018, and two internal stress compressive layers 1004 and 1006 interposed with three tensile stress layers 1010, 1012, and 1014. The tensile stress layers are balanced with the amount of stress in the outer, inner, and internal compression zones to allocate to a safe stress for the glass article. The compressive stress layers can be symmetric with each other or can be asymmetric with respect to each other. For example, compressive stress layer 1001 may have a greater depth of layer as compared to an inner surface compressive stress layer 1018. Further, although compressive stress layer 1001 is shown as extending from outer surface 1002, it may be contiguous with the outer surface 1002 instead (e.g., the stress of the outer surface 1002 may be zero or near-zero). The same is true of the inner compressive stress layer 1018 and the inner surface 1008. Where desired, the order of the compressive and tensile stress layers may be reversed in this or any other embodiment described herein, such that the outermost stress layers (e.g., layers 1001, 1018) may be tensile stress layers or zones instead of compressive stress layers or zone.

Figure 10B:
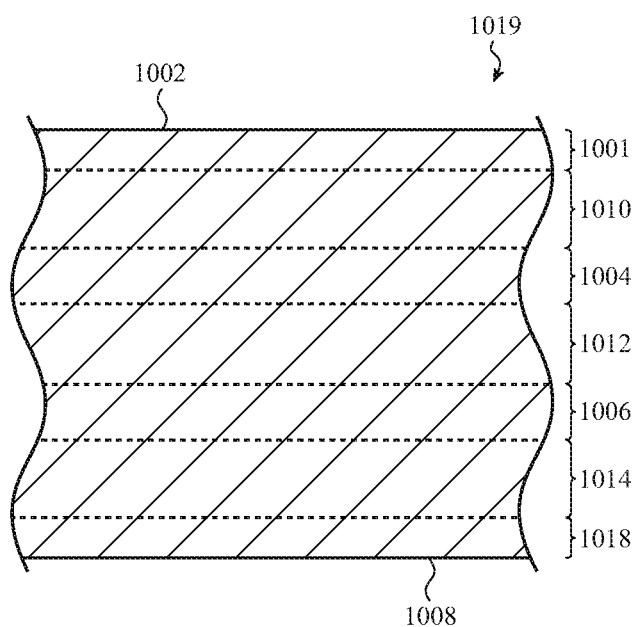
FIG. 10B shows a cross-sectional view of a glass article that corresponds to the stress profile of FIG. 10A.

FIG. 10B provides an illustrative cross-sectional view of the glass article in stress profile FIG. 10A. The glass article 1019 has multiple internal compressive stress layers 1004 and 1006 separated from each other and the outer and inner surfaces by tensile stress layers 1010, 1012 and 1014. The combination of multiple, separated compressive stress layers can dampen and lessen the potential for crack formation or propagation into the glass. For example, an initial impact force to a glass article surface crosses the DoL of the outer surface compressive layer in the glass. The remaining force, if any, crosses into the glass and is further dampened by the first of the internal compressive stress layers. The force may be turned or modified to further limit the opportunity to form a crack across the glass article. This stress pattern across the thickness of the glass article allows for the impact force to be stepwise dampened or turned prior to crossing the thickness of the glass article. As discussed previously, a glass article has a balance of compressive and tensile stress for a particular utility. The balance of compressive stress (surface and internal) and tensile stress allows for impact resistance and glass safety to be coordinated.

Figure 10C:
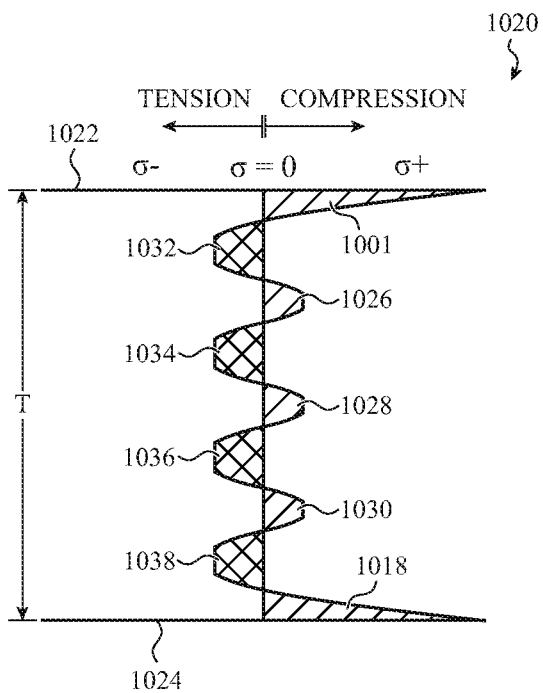
FIG. 10C is a stress profile for a glass article having an outer surface, inner surface, and three internal compressive stress layers.
Figure 10D:
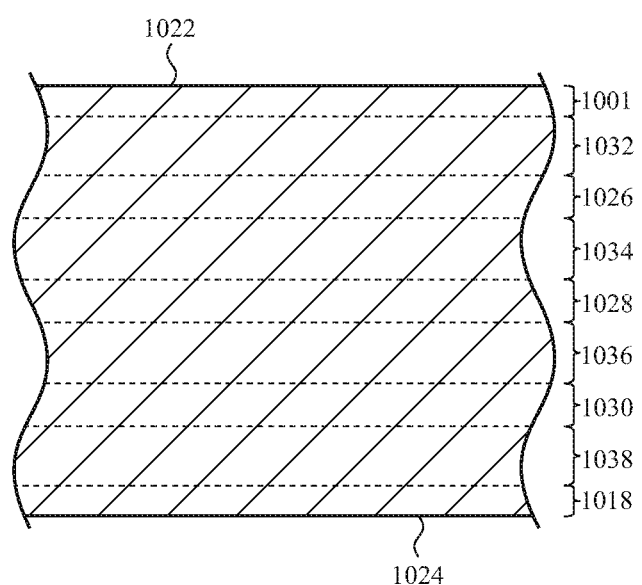
FIG. 10D shows a cross-sectional view of a glass article that corresponds to the stress profile of FIG. 10C.

FIGS. 10C and 10D illustrate another layered stress profile 1020 for a glass article where the glass article exhibits an outer surface 1022, an inner surface 1024, an outer surface compressive stress layer 1001, an inner surface compressive stress layer 1018, and three internal compressive stress layers 1026, 1028 and 1030, interposed by four tensile stress layers 1032, 1034, 1036 and 1038. As above, the internal compressive stress layers provide barriers to dampen and turn propagating cracks, where each compressive stress layer may be sufficient to prevent further crack development into and across the thickness of the glass article. The pattern of interposing internal compressive stress layers sandwiched between tensile stress layers can be continued for glass such that glass articles can include one, two or more, three or more, four or more, five or more, etc. internal compressive stress layers. Glass articles can have no surface compression, an outer surface compressive stress layer or outer and inner surface compressive stress layers. As noted, the stress layers can be symmetrical or asymmetric with regard to the thickness or strength of the layer (e.g., when the outer surface compressive stress layer 1001 has a different depth than the inner surface compressive stress layer 1018, the surface compressive stress layers are asymmetric. The layers, as discussed above, can be continuous throughout the glass surface or can be discontinuous and positioned at strategic locations in the glass; for example, only at the corners or edges of a cover sheet and not in the middle of a cover sheet, e.g., corners include internal compressive stress layers, while the middle has no internal compressive stress layers.

As shown in FIG. 10C, outer surface compressive stress layer 1001 extends from outer surface 1022 and inner surface compressive stress layer 1018 extends from inner surface 1024. First tensile stress layer 1032 is inward of outer surface compressive stress layer 1001 and second tensile stress layer 1038 is inward of inner surface compressive stress layer 1018. First internal compressive stress layer 1026 is inward of first tensile stress layer 1032. Second internal compressive stress layer 1030 is inward of second tensile stress layer 1038. Third tensile stress layer 1034 is inward of first internal compressive stress layer 1026. Fourth tensile stress layer 1036 is inward of second internal compressive stress layer 1030. Third internal compressive stress layer 1028 is between third tensile stress layer 1034 and fourth tensile stress layer 1036.

In embodiments, the glass article comprises multiple zones. For example, a zone of the glass article may be formed by a layer of glass which is thermoformed with one or more additional layers to form the glass cover member. Each of the layers of glass may have different material properties or some of the layers of glass may have materials properties in common. A zone may be contiguous with or define an outer surface or an inner surface of the glass article. The layers of glass may be stacked so that that different zones are traversed along a thickness of the glass article. For example, a glass thickness can be composed of one or more, two or more, three or more, four or more, and the like zones. Within each zone, one or more stress layers or regions may be present, thus subdividing the description of the zone.

Figure 11A:
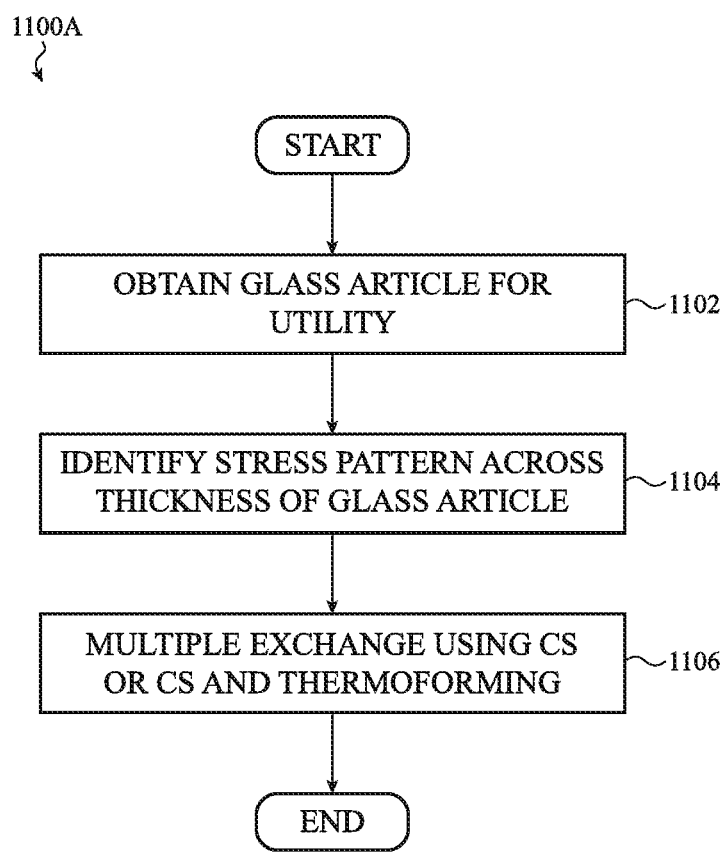
FIG. 11A shows a flow diagram for preparing a glass article having an internal stress zone.

FIG. 11A is an illustrative flow diagram for preparing a glass article having layering of compressive stress and tensile stress through the thickness of the glass article 1100. The glass article has the dimensions, thickness, and composition typical for a cover glass in a portable electronic device 1102. An amount of stress that a particular glass article can withstand across its thickness is determined 1104. Note that a compressive stress layer design can be incorporated into any spot or area of a glass article using thermoforming and chemical strengthening, as described herein. Note that internal compressive layers can be incorporated across the surface area and within an entire glass article, or can be limited to the peripheral sides, edges, or corners of the glass article, for example. For example, in a cover glass, the corners of the cover glass have both compressive surface stress and internal compressive stress (due to higher likelihood of impact and crack propagation), while the remainder of the cover sheet only has compressive surface stress.

A glass article can form multiple compressive stress layers using a series of ion exchange steps 1106, with or without thermoforming.

Figure 11B:
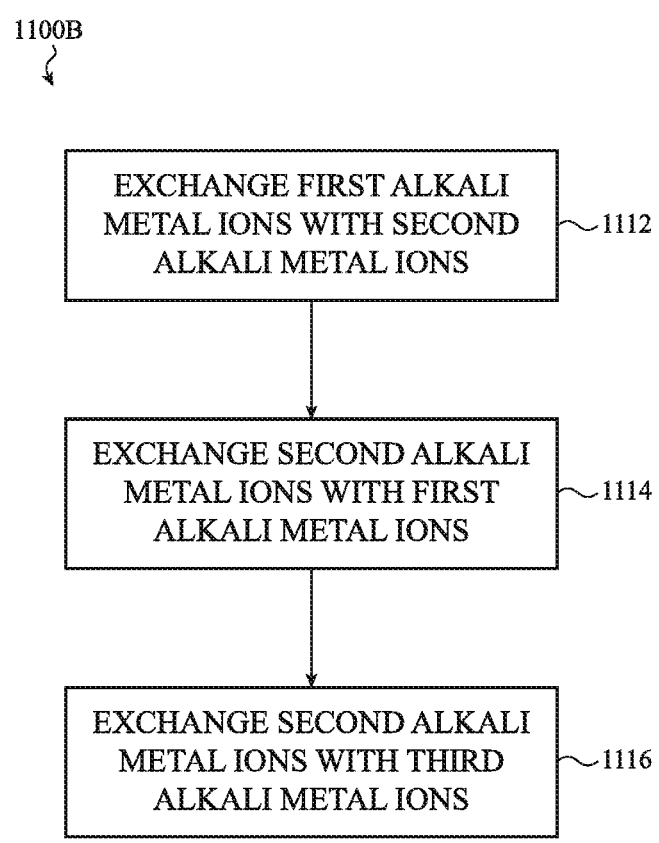
FIG. 11B shows an additional flow diagram for preparing a glass article having an internal stress zone.

FIG. 11B illustrates a flowchart of an example process 1100B for making an internal compressive stress region in a glass article using multiple ion exchange operations. Process 1100B further creates an external compressive stress region and an internal tensile stress region.

Process 1100B includes multiple ion exchange operations. During each ion exchange operation, alkali metal ions in the glass article may be exchanged for alkali metal ions in a bath. Alkali metal ions from the bath are thus introduced into the glass article. The bath may comprise a molten ionic salt. The bath temperature may be from the melting point of the salt to approximately 600° C.

The temperature of the bath may be below a strain point or a glass transition point of a glass portion of the glass article, so that exchanging the alkali metal ions in the glass article with larger alkali metal ions tends to cause an expansion of an ion-exchanged portion of the glass article. However, expansion of the ion exchanged portion of the glass article may be constrained by other portions of the glass article which are not ion exchanged. As a result, a compressive stress region, such as a biaxial residual compressive stress region, may be created in the ion exchanged portion. For example, the ion exchanged portion may be in the form of an ion-exchanged layer.

The process 1100B may include operation 1112 of exchanging first alkali metal ions in an ion exchangeable portion of the glass article with second alkali metal ions. The first alkali metal ions have a first size and the second alkali metal ions have a second size larger than the first size. The first alkali metal ions may be exchanged for the second alkali metal ions by immersing the glass article in a bath comprising the second alkali metal ions. The second alkali metal ions are thus introduced into the glass article.

For example, operation 1112 may be a first ion exchange operation which forms a first ion exchange layer which extends throughout a thickness of the glass article. As another example, the first ion exchange layer may extend to a first exchange depth which is less than half a thickness of the glass article.

The process 1100B may further include operation 1114 of exchanging second alkali metal ions in the glass article with first alkali metal ions. Operation 1114 may follow operation 1112. Operation 1114 may be a second ion exchange which forms a second ion exchange layer. The second ion exchange layer extends to a second exchange depth less than the first exchange depth. The second ion exchange may comprise immersing the glass article in a bath comprising the first alkali metal ions. First alkali metal ions may thus be re-introduced into the glass article.

In addition, process 1100B may include operation 1116 of exchanging second alkali metal ions in the glass article with third alkali metal ions having a third size greater than the second size. Operation 1116 may further include exchanging first alkali metal ions in the glass article with the third alkali metal ions. Ion exchange operation 1116 may be a third ion exchange which forms a third ion exchange layer. The third ion exchange layer extends to a third exchange depth less than the second exchange depth. Operation 1116 may comprise immersing the glass article in a bath comprising the third alkali metal ions. Operation 1116 may follow operation 1114 or may occur concurrently with operation 1114, in which case the bath may comprise the first alkali metal ions and the third alkali metal ions. As an example, the first alkali metal ions are lithium ions, the second alkali metal ions are sodium ions, and the third alkali metal ions are potassium ions.

The resulting stress profile may be as shown in FIG. 10A in embodiments where the ion exchange operation proceed from both a top/outer surface and a bottom/inner surface of the glass article and the first exchange depth is less than half a thickness of the glass article. For these conditions, a resulting distribution of alkali metal ions in the glass article is as follows. An inner portion of the glass article (having depths greater than the first exchange depth) comprises the first alkali metal ions. First portions of the glass article immediately outward of the inner portion are enriched in the second alkali metal ions as compared to the inner portion by the first ion exchange operation. Second portions of the glass article immediately outward of the first portions are depleted of the second alkali metal ions as compared to the first portions of the glass article due to the second ion exchange operation. Surface portions of the glass article immediately outward of the second portions of the glass article are enriched in the third alkali metal ions as compared to the second portion of the glass article.

Surface compressive stress regions may be formed in the surface portions of the glass articles due to their relatively high content of the third alkali metal ions. In addition, internal compressive stress regions may be formed in the first portions of the glass article due to their relatively high content of the second alkali metal ions. A tensile stress region is formed between the interior compressive stress regions and at least partially in the inner portion of the glass article. In addition, a tensile stress region is formed between each of the surface compressive stress regions and the internal compressive stress region inward of the surface compressive stress region. In embodiments, a compressive stress region and/or a tensile stress region may be in the form of a layer.

In embodiments, the first alkali metal ions are lithium ions, the second alkali metal ions are sodium ions, and when the third alkali metal ions are potassium ions. Therefore, in embodiments a concentration of lithium ions is higher in each of the first tensile stress layer and the second tensile stress layer than in the outer surface compressive stress layer, the inner surface compressive stress layer, the first internal compressive stress layer, and the second internal compressive stress layer.

Figure 11C:
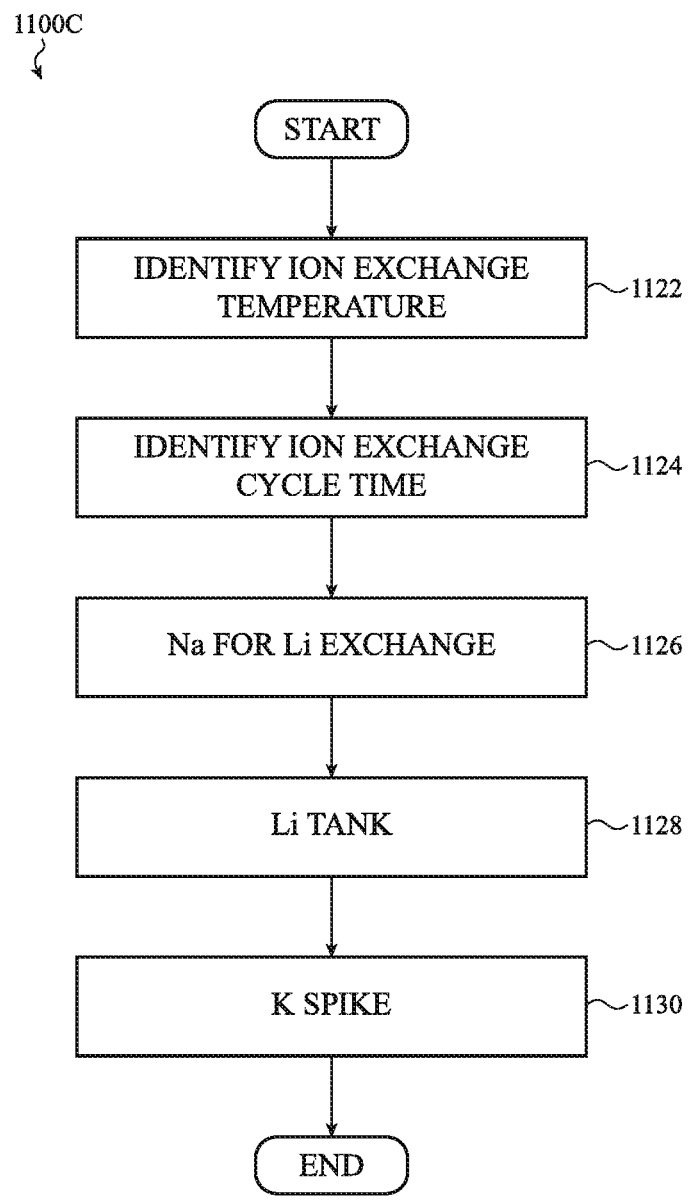
FIG. 11C shows a more detailed flow diagram for preparing a glass article having an internal stress zone.

As shown in the illustrative flow diagram of FIG. 11C, alternating ion exchange steps can be used to implant, leach, and so on, through a top, a bottom, or a top and bottom of the glass article. The series of ion exchange steps can be used with or without thermoforming. Where additional diffusion is necessary, thermoformed chemical strengthening can be used. One example of this process is described in greater detail in FIG. 11C.

Referring to FIG. 11C, the glass article having a contemplated stress pattern is considered, and appropriate ion exchange temperatures and cycle conditions identified in operations 1122 and 1124. In a simple example, operation 1126 includes placing a lithium infused glass article in a sodium bath. The sodium bath can be sodium nitrate at 30% to 100% mol, and the glass article can remain in the bath for between four to six hours at between 350-450° C., for example. Some amount of lithium ions diffuses out of the glass allowing for larger sodium ions to diffuse into the surfaces of the glass. The glass article remains in the sodium bath for the four to six hours to allow sodium ions to diffuse into the glass. In operation 1128, the glass article is then moved to a high concentration lithium ion bath, 30% to 100% mol for four to six hours at 350 to 450° C., where some of the sodium ions at the surface of the glass article leach out into the lithium bath and some lithium ions diffuse into the surface of the glass article. In operation 1130, a potassium ion spike is next performed to allow for diffusion of some potassium into the surface of the glass. The potassium ion spike 1128 can be performed in 30% to 100% mol potassium nitrate for six to ten hours at 300 to 500° C.; the concentration and/or the temperature of the bath used for the potassium ion spike may be relatively high to achieve a relatively shallow depth and relatively high surface concentration of potassium ions. For example, the glass article has outer and inner surface layers having potassium ions, a zone of leached sodium ions, composed substantially of lithium ions (as the alkali metal ions), and an internal zone formed of a high concentration of sodium ions. When the sodium ions do not reach the middle thickness of the glass, the glass article has high compressive stress at its surfaces (potassium ions), a layer of lower stress formed by lithium ions (tensile stress), and a layer of sodium ions having higher compressive stress than the lithium ion layer (internal compressive stress layer). The center of the glass article, if sufficiently thick, can exhibit a center layer of lithium ions, too deep for the sodium ions to diffuse under the conditions utilized to prepare the glass article.

In this example, using lithium, sodium, and potassium for ion exchange layering from the outer to the inner of the glass article includes: top surface potassium layer (compressive), a layer of lithium ions (tensile), a layer of sodium ions (compressive), a center layer of lithium ions (tensile), a layer of sodium ions (compressive), a layer of lithium ions (tensile), and an inner surface potassium layer (compressive). As can be imagined, modification of ion exchange temperature, cycle time, ion type, inherent glass makeup, and pattern of exchange can be used to prepare a number of different compressive stress layers internally across a glass article. In addition, direct heat and pressure from thermoforming can also be used to increase diffusion of the internal layers. Here, heat and pressure can be added to the chemically strengthened glass article to move the edge of the sodium ions toward the center of the glass article.

Propagation of a crack across the thickness of the glass article would have to overcome both potassium and sodium strengthened layers, which has been shown to limit crack progression. Although this example was shown using lithium, sodium and potassium, other ions can be utilized as well. For example, cesium can be included to provide further design options for stress layered articles. These ion exchange steps can be combined with alternating temperature control of the glass article to further draw ions into the interior portion of the glass article. For example, the sodium ion bath can be used on a heated glass article that is cooled quickly. An edge of the sodium ion layer is drawn toward the center of the glass article, as the outside surface of the glass cools faster than the inside portion of the glass. The glass article can then be rinsed, or rinsed and quenched, to prevent diffusion of the sodium ions back toward the surface.

Figure 12:
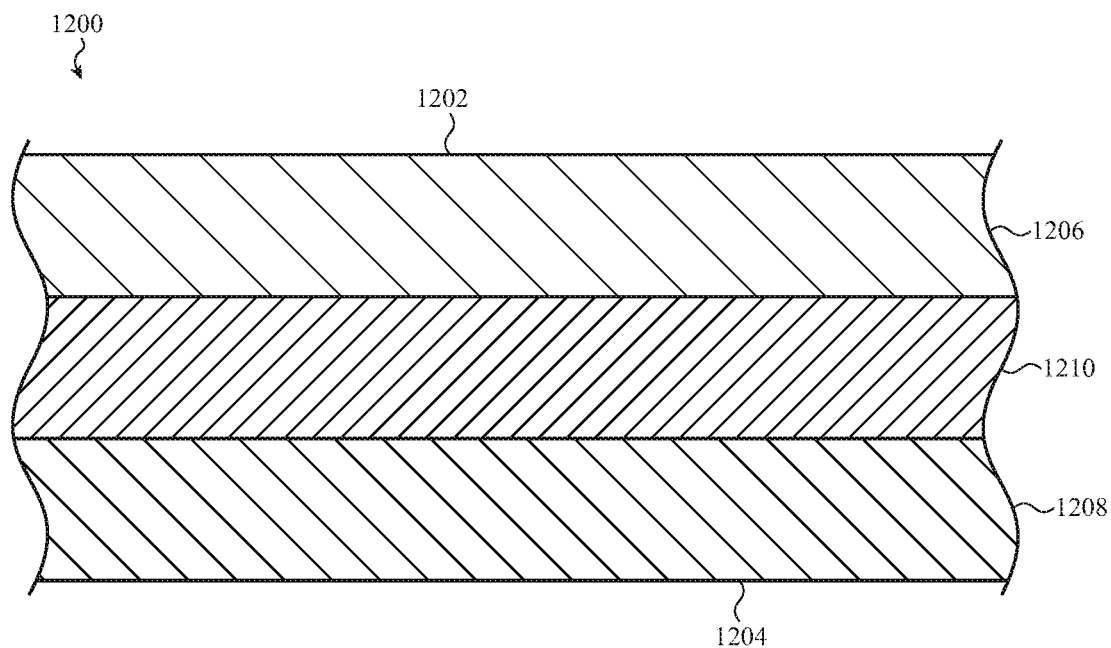
FIG. 12 shows a cross-sectional schematic view of a cover sheet having first, second and third zones.

In embodiments herein, and described schematically in FIG. 12, the glass article can be broken into multiple zones, each zone representing a different thickness across the glass. As an example, a zone can be broken into a series of layers, noting that a single layer can be a zone in and of itself. For example, a glass thickness can be composed of one or more, two or more, three or more, four or more, and the like zones. Within each zone, one or more layers may be present to subdivide the description of the zone.

In further embodiments, the zones may represent different compositions in the glass. For example, the glass article may comprise multiple zones, with each zone being formed from a layer of glass and the layers of glass being thermoformed together to form a unitary article. At least one of the layers of glass may differ in composition or another property from another layer. As another example, the different compositions may be formed through the ion exchange process, such as by differences in density, amount, or type of ions implanted therein.

FIG. 12 illustrates an embodiment in which the different zones 1206, 1208, 1210 are formed, at least in part, through chemical strengthening. In the example of FIG. 12, a glass article 1200 has a top surface 1202 and opposing bottom surface 1204. A first zone 1206 can be adjacent the top surface 1202 and a third zone 1208 can be adjacent the bottom surface 1204. A second zone 1210 zone is between and adjacent to both the first zone 1206 and third zone 1208 and can include a chemically strengthened layer.

In embodiments, the chemically strengthened layer within the second zone is fully sandwiched between tensile stresses within the zone. As discussed previously, the chemically strengthened layer inhibits crack propagation from the top surface to the bottom surface. In aspects of the embodiment, the chemically strengthened layer comprises sodium ions. It should be appreciated that the cross-hatching shown in FIG. 12 is intended to illustrate the different zones 1206, 1208, 1210 and not material separations between the zones. Each zone may be formed of the same material (e.g., glass) although each zone may have a different density, amount, and/or type of ions implanted therein. Accordingly, the glass article 1200 may appear as a unitary article in cross-section and the cross-hatching and zone boundaries may be invisible to the naked eye, and are intended for illustrative purposes only.

Figure 13:
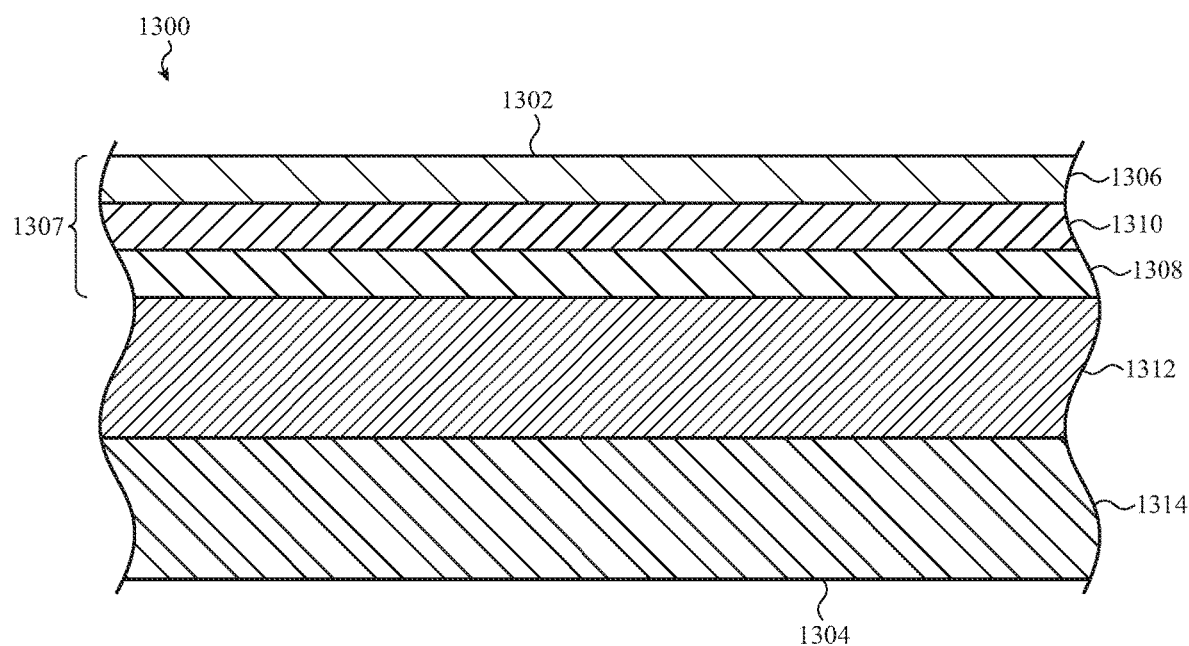
FIG. 13 shows a cross-sectional schematic view of a cover sheet having a first zone that includes an internal chemically strengthened layer within.

In other aspects, and as shown in FIG. 13, a glass article 1300 having top 1302 and opposing bottom 1304 surfaces has a first chemically strengthened layer 1306, typically composed of potassium ions. A second chemically strengthened layer 1308 is positioned in the first zone 1307 and is typically comprised of sodium ions. In some aspects, the first 1306 and second 1308 chemically strengthened layers are separated by a non-strengthened layer 1310, i.e., a layer having a lower amount of sodium or potassium ions as compared to the first and second strengthened layers 1306, 1308 (leached of sodium ions in the example above). Non-strengthened layers are under tensile stress, as compared to strengthened layers, which are under compressive stress. The second 1312 and third zones 1314 can be much as described above, including compressive stress and internal stress layers. As with the embodiment shown in FIG. 12, the cross-hatching and separation lines between layers are illustrative of the layer boundaries, rather than transitions between different materials or any particular material.

Embodiments herein include methods where an internal stress layer is formed in a glass article by chemical strengthening. The internal compressive stress layer is separated from a surface compressive stress layer, which is also formed by chemical strengthening. The two layers, internal and surface, are under compressive stress, and are separated, or at least partially separated, by a layer of glass under tensile stress. As discussed above, the internal compressive stress layer can be in a zone of glass that is toward the middle or center of the glass article through the use of localized heat. Methods herein can be used to form cover glass useful in electronic devices. For example, an electronic device can include a housing, a display positioned at least partially within the housing, and a cover glass positioned over the display. The cover glass includes an internal compressive stress layer, a surface compressive stress layer, and a tensile stress layer. The tensile stress layer separates the internal compressive stress layer from the surface compressive stress layer. In some aspects, the internal compressive stress layer, the surface compressive stress layer and tensile stress layer each has an amount of lithium ions, sodium ions, and potassium ions where the tensile stress layer has the greatest amount of lithium ions as compared to the internal compressive stress layer or surface compressive stress layer; the internal compressive stress layer has the greatest amount of sodium ions as compared to the tensile stress layer or surface compressive stress layer; and the surface compressive stress layer has the greatest amount of potassium ions as compared to the tensile stress layer or internal compressive stress layer.

In another embodiment, glass articles can be formed by thermoforming or fusing together glass layers where each layer has a different composition. A glass article is formed by layering a high stress potassium infused layer over a lithium infused layer which is simultaneously (in some embodiments) layered over a sodium infused layer. This pattern can be continued by alternating differing ion infused layers together and fusing the molten glass to form the glass article. In some aspects, the fusion is carried out by pouring successive layers of glass in a vertical direction such that the poured layers contact each other and are fused during the pouring process.

In yet another embodiment, it is contemplated that a glass article may include hard ceramic powder and alkali metal ion strengthening, both incorporated during a thermoforming process. For example, a zone of the mold could be coated with zirconia, while another zone of the mold lined with a sodium rich liner. In another example, a zone may include both a hard ceramic powder and an alkali metal ion (the same zone includes both zirconia and sodium ions). In this manner, the hardness and strength of a glass article can be modified during the same thermoforming procedure.

In other embodiments, the mold is physically modified to alter portions of the mold surface to have a different cooling rate, or capacity to exert pressure. Cooling or pressure changes on various portions of the glass sheet can modify the density of the glass network (densification) and thereby its performance, as is discussed in more detail below. In these embodiments, the property enhancement is accomplished by modification of the thermoforming parameters themselves.

Embodiments herein illustrate a thermoforming mold embodiment where the mold itself includes a number of different zones capable of differential cooling or differential pressure inducement. In these embodiments, the mold modifies an intrinsic property of the glass via the thermoforming process itself. In particular, the thermoforming process can be used to modify the density of different portions or zones of the glass article. An increase in glass density, densification, at the surface of a glass can have an effect on the hardness at the surface, for example.

A thermoforming mold can cool at different rates to induce a stress profile in the glass article to result in differential densification of the glass article. Where glass is differentially densified, the glass lattice structure or silicate network structure can be modified to provide different volumes for ions to move through, and thus surface areas of hardness or scratch resistance to occur. For example, where a mold zone is cooled at a lower rate than an adjacent zone, the slower cooling rate results in the glass being more dense at room temperature than a zone where a fast cooling rate is performed. The slower cooling rates allow structural equilibrium/relaxation in the glass to be maintained during cooling, whereas fast cooling results in the relaxation becoming fixed and therefore the density becoming fixed. A thermoforming mold can also exert pressure at different rates to induce compression in the glass article to result in differential densification of the glass article. In one zone of the mold, the pressure may be enhanced as compared to an adjacent zone of the mold. The zone where the pressure is greater will result in a glass article having a compressed glass volume in that zone and thereby show greater densification. The adjacent zone, under lower pressure, would have greater volume for ions to move through than the densified zone.

Figure 14A:
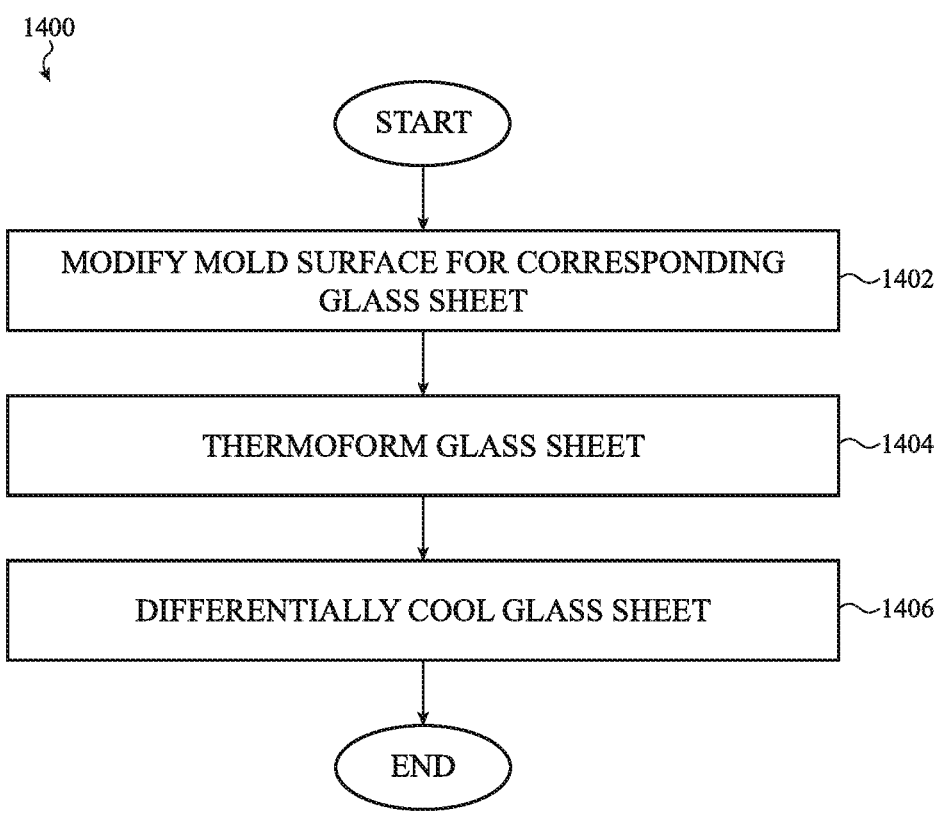
FIG. 14A shows a flow diagram for preparing a thermoformed glass article with increased density using multiple mold cooling zones.

FIG. 14A is a flow diagram illustrating production of a glass article having modified glass density 1400. A glass sheet that fits the required thickness and area for the intended use is obtained; for example, a glass sheet having a thickness and area that corresponds to a cover sheet for a smart phone. The required geometric or contoured shape is identified for the cover sheet, including zones or portions of the cover sheet in need of an increase or decrease in density. In operation 1402, an appropriate mold is modified to exhibit the required cover sheet density pattern. Molds may be modified through the use of different mold materials having different thermal conductivity, or may be altered to include cooling lines that run below the surface of the mold, such that the temperature of the cooling fluid can be modified to adjust the temperature at the surface of the mold. Control over a cooling zone in the mold allows for control over the cooling rate of the glass sheet, and thus the glass sheet density at that corresponding zone. In operation 1404, the glass sheet is thermoformed to a geometry for a particular use, using the cooling modified mold as described herein. The heated and formed glass sheet is a contoured sheet. In operation 1406, after thermoforming, the glass sheet is differentially cooled in the mold to result in a cover sheet having modified glass surface densities, and therefore hardness. A mold in accordance with embodiments described above may result in a cover sheet where the density of the glass is increased on the front surface of the cover sheet, but remains unchanged on the back surface, for example. In other examples, zones on the front or back surface of the cover sheet have locally modified glass density that corresponds to a particular need. In this example, the density of zones on the front surface can be densified where user interactions are required.

Figure 14B:
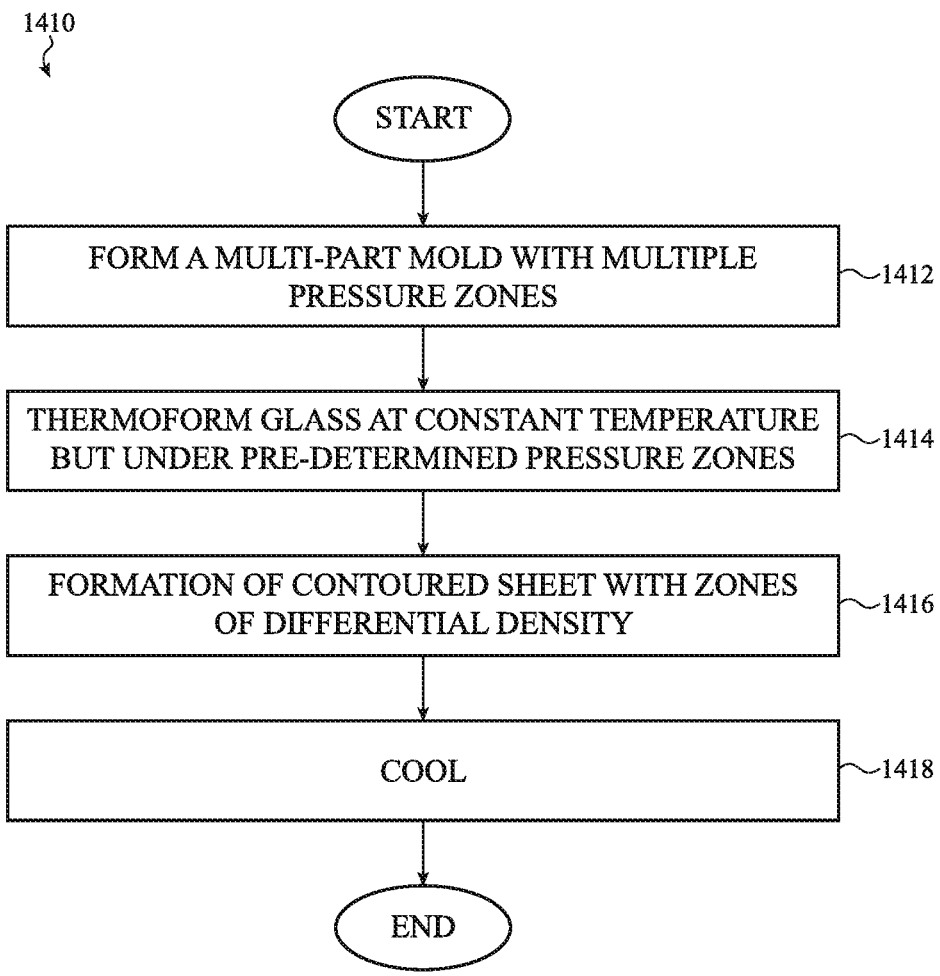
FIG. 14B shows a flow diagram for preparing a thermoformed glass with increased density using multiple mold parts under differential pressure requirements.

FIG. 14B is a flow diagram illustrating production of a glass article also having modified surface glass density 1410. A glass sheet that fits the required thickness and area for the intended use is obtained; for example, a glass sheet having a thickness and area that corresponds to a cover glass for a smart phone. The required geometric shape is identified for the final glass article, a cover sheet for example, including zones or portions of the glass article in need of an increase or decrease in density. In operation 1412, an appropriate mold is modified to exhibit the required glass article density pattern. Multi-part molds may be modified to exert differential pressure on different zones or portions of the glass sheet. In typical embodiments, a mold may be composed of multiple parts, where each part is controlled to exert an independent pressure or force. Mold parts may include a single top mold and a single bottom mold (able to exert different levels of force), or a top mold composed of two independent parts under independent control (able to exert two different levels of force through the top mold), and a single bottom mold (able to exert one level of force). Mold parts may include any combination that would be useful in forming a desired density pattern on a glass article, including molds that have multiple top and bottom parts, each under its own pressure control.

Still referring to FIG. 14B, in operation 1414, the multi-part mold is heated to above the glass transition temperature (or the mold is not heated but the glass pre-heated to above the glass transition temperature), followed by the differential application of pressure to zones of the glass sheet. In operation 1416, the differential pressure results in formation of the glass sheet contoured shape as well as differential density zones upon cooling. The formed glass sheet is a contoured sheet. As noted above, having a glass sheet with modified density allows for inclusion of higher density and scratch resistance. The contoured sheet is then cooled in accordance with embodiments herein in operation 1418.

A glass article having one or more different surface densities can be further manipulated using chemical strengthening. As noted above, chemical strengthening is limited by the saturation limit of the glass for an amount or volume of ions. At saturation, no additional compression layer or depth may be accomplished. Where glass has been densified, a more limited lattice structure or silicate network structure is available for ion diffusion. The increased density in the glass surface allows fewer ions to move inwardly, while the concentration of the ions increases at the surface of the glass. Additional chemical strengthening in a densified glass surface results in a glass surface having a shallow compression layer. Shallow compression layers with increased ion inclusion form a shallow, hard surface that is resistant to scratching, for example, are scratch-resistant. In this manner, glass sheets can be modified to include chemical strengthening on top of normal to densified glass. This allows for a wide array of glass treatments during the thermoforming process to prepare a glass article of numerous useful properties.

Another property of glass that can be modified during the thermoforming process is the tactile texture of a glass article. In one embodiment, the glass texture on a glass article is controlled by having a texture imprinted (texturing) in the glass surface during the thermoforming process (thereby forming a textured surface). In this embodiment, softened glass during the thermoforming process can be imprinted with a textured pattern, typically via a mold surface or face. The negative imprint or pattern of the mold surface is used to add texture to the glass sheet while the glass sheet is undergoing the thermoforming contour changes required for the cover sheet or other like glass article.

Figure 15:
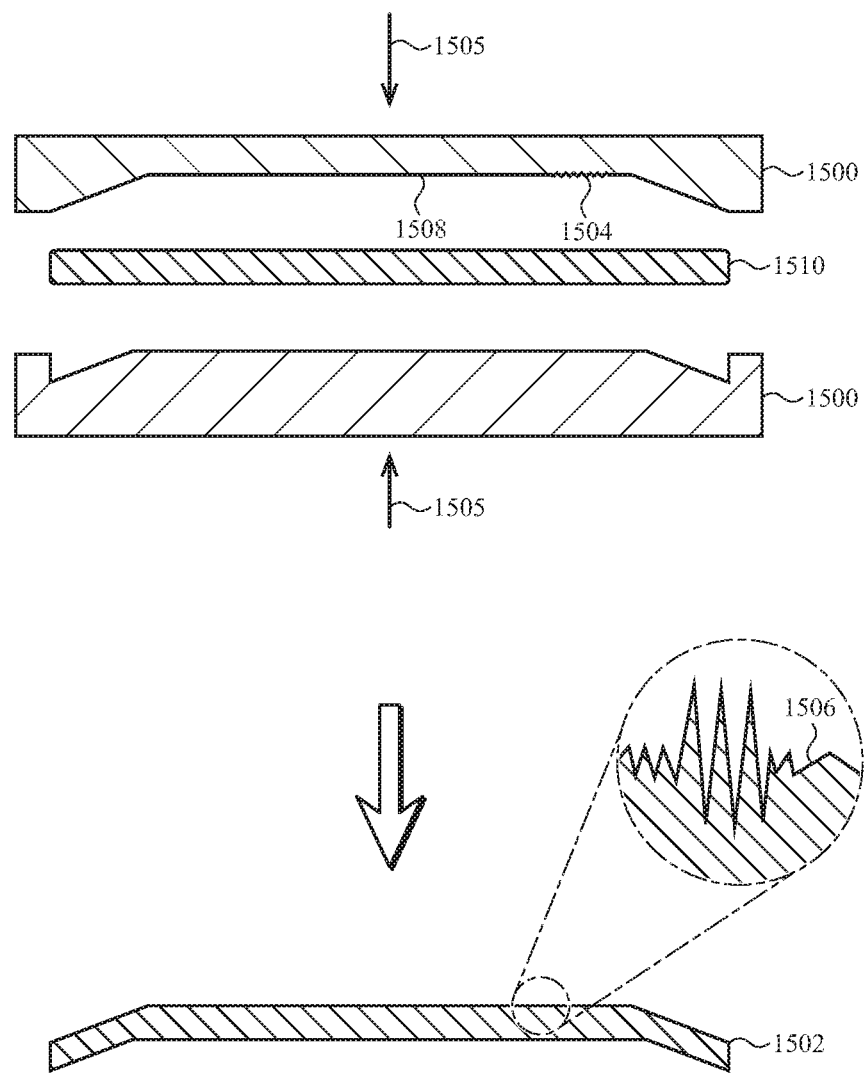
FIG. 15 shows a schematic of thermoforming a glass sheet into a contoured glass sheet have one or more zones of textured surface.

As shown in FIG. 15, a mold 1500 having a negative imprint or pattern of a desired texture is used to thermoform a desired glass article 1502 (part of a thermoform molding machine). The mold 1500 exhibits the corresponding negative texture pattern 1504 as required in the glass article 1506, as shown in the corresponding exploded view. As above, the mold surface or face 1508 having the negative imprint 1504 is heated to above the glass transition temperature and pressure applied (arrow 1505) to imprint the textured pattern on the softened glass. As noted in previous embodiments, the mold does not have to be heated, where the glass sheet 1510 is first heated to above the glass transition temperature, and then placed in the mold 1500. The mold 1500 may have portions that include the textured pattern and portions that remain smooth. As would be expected, textured and smooth portions of the mold may be adjacent to one another. In addition, various different textured patterns may form portions adjacent one another. As illustrated in FIG. 15, zones or portions of the glass surface have the imprinted texture 1506, and are cooled to form the desired glass article having the desired glass article contoured shape. The resultant glass article 1502 can have localized or global texture added to the glass surface useful for an improved tactile feel, or enhanced capability for the function of the glass surface, bonding other materials due to its enhanced surface area (e.g., Datum bonding to a frame/anti-splinter film), i.e., function.

Texture addition to a glass article herein can also allow for a glass surface having a controlled texture gradient, useful in functional attributes like Haze Control for various sensors or displays. Texture can be added in zones or portions of the glass and can be accomplished by gradients or steps. The addition of texture to a glass article during the thermoforming process is a significant advantage over chemical etching of texture into an already formed glass article, both in complexity and precision. The textured surface added by the thermoforming process is substantially free of the damage caused by chemical etching, for example, scratching or etching damage. Any useful texture can be added to a glass article herein as long as the negative imprint can be accommodated on the thermoforming mold surfaces. In typical embodiments, the glass article can exhibit an average surface roughness of from 0.5 to 10 µm and more typically 0.5 µm to 7 µm.

Figure 16:
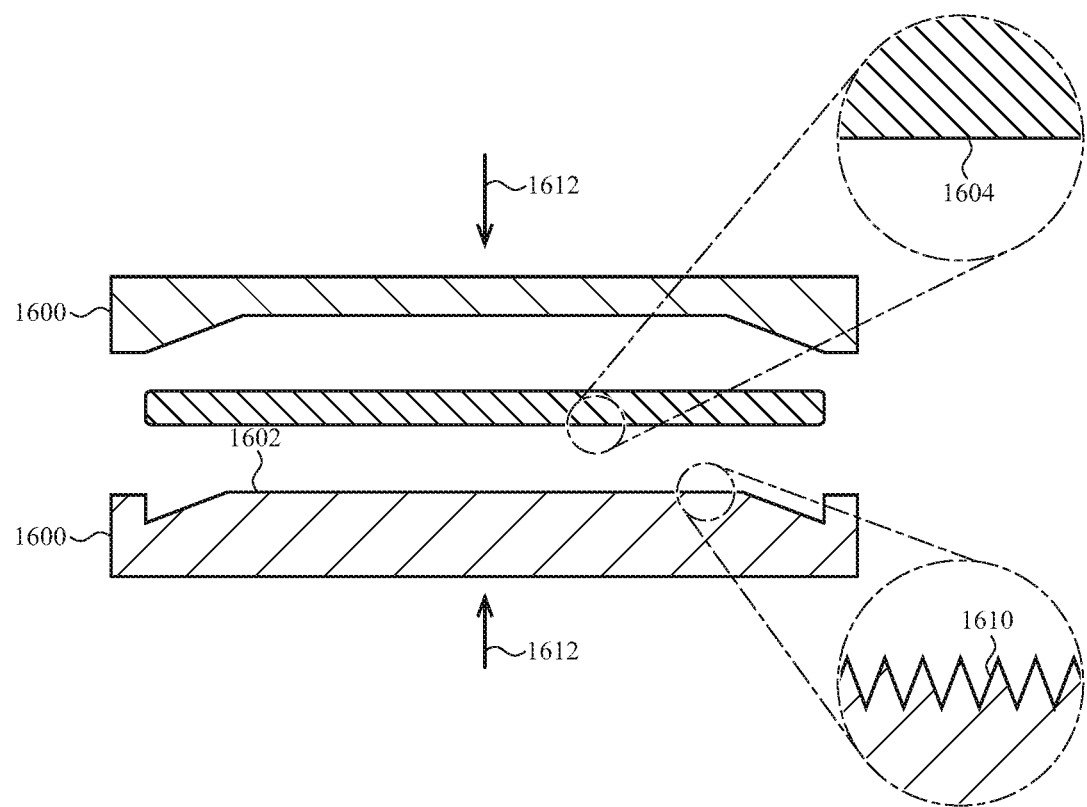
FIG. 16 shows a schematic for thermoforming a glass sheet into a contoured glass sheet having one or more zones of superhydrophobicity.

FIG. 16 shows an illustrative mold 1600 (part of a thermoform molding machine) for use in accordance with embodiments herein. A mold face 1602 is prepared, i.e., media blasted, machined, etched, to include a desired negative imprint for inclusion on the glass article surface 1604. Arrow 1612 illustrates motion of the mold pieces 1600 during thermoforming. Transfer of a texture, such as texture 1610, from the metal mold surface 1602 to the glass article surface 1604 during thermoforming provides a significant achievement in glass surface utility. It can be envisioned that inclusion of a texture to a glass article during the thermoforming process is a significant improvement over etching or machining each completed glass article after formation. This is particularly true where significant numbers of textured articles are needed. The textured surface is substantially free of damage caused by chemical etching, particularly scratching or etching damage.

Figure 17:
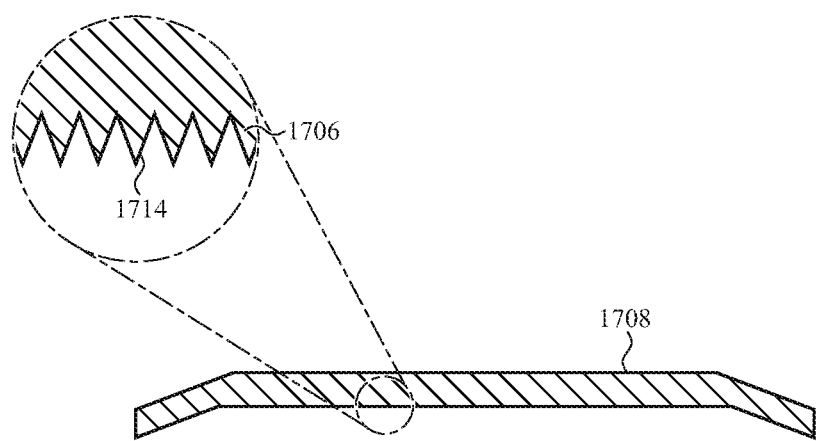
FIG. 17 shows an illustrative view of a glass surface face having a superhydrophobic imprint.

FIG. 17 shows addition of a superhydrophobic surface 1706 to a glass article 1708 using the thermoforming processes in accordance with embodiments herein. Here a negative hydrophobic pattern 1714 is formed on the mold 1600 used in the thermoforming process of FIG. 16. The negative hydrophobic pattern 1714 can be applied to all or a portion of the mold surface 1602 by laser ablation. The process for laser ablation on a mold surface is achievable due to the metal's high material opacity. However, this same laser ablation procedure has shown little positive effect when performed on glass (glass has a high transparency). The imprint pattern 1714 required for a superhydrophobic surface is on the nanoscale.

Again referring to FIG. 17, the superhydrophobic texture 1706 can include an array of protrusions having a diameter of less than 50 nm. In some cases, the protrusions have a diameter of less than 30 nm. A glass surface that exhibits a superhydrophobic surface is able to resist water, debris, and fingerprinting. The capacity to form a superhydrophobic surface in the absence of laser ablation to the glass surface is a significant advancement in the glass forming art. As for previous embodiments, the superhydrophobic surface can be included globally on the glass article, or can be included only on select zones, dependent on the targeted use.

Embodiments herein also include thermoforming or fusing two or more dissimilar materials together so as to join them and form one unitary material with different bulk material properties in different layers, zones, or regions. As above, the joining occurs while the unitary material is being thermoformed into a contoured desired shape. Dissimilar materials herein can be glass articles having different material properties, i.e., coefficient of thermal expansion, hardness, strength, Young's modulus, and the like, or can be two different materials all together, for example, joining a glass sheet with a ceramic sheet. The materials can be the same shape, size, and thickness, or can be of different shapes, sizes, and thicknesses. Typically, the dissimilar materials have a joining surface that is flat and smooth and allows for the thermoforming process to integrate the contacting surfaces into one co-material, but. where the surfaces do not form sufficient contact, a cladding layer may be sandwiched between the dissimilar materials to allow for formation of a unitarily joined and contoured end material.

Figure 18:
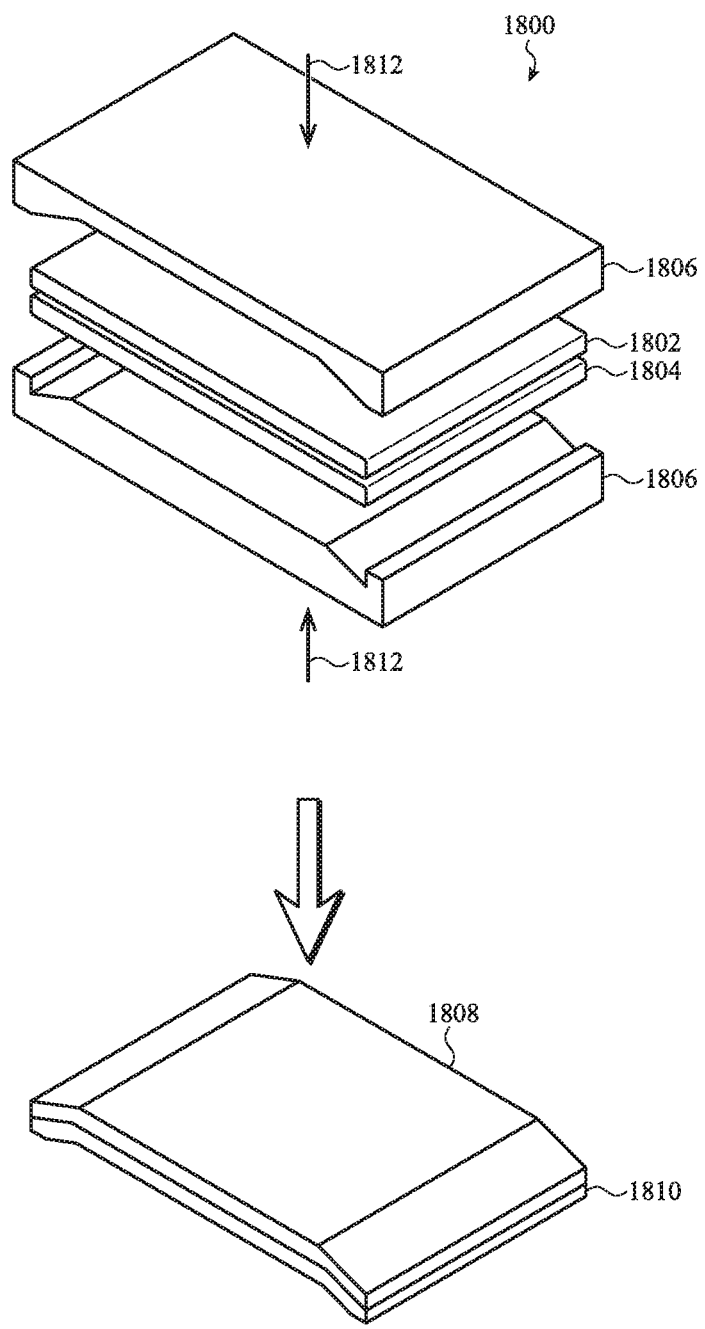
FIG. 18 shows a schematic of thermoforming two dissimilar materials into a bonded contoured sheet in accordance with an embodiment herein.

FIG. 18 illustrates a simplified schematic of thermoforming two dissimilar materials into a single unitary part having a desired contoured shape in accordance with embodiments herein 1800. Although this embodiment can be applied to numerous types of materials, it will be discussed in relation to glass sheets having dissimilar material properties or to a glass sheet and ceramic combination. Also, it can be envisioned that more than two dissimilar materials can be thermoformed into a single part having a desired shape; however, the description will be limited to two with the understanding that additional materials can be added to the thermoforming process, for example, 3, 4, 5, and the like, to form a single part.

Referring to FIG. 18 again, the two dissimilar materials, top 1802 and bottom 1804, are layered on each other and positioned in a mold (part of a thermoform molding machine) 1806 to be contoured under heat and pressure. The two materials, 1802 and 1804, must be heated to above each material's glass transition temperature, but not above either material's melting temperature. As above, the heating of the materials can be performed in a vacuum. Heating the two materials, for example two different glass sheets, above each material's glass transition temperature will result in the two materials being joined or bonded into one single sheet or part 1808 along the contact surface 1810. As noted above, the contact surface 1810 of each glass sheet must be smooth. This same state of the two materials 1802, 1804 also allows for the joined sheet to be receptive to pressure (arrow 1812) that allows for contour modifications.

Figure 19:
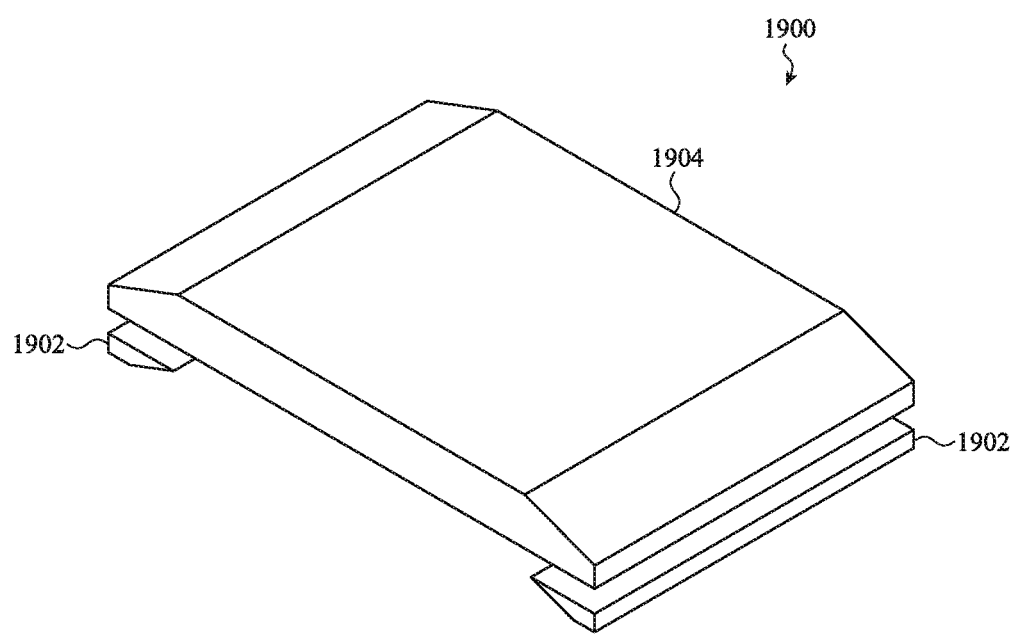
FIG. 19 shows a schematic of thermoforming two dissimilar materials into a bonded contoured sheet in accordance with an alternative embodiment herein.

FIG. 19 illustrates joining two dissimilar materials that have different material properties and sizes/thicknesses 1900. Here, the second material 1902 is joined to only a portion or zone of the first material 1904, in order to provide a particular outer geometer, for example. It can be imagined that joining multiple layers of material, having differing material properties, shapes and thicknesses, provides a significant advantage over conventional machining or post production processes. In this embodiment, a matrix of different opportunities can be utilized to form an appropriate final part having the correct shape, material property, and thickness.

Figure 20:
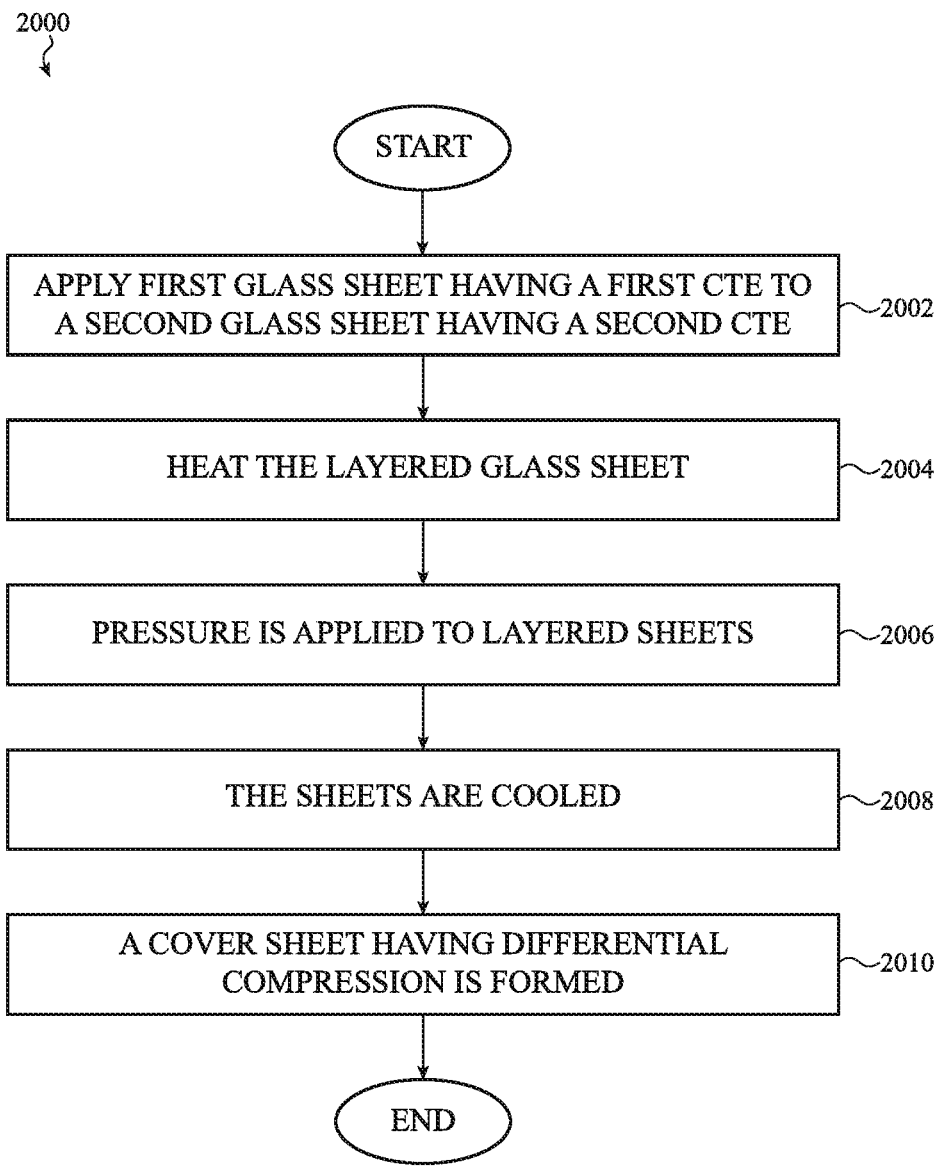
FIG. 20 shows a flow diagram for preparing a thermoformed glass article having two separate glass sheets bonded together, each glass sheet having a different coefficient of thermal expansion (CTE)

FIG. 20 is a flow diagram illustrating a process for bonding two glass sheets together to form a cover sheet having a top surface under compression as compared to a bottom surface 2000. In this embodiment, and in operation 2002, the two glass sheets having differing coefficients of thermal expansion (CTE) are joined. In operation 2004, the two sheets are heated under pressure and contract differently due to their differences in CTE, while the unitary part is thermoformed to a specified contoured shape. In operation 2002, a first glass sheet having a low CTE is layered on top of a second glass sheet having a high CTE (CTE is relative to each other). The joining surface is smooth. In operation 2004, the two glass sheets are heated to above the glass transition temperature for each sheet. In operation 2006, pressure is exerted by the mold faces to join the two glass sheets together and form a desired shape of the now joined cover sheet. The exerted pressure and heat must also be sufficient to allow for atomic bonding between the two contacting glass sheets. In operation 2008, the cover sheet is cooled, where the second glass sheet, having the higher CTE, contracts to a greater degree than the material of the first glass sheet (lower CTE). In operation 2010, because the two materials are joined together via the thermoforming process, the interface prevents the second glass sheet material from fully contracting, but results in the first glass sheet material, i.e., the outer surface of the cover sheet to be under compression. The outer surface of the cover sheet will have asymmetric surface compression that acts to protect the surface from damage introduction. The inner material of the cover sheet is away from the environment and at lower risk of damage.

Figure 21:
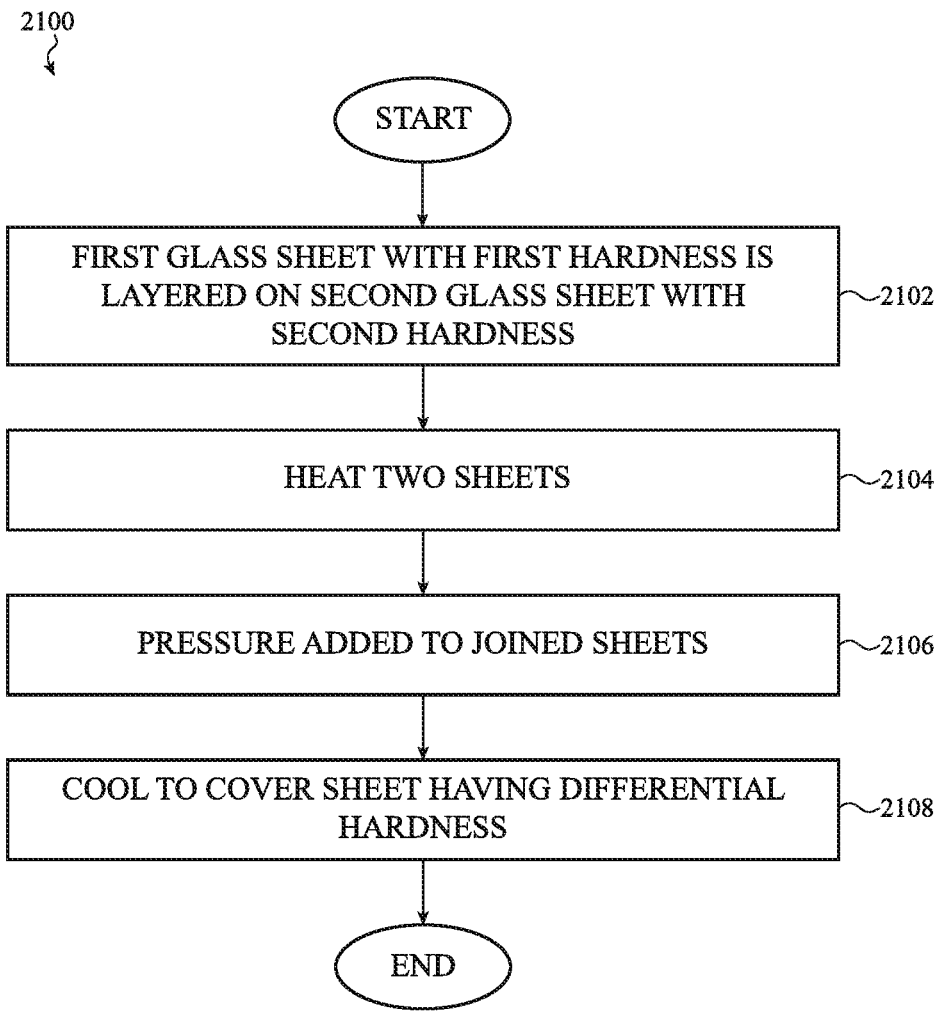
FIG. 21 shows a flow diagram for preparing a thermoformed glass article having two separate glass sheets bonded together, each glass sheet having a different hardness.

FIG. 21 is a flow diagram illustrating a process for bonding two glass sheets together to form a cover sheet having a top and bottom surface with differing hardnesses 2100. In this embodiment, the two glass sheets having different hardnesses are joined through thermoforming to form a cover sheet with a desired contoured shape. In operation 2102, the first glass sheet having a high material hardness is layered on top of a second glass sheet having a lower material hardness. As in previous embodiments, the joining surface must be smooth. In operation 2104, the two glass sheets are heated to above the glass transition temperature for each sheet. In operation 2106, pressure is exerted by the mold faces to join the two glass sheets together and form a desired shape of the now unitary cover sheet. As above, the pressure and heat must be sufficient to allow for atomic bonding between the two hardness materials. In operation 2108, the cover sheet is cooled forming a unitary material where the top surface (corresponding to glass sheet one) is able to resist damage to a greater extent than the bottom surface (corresponding to glass sheet two). The hardness of glass sheet one is consistent with the needs of an exterior surface of an electronic device. The second sheet can be optimized for price and processing since it is located on the interior side of the electronic device. In this embodiment, the thickness of each sheet can also be optimized to allow for damage protection on the upper surface of the cover sheet; for example, the first sheet could be 0.5 mm, while the second sheet could be 2 mm thick.

Figure 22:
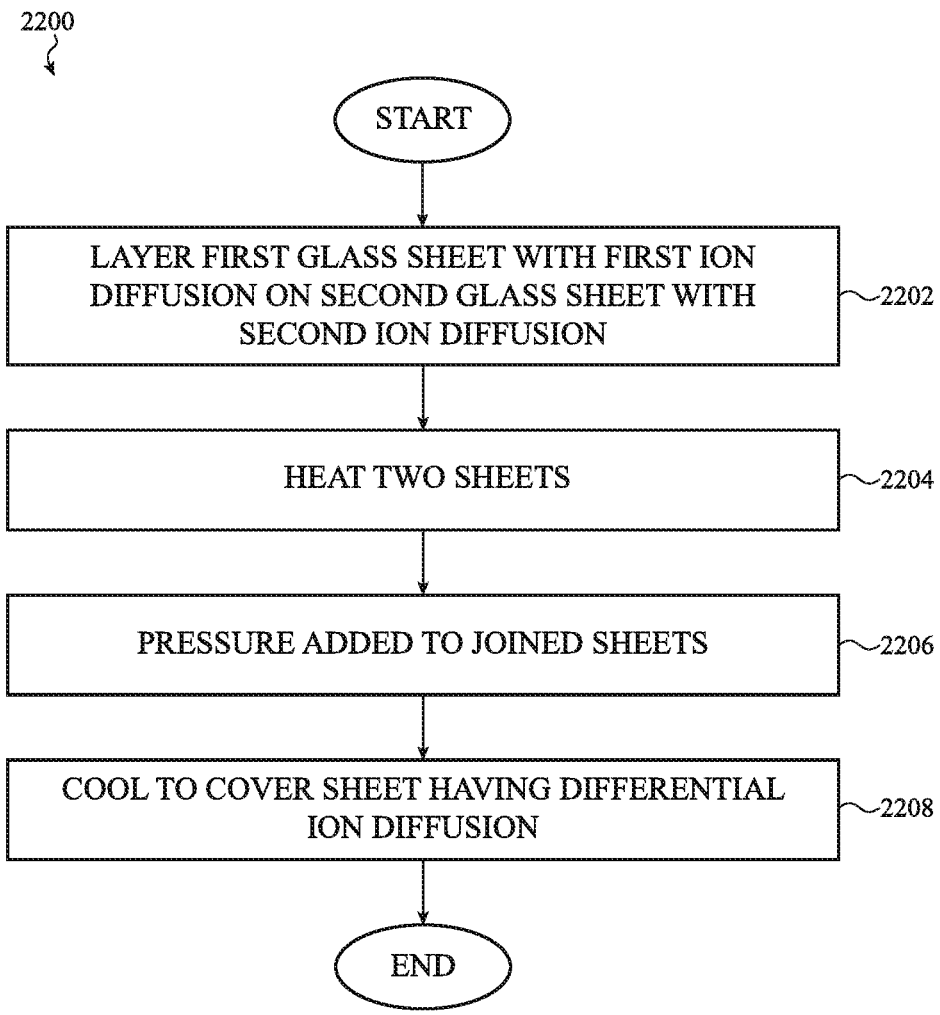
FIG. 22 shows a flow diagram for preparing a thermoformed glass article having two separate glass sheets bonded together, each sheet having a different capacity for ion diffusion.

FIG. 22 is a flow diagram illustrating a process for bonding two glass sheets together to form a cover sheet having a top and bottom surface with differing capacity for ion diffusion 2200. Ion diffusion can be controlled by a number of parameters which are all envisioned to be within the scope of the present disclosure; for example, the composition and ion placement in the glass, density of the glass, ion limiting coatings on the glass, and the like. In this embodiment, the two glass sheets having different ion diffusion capacity are joined together via thermoforming to form a cover sheet with a desired contoured shape. In operation 2202, the first glass sheet, having rapid ion diffusion, is layered on top of a second glass sheet, having lower ion diffusion (relative to each other). As in previous embodiments, the joining surface must be smooth. In operation 2204, the two glass sheets are heated to above the glass transition temperature for each sheet. In operation 2206, pressure is exerted by the mold faces to join the two glass sheets together, and form a desired shape of the now unitary cover sheet. As above, the pressure and heat must be sufficient to allow for atomic bonding between the two hardness materials. In operation 2208, the cover sheet is cooled forming a unitary material where the top surface (corresponding to glass sheet one) has a greater capacity to be chemically strengthened than the bottom surface (corresponding to glass sheet two).

Cover sheets formed as described in FIG. 22 can be further processed by alkali metal solution bath treatments. For example, upon cooling, the cover sheet, having dissimilar ion diffusion surfaces, would be subjected to a sodium bath to allow for asymmetric diffusion of sodium ions into the top surface of the cover sheet, as compared to the lower cover sheet surface. Further, potassium ion bath treatment may also be utilized to add compression to the top surface and further strengthen the top or outer surface of the cover sheet as compared to the bottom or inner surface. Asymmetric strengthening is particularly advantageous for cover sheets, where a compression budget exists across a thickness of all glass, but can be maximized to the outer surface—essentially taking some of the compression from the bottom and moving it to the top to keep the budget equal (as compared to symmetrical strengthening, where the two sides must be equally compressed, using the same or equal compression budget, the case where both glass sheets have the same capacity for ion diffusion). As discussed above, any number of chemical strengthening steps can be taken that take advantage of the differential ion diffusion capacity of the joined glass materials.

Figure 23:
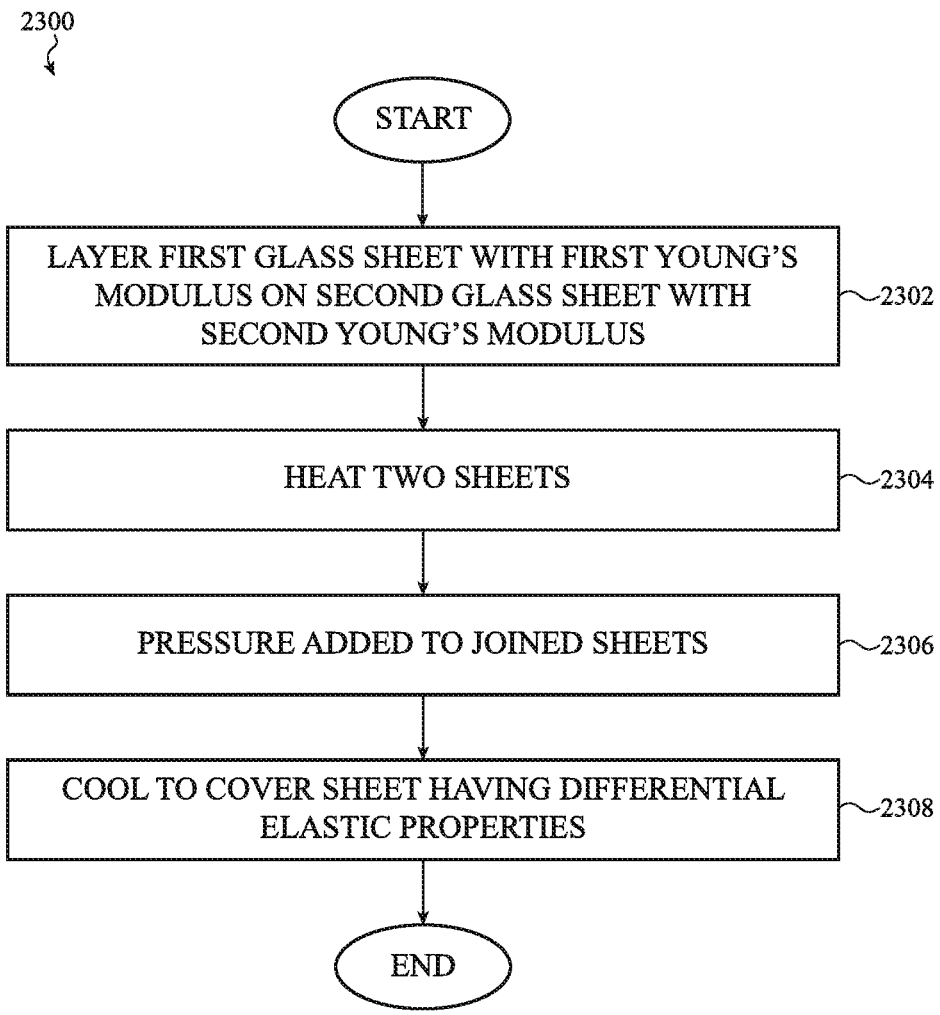
FIG. 23 shows a flow diagram for preparing a thermoformed glass article having two separate glass sheets bonded together, each sheet having a different Young's modulus.

FIG. 23 is a flow diagram illustrating a process for bonding two glass sheets together to form a cover sheet having a top and bottom surface with differing Young's modulus (elastic modulus) 2300 or another different mechanical property. In this embodiment, the two glass sheets having different elastic deformation properties are joined together via thermoforming to form a unitary cover sheet with a desired contoured shape. In operation 2302, the first glass sheet, having a high Young's modulus, is layered on top of a second glass sheet, having a lower Young's modulus (relative to each other). As in previous embodiments, the joining surface must be smooth. In operation 2304, the two glass sheets are heated to above the glass transition temperature for each sheet. In operation 2306, pressure is exerted by the mold faces to join the two glass sheets together and form a desired shape of the now unitary cover sheet. As above, the pressure and heat must be sufficient to allow for atomic bonding between the two glass sheets. In operation 2308, the cover sheet is cooled forming a unitary material where the top surface (glass sheet one) resists damage introduction due to its higher elastic deformation properties, whereas the inner or lower surface (glass sheet two) is able to deflect or flex to a relatively greater extent. The lower glass sheet will be positioned on the inside of the enclosure (see FIG. 3), where its lower Young's modulus will allow it to internally bend during failures commonly seen during drop events.

Figure 24:
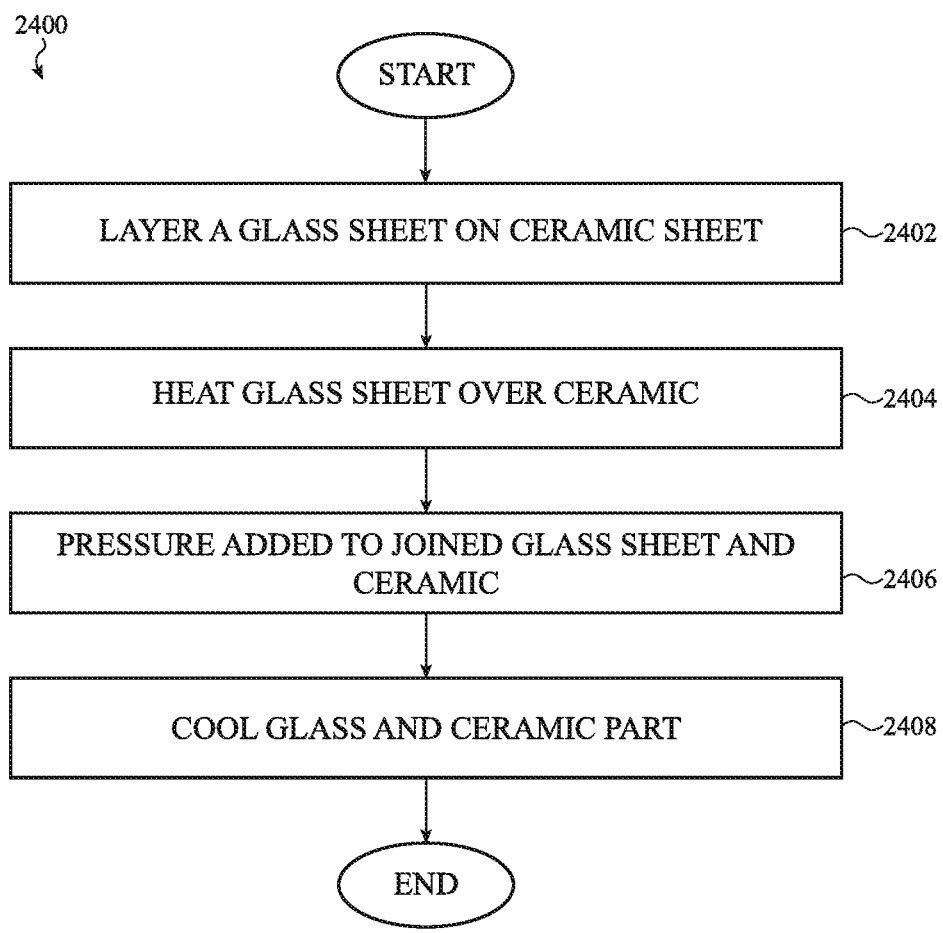
FIG. 24 shows a flow diagram for preparing a thermoformed material having one glass sheet and one ceramic sheet bonded together.

FIG. 24 is a flow diagram illustrating a process for bonding a glass sheet to a ceramic sheet 2400. In this embodiment, the ceramic sheet or portion acts as a foundation for the surface glass sheet. Referring to FIG. 19, briefly, the ceramic material can be a ceramic ring with an appropriate geometry preloaded into a mold. Here the ceramic is acting as a "ceramic foot" on which the glass sheet will be overlaid.

In FIG. 24, and in operation 2402, the first glass sheet, having an appropriate hardness and strength to act as the outer surface of a cover sheet, is layered on top of the underlying ceramic footer. As in previous embodiments, the joining surface must be smooth. In operation 2404, the glass sheet and ceramic footer are heated to a temperature that allows thermoforming of the glass to the pre-formed ceramic. In operation 2406, pressure is added to contour the glass sheet to a desired shape (again refer to FIG. 19) on the ceramic. In operation 2408, the glass and ceramic cover sheet is cooled, forming a curved glass surface that can be integrated directly into a housing body.

Embodiments related to joining two or more dissimilar materials using the thermoforming processes herein may include a sandwiched cladding layer. Where the two dissimilar materials, for example, a ceramic and glass sheet, do not form a smooth contact surface, an incomplete bond will form. Incomplete bonds between otherwise thermoformed materials results in an unacceptable air gap. To overcome this obstacle and allow thermoforming, a cladding layer can be sandwiched between the two dissimilar materials.

Figure 25A:
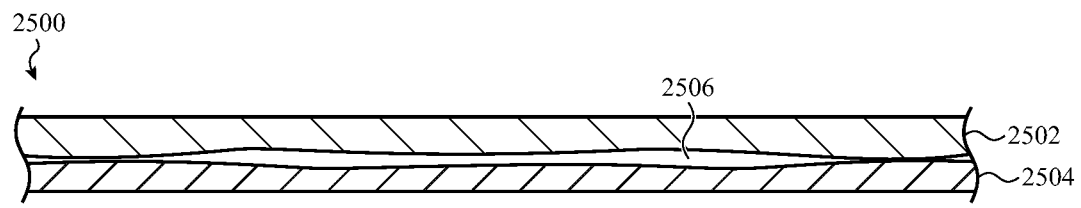
FIG. 25A shows a schematic of two glass sheets with uneven surfaces in need of joining.

FIG. 25A shows a cross-section of two glass sheets that do not form a smooth joining surface 2500. A top sheet 2502 and a bottom or base sheet 2504 are layered together, but air gaps exist between the surfaces of each respective sheet 2506. Where the two sheets undergo thermoforming, with an imperfect joining, the air gaps that forms in the cover sheet minimizes the utility of the cover sheet.

Figure 25B:
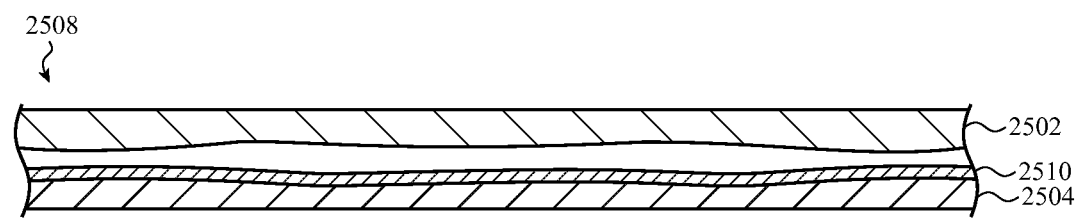
FIG. 25B shows a schematic of the two glass sheets in FIG. 21A having a cladding layer positioned therebetween.
Figure 25C:
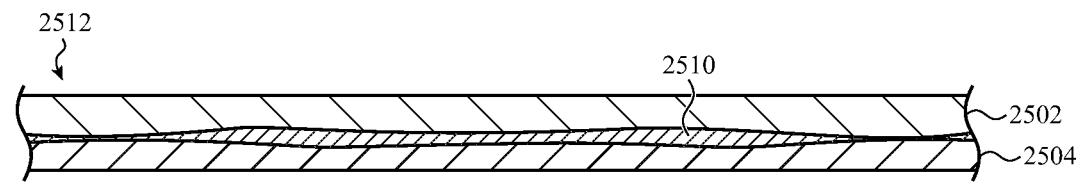
FIG. 25C shows a schematic of thermoforming two dissimilar materials with a sandwiched cladding layer into a bonded contoured sheet in accordance with an embodiment herein.

FIG. 25B shows a cross-sectional schematic of two glass sheets with a sandwiched cladding layer 2508 positioned therebetween. A cladding layer 2510 is positioned between the two glass sheets, 2502 and 2504, such that the cladding layer 2510 acts to fill in the surface gaps between the two glass sheets 2502, 2504. The cladding layer 2510 eliminates air gaps and enhances the bonding formed between the two glass sheets 2502, 2504 during the thermoforming process 2512, as shown in FIG. 25C. In FIG. 25C, a cladding layer 2510 is selected to have enhanced plastic flow at the thermoforming temperature, necessary for the top 2502 and bottom (base) 2504 glass sheets. The cladding layer 2510 need not provide any additional mechanical properties but rather will remain at the neutral axis of the formed cover sheet. It is also envisioned that multiple cladding layers can be positioned between the two glass sheets, each cladding layer having a different refractive index. For example, a first cladding layer and a second cladding layer can be positioned such that the cumulative refractive index for the two layers is 0. In this embodiment, one or more, two or more, three or more, and the like, cladding layers can be combined to obtain a combined cladding layer with an appropriate index of refraction.

In some embodiments, the cladding material is an oxide, like calcium oxide. In other embodiments, the cladding material is a transparent or colored polymer (depending on the use). Typically, cladding layers are added between a glass sheet and ceramic material, or when one or both of the two glass sheets has a surface roughness that prevents atomic bonding during the thermoforming process.

In accordance with embodiments herein, cladding layers can be joined to the exterior surface(s) of cover sheets herein as well. A cladding layer can be coated to the exterior surface(s) of a glass sheet during the thermoforming processes described herein. The cladding layer can also be added to the exterior surface of either the first glass sheet or second glass sheet during the joining of two materials discussed herein. In this embodiment, the cladding layer is deposited on the exterior surface of a glass sheet so as to fill in any defects or gaps in the glass sheet. The cladding layer can be used in conjunction with a cladding layer positioned between two glass sheets to remove gaps, or can be used on two glass sheets or a glass and ceramic sheet joined together in the absence of a cladding layer. The cladding layer typically is formed from a glass material that has a melting point lower than the melting point of the exterior surface of the glass sheet.

As discussed above, chemical strengthening of glass relies upon ion exchange. During a typical ion exchange, a diffusion exchange occurs between the glass article and the ions of interest, typically sodium or potassium. For example, sodium ions in an enhancement process diffuse into the surface of exposed glass, allowing a build-up of sodium ions in the surface of the glass by replacement of other ions found in the glass. Further, exposure of the sodium enhanced glass article to potassium ions allows the newly arrived sodium ions to be replaced by potassium ions in surface areas to a greater extent than sodium ions found more toward the interior or middle of the glass article. As a result, the potassium ions replacing the sodium ions form a compression layer near the surface of the glass article (essentially the larger potassium ions take up more space than the exchanged smaller sodium ions). Depending on the factors like glass temperature, ion concentration, glass composition, etc., a surface compression layer as deep as about 10-100 microns, and more typically 10-75 microns, can be formed in the glass article. As previously discussed, this zone of compression can be directed away from the surfaces of the glass article and toward the center of the glass article to form internal compression layers. However, an amount of chemical strengthening input into a glass is limited as a glass article only has so much volume to exchange before the glass is subject to an overabundance or imbalance of stress.

Figure 26:
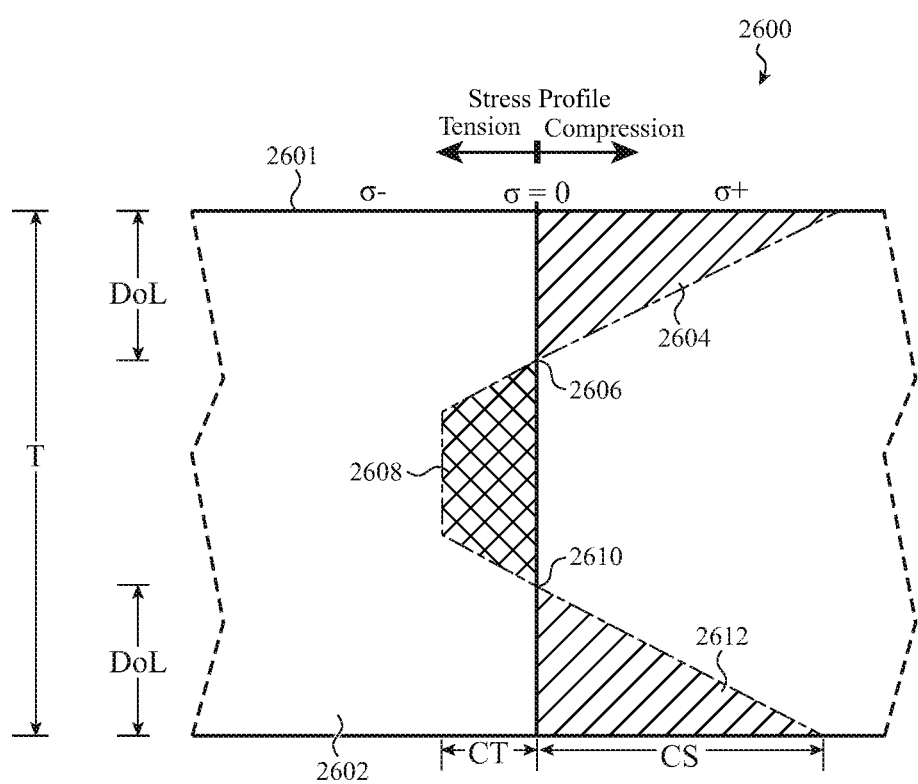
FIG. 26 shows a stress profile plot for a symmetrically strengthened glass article.

FIG. 26 shows a sample stress profile for a sample glass article. The diagram shows an initial tension/compression stress profile. The initial tension/compression stress profile may result from an initial exchange process to symmetrically strengthen the surface region of glass. A minus sigma legend indicates a profile region of tension, while a plus sigma legend indicates a profile region of compression. The vertical line (sigma is zero) designates crossover between compression and tension.

In FIG. 26, thickness (T) of the glass article is shown. The compressive surface stress (CS) of the initial tension/compression stress profile is shown at the surface of the glass article. The surface compressive stress layer for the glass article has a compressive stress layer depth (DoL) that extends from surfaces of the glass article toward a central region. Initial central tension (CT) of the initial tension/compression stress profile is at the central region of the glass article in this example.

Still referring to FIG. 26, the initial compressive stress has a profile with peaks at the surfaces 2601, 2602 of the glass article 2600. Thus, the initial compressive stress layer 2604 is at its peak at the surface of the glass article. The initial compressive stress profile shows decreasing compressive stress as the compression layer depth extends from surfaces of the glass article toward the central region of the glass article. The initial compressive stress continues to decrease going inward until crossover 2606 between compression and tension occurs. After crossover 2606 between compression and tension, a profile of the central tensile stress layer 2608 extends into the central region shown in the cross-sectional view of the glass article. The central tensile stress layer 2608 abuts a lower or bottom compressive stress layer 2612 at point 2610, where the stress profile of the glass article changes from tension to compression. As with prior embodiments, stress layer 2604 is shown in FIG. 26 as extending from and contiguous with the top surface 2601, but in some embodiments the stress layer 2604 may be contiguous with, but not extend from, the top surface 2601. The same is true of the stress layer 2612 with respect to the bottom surface 2602.

Typically the combination of stresses on a glass article are implemented to avoid failure and maintain safety, e.g., if there is too much stress in a glass article, the resultant energy will eventually cause the glass article to break or fail. Such failure may cause the glass to shatter rather than simply break. As such, a glass article has an amount of compressive stress versus tensile stress that allows for a reliable glass article.

Note in FIG. 26 that ion diffusion inward from both surfaces in the glass article has resulted in a continuous transition between compression and tension. In order to overcome the limitations on a particular glass article's compressive stress, embodiments herein relate to joining two or more glass sheets using the thermoforming processes and sandwiching a barrier layer therebetween to limit or prevent ion diffusion (see below).

Figure 27:
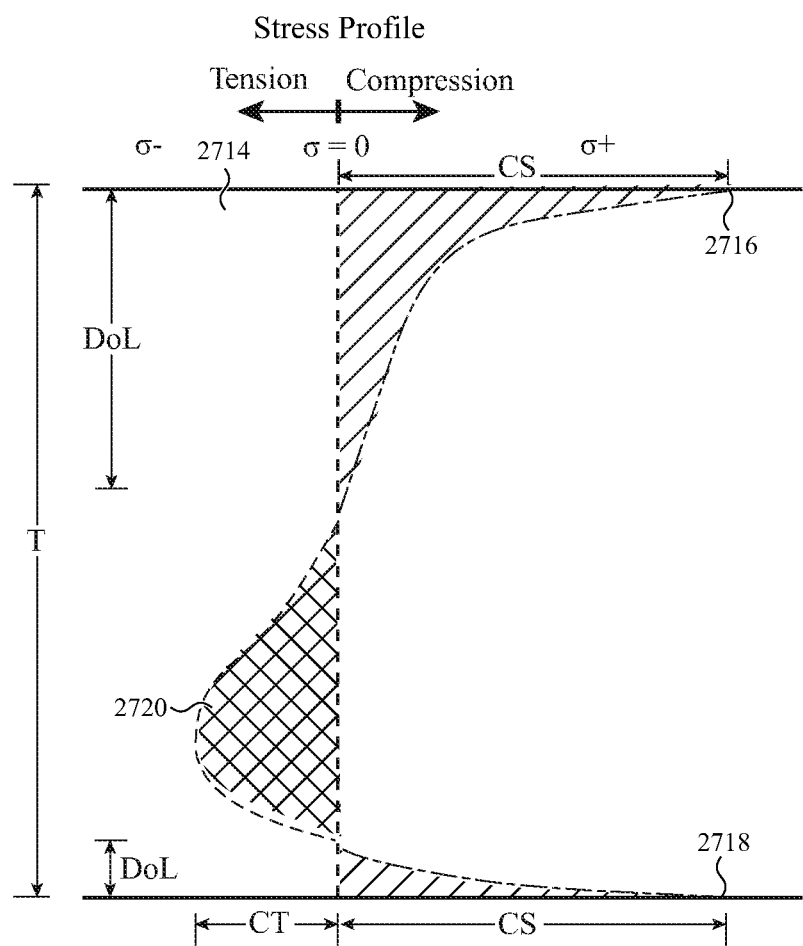
FIG. 27 shows a stress profile plot for an asymmetrically strengthened glass article.

FIG. 27 shows an asymmetric stress profile for a glass article 2714 where the top surface 2716 shows a more significant compressive stress (CS) and compressive stress layer depth (DoL) than the bottom surface 2718. Note that the top surface 2716 would, in this case, be more durable and impact resistant than the bottom surface 2718. Also note that there is an acceptable amount of stress, and the inclusion of additional compressive stress on the surface may be compensated for by a much shallower depth of compression on the bottom surface. In the absence of the compensation, the tensile force 2720 would be extended to the left and ultimately result in a highly unsafe glass article.

The limitations, as shown in FIG. 26 and FIG. 27, are that a glass article can only incorporate a limited amount of stress for a particular thickness of glass. The stress can be symmetric or asymmetric with relation to the glass surfaces, can be at the surface(s), internal or both, and can be typically dependent on the progression of ion diffusion within the glass, which often is continuous and difficult to manipulate.

As previously discussed, in embodiments a glass article comprises multiple zones and a barrier layer between at least two of the zones. For example, a zone may be formed by a glass layer which is thermoformed with one or more additional glass layers and the barrier layer to form the glass article. The barrier layer limits diffusion of ions between adjacent zones. The glass layer may prevent diffusion of ions during thermoforming, in an ion exchange process following thermoforming, or a combination thereof.

In embodiments, a glass article, such as a glass cover sheet, comprises a first zone having a first material property, a second zone having a second material property, and a barrier layer between the two zones. For example, the first zone may comprise a first glass layer having a first ion diffusion rate, the second zone may comprise a second glass layer having a second ion diffusion rate, and the barrier layer may limit ion diffusion from the first glass sheet to the second glass sheet. The glass article may be formed by positioning the barrier layer between a first glass sheet having the first ion diffusion rate and the second glass sheet having the second ion diffusion rate, applying heat and pressure to both the first and the second glass sheets to bond the sheets together through the first barrier layer, and cooling the glass article.

Embodiments herein also include a glass article comprising a first zone having a first material property, a second zone having a second material property, and a third zone having a third material property. The glass article includes a top surface and an opposing bottom surface. The first zone may be contiguous with the top surface and the third zone may be contiguous with the bottom surface, with the second zone positioned between the first zone and the third zone. A barrier layer may separate the first zone from the second zone. In further embodiments, the glass article further comprises a second barrier layer between and separating the second zone and the third zone. The first zone, the second zone, the third zone, and the barrier layer(s) may be thermoformed together.

In additional embodiments, the that has a first ion diffusion rate, and a third zone adjacent the bottom surface having a third ion diffusion rate. A second zone is fully between the first and third zones and has a second diffusion rate. As previously discussed, the first zone may comprise a first glass layer, the second zone may comprise a second glass layer, and a third zone may comprise a third glass layer. A first barrier layer at least partially separates the first zone from the second zone and limits ion diffusion between the two zones. In some aspects, the first barrier layer can completely separate the first zone from the second zone. The first barrier layer can be composed of silicon nitride or silicon dioxide, for example. In other aspects, a second barrier layer can at least partially separate ion diffusion between the second zone and the third zone. The second barrier layer can also completely separate the second and third zones, and can be composed of silicon nitride or silicon dioxide, for example.

Embodiments herein include a thermoformed glass article that incorporates multiple layers of glass, each layer of glass having been prepared to have a predetermined thickness and a predetermined chemical strength profile. Designed glass articles can include two, three, four, five, or more sheets of glass that are thermoformed (e.g., fused) into a unitary glass article. Each glass layer can have a unique mechanical property, for example, compressive stress or strength. In order to prevent or limit glass layers from undergoing further ion diffusion during thermoforming or heating, barrier layers are imposed or sandwiched between each layer. Each barrier layer ensures that ions within each glass sheet remain in that glass layer during and after thermoforming. Barrier layers also ensure that a material property (e.g., strength, compressive or tensile stress, ion density, depth of layer, resistance to impact, Young's modulus, resilience, and any other mechanical property discussed herein) of one glass sheet is limited to, or otherwise prevented from affecting, leaching into, or entering the adjacent or contiguous glass sheet.

Figure 28A:
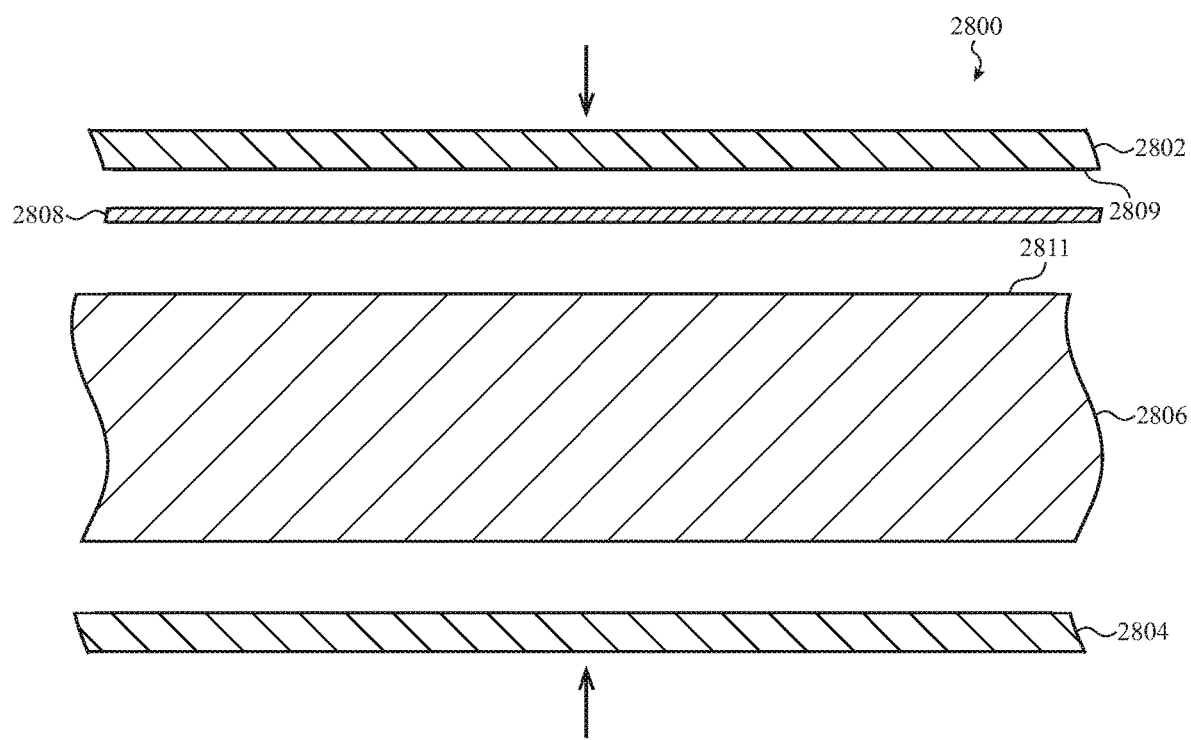
FIG. 28A shows an exploded view of a cross-sectional schematic of a glass article having three sheets and a barrier layer positioned prior to thermoforming into a unitary glass article.
Figure 28B:
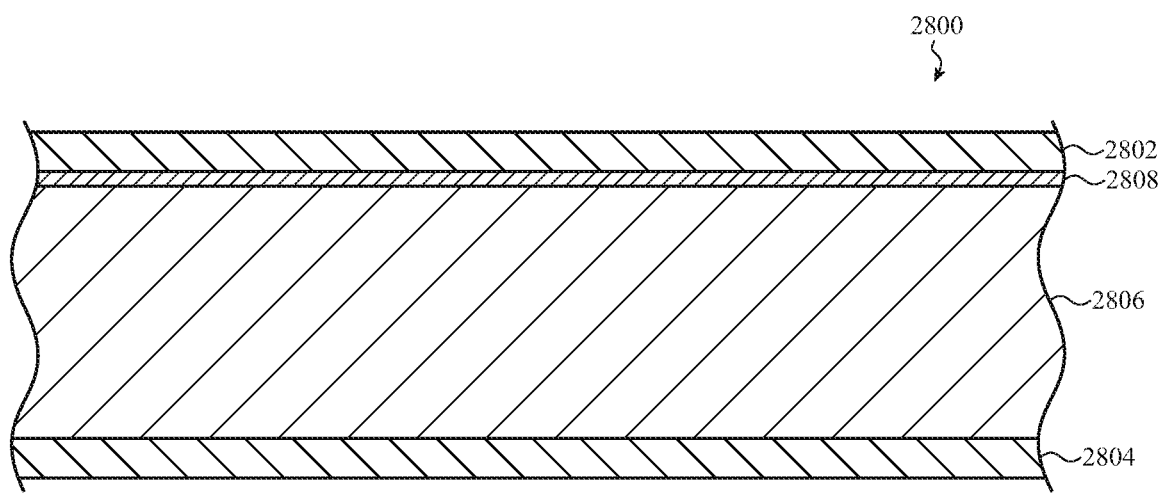
FIG. 28B shows the cross-sectional view of the unitary glass article in FIG. 28A.

FIG. 28A and FIG. 28B show a cross-sectional view of a glass article 2800 including three glass sheets, with a barrier layer between a first glass sheet and a second glass sheet. FIG. 28A is an exploded view of the glass article prior to addition of heat and pressure, while FIG. 28B shows the unitary article.

In FIG. 28A, a top glass sheet 2802 has been chemically strengthened to enhance surface compression and therefore have a first mechanical property. The glass sheet is kept to a thickness that reduces or minimizes diffusion of ions toward a center of the glass sheet. In some embodiments, the bottom surface of the top glass sheet is masked during chemical strengthening, such that only the top surface has significant surface compression (for example, an asymmetric chemical stress profile). In alternative embodiments, the top sheet 2802 is chemically strengthened from both surfaces to provide two compressive zones to the top sheet 2802 (for example, a symmetric chemical stress profile). A bottom glass sheet 2804 may be similarly chemically strengthened to have its own mechanical property. The middle glass sheet 2806 is designed for the unitary glass article's use as well and has its own unique mechanical property. For example, the thickness of the middle glass sheet 2806 can be variable, as well as the amount and symmetry of chemical strengthening within that sheet. By layering and positioning the glass sheets, 2802, 2804, 2806 on each other, and then heating and compressing via thermoforming, a unitary glass article 2800 can include specific zones corresponding to the original three glass sheets. Conventional chemical strengthening procedures will not allow for the depth of diffusion or complexity of stress layers given the limitations of glass volume, ion diffusion and the inherent stress budget of glass.

As shown in FIGS. 28A and 28B, a barrier layer 2808 can be interposed between glass sheets 2802, 2806 in order to limit or prevent ion diffusion during the thermoforming process. In the absence of a barrier layer, chemical ions can co-mingle between glass sheets under increased heat and pressure. For example, without a barrier layer, ions in the bottom surface 2809 of the top glass sheet 2802 may diffuse into the top surface 2811 of the middle glass sheet 2806 during the thermoforming process. The mechanical property of the top glass sheet 2802 may thus change as ions leach into the middle glass sheet 2806, which also may have a mechanical property (or multiple properties) changed. The ion diffusion results in any internal stress zone at the border between the top glass sheet 2802 and middle glass sheet 2806 becoming a broader and more diffuse stress zone that may extend into, or overlap, both the top and middle sheets. However, a barrier layer 2808 keeps the ions in the top glass sheet in the top glass sheet 2802, and the ions in the middle glass sheet in the middle glass sheet 2806, for example. In addition, barrier layers do not have compressive stress and therefore act as a balance between other integrated compressive stress layers. This also ensures that the mechanical property developed in the top glass sheet and middle glass sheet remain in their respective sheets.

Figure 28C:
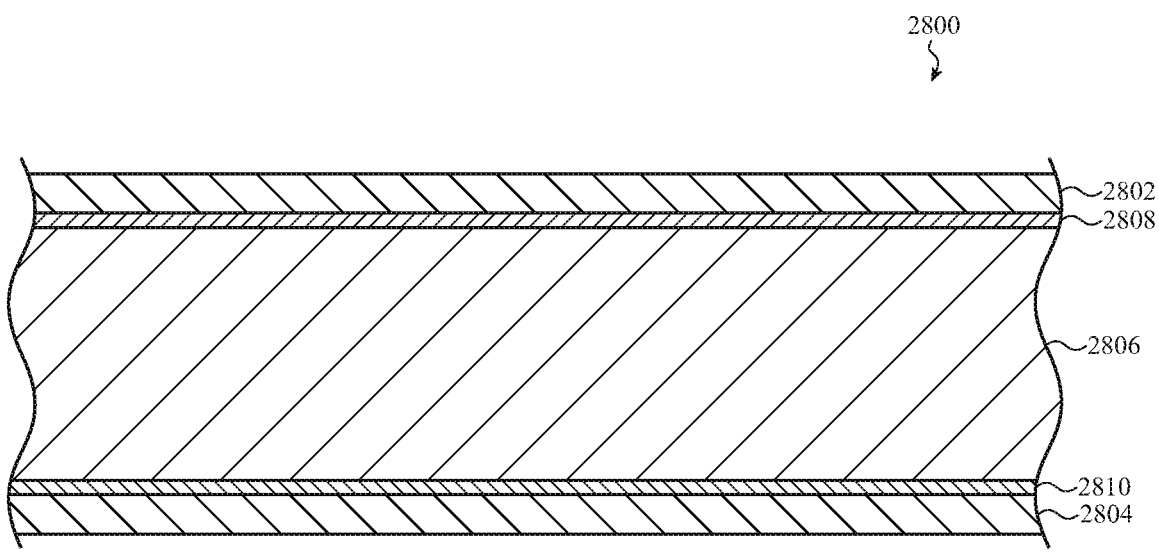
FIG. 28C shows a cross-sectional view of an alternative unitary glass article in accordance with an embodiment herein.

In alternative embodiments, a first barrier layer 2808 can be positioned between the top glass sheet 2802 and middle glass sheet 2806, and a second barrier layer 2810 can be positioned between the bottom glass sheet 2804 and middle glass sheet 2806 (see FIG. 28C). Any number of glass sheets can be combined to form unitary glass articles, and barrier layers can be positioned between any two layers or between all layers. Barrier layers can partially cover a glass sheet surface, or can be positioned to only provide a barrier to certain areas of the glass sheet surface (corners, periphery, and the like). Unitary glass articles are formed by adding thermoforming heat and pressure to bond the glass sheets together through the barrier layers. The glass and barrier layer materials are bonded into one unitary article using the thermoforming parameters discussed throughout the present disclosure.

Barrier layers in accordance with embodiments herein are composed of materials that either limit or prevent ion diffusion. For example, the barrier layer may comprise one or more materials that limit or prevent diffusion of alkali metal ions. In embodiments, the barrier layer comprises or is composed of silicon nitride (e.g., $Si_3N_4$, $SiN_x$), silicon oxide (e.g., $SiO_2$), zirconium oxide (e.g. $ZrO_2$), boron oxide ($B_2O_3$), or Zr. Embodiments also include barrier layers composed of a mixture of one or more compositions selected from the group consisting of a silicon nitride, a silicon oxide, a zirconium oxide, a boron oxide, and zirconium. Barrier layers composed of silicon nitride prevent or substantially prevent ion diffusion, while barrier layers composed of silicon oxide, for example, limit, but do not completely prevent ion diffusion. In addition to the composition, barrier layers can be coated or layered on the glass surfaces from a thickness of less than one micron, between 5 nm to 200 nm, and more typically 10 nm to 100 nm, and most typically 20 nm to 30 nm. In embodiments, barrier layers having a thickness less than one micrometer can be applied to a glass layer using chemical vapor deposition or chemical vapor deposition. As can be envisioned, thicker coats of barrier material may be applied to a glass surface, as long as it performs for its intended purposes.

Referring to FIG. 28B again, a barrier layer 2808 can be opaque, transparent or semi-transparent. Opaque and semi-transparent barrier layers, which in some embodiments are positioned between a top glass sheet 2802 and a middle glass sheet 2806, can be utilized to form a visible indicator (e.g., logo, symbol, graphic, pattern, and so on). For example, barrier layer 2808 may include a pattern of black ink, or other appropriate colorant, to form the indicator within the barrier composition. Visible indicators in the barrier layer may not substantially adversely affect the barrier properties, but rather can provide an aesthetically pleasing and/or functional indicator. Colorant used in opaque barrier layers typically does not diffuse out of the barrier layer and thus can sharply contrast with the rest of the barrier layer, particularly if the barrier layer is transparent or translucent. It should be appreciated that the entire barrier layer may be used to form the indicator or the indicator may be formed on a portion of the barrier layer. Further, the barrier layer may be colored to form the indicator with any suitable colorant, including metals, ceramics, inks, powders, vapor deposits, and so on.

Barrier layers also may be applied uniformly between two glass sheets so as to cover the entire surfaces of the two sheets, or may be strategically positioned between two glass sheets such that only certain portions of the two opposing glass sheets are separated by the barrier layer. Where a barrier layer is positioned between two opposing glass sheets, the layer acts to limit or prevent material property diffusion. Where the barrier layer is not present, ions or other material may diffuse, under applied pressure and/or heat, between the opposing glass sheets. In some embodiments, the barrier layer is positioned or coated in distinct regions, such as, for example, corners of a glass article or the corners of a cover glass for use in an electronic device. In other aspects, the barrier layer is only positioned or coated along the edges of a glass article, for example, along the edges of a cover glass for use in an electronic device.

Once the glass sheets and barrier layers are positioned, each glass sheet is heated and pressure applied (e.g., thermoformed) as described herein. Thermoforming and cooling, as described elsewhere herein, yield the resultant unitary glass article. Each glass sheet may form a glass layer in the unitary glass article. It should be appreciated that the heating and pressure operations of thermoforming may be applied as separate operations or at the same time, or one may overlap the other.

In embodiments, the glass sheets for inclusion in the unitary glass article can include: a first or top glass sheet of about 50 μm to 150 μm in thickness, a second or middle glass sheet of about 400 μm to 800 μm in thickness, and a third or bottom glass sheet of about 50 μm to 150 μm. A barrier layer is interposed between the top glass sheet and middle glass sheet and between the middle glass sheet and bottom glass sheet. In additional embodiments, the glass sheets can include: a first or top glass sheet of about 10 μm to 150 μm in thickness, a second or middle glass sheet of about 200 μm to 800 μm in thickness, and a third or bottom glass sheet of about 10 μm to 150 μm in thickness. A barrier layer is interposed between the top glass sheet and middle glass sheet and between the middle glass sheet and bottom glass sheet. These example sheet thicknesses given herein may be useful for at least the glass articles shown in FIGS. 29A-33.

In further embodiments, a unitary glass article includes: a first or top glass layer of about 10 μm to 150 μm in thickness, a second or middle glass layer of about 200 μm to 800 μm in thickness, and a third or bottom glass layer of about 10 μm to 150 μm in thickness. Finally, embodiments include a unitary glass article having a first or top glass layer of about 100 μm in thickness, a second or middle glass layer of about 600 μm in thickness, and a third or bottom glass layer of about 100 μm in thickness. These example glass layer thicknesses given herein may be useful for at least the glass articles shown in FIGS. 29A-33.

Figure 29:
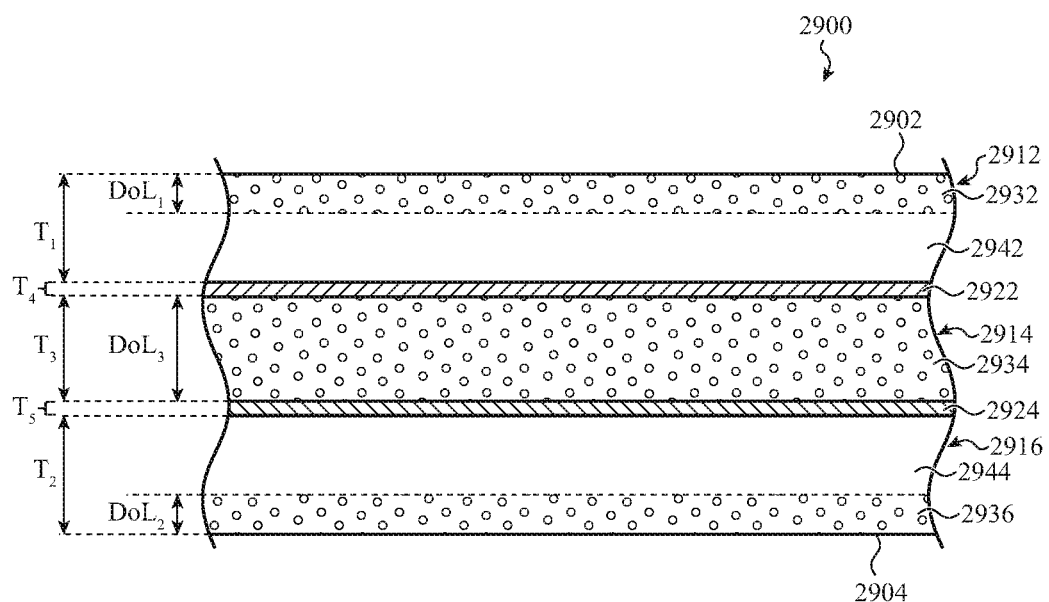
FIG. 29 shows a partial cross-sectional view of an example unitary glass article including an internal compressive stress region bounded by barrier layers.

FIG. 29 shows an example of a unitary glass article 2900 that incorporates first and second barrier layers between three layers of glass. The glass article 2900 includes internal compressive stress region 2934, as well as compressive stress region 2932 extending inward from outer surface 2902 and a compressive stress region 2936 extending inward from inner surface 2904 of the glass article 2900. As previously discussed, the glass article 2900 may be a cover member. In FIG. 29, compressive stress regions are indicated by stippling, alone or in combination with a dashed line. The stippling and dashed lines are not intended to illustrate any particular material, ion density, or quality other than depth of layer. In embodiments, a stress region or layer which extends inward extends towards a thickness midpoint of the glass article.

As shown in FIG. 29, the glass article 2900 includes a first glass layer 2912, a second glass layer 2916, and a third glass layer 2914. The first glass layer 2912 is separated from the third glass layer 2914 by a first barrier layer 2922. The third glass layer 2914 is separated from the second glass layer 2916 by a second barrier layer 2924. The first glass layer is contiguous with outer surface 2902 and the second glass layer 2916 is contiguous with inner surface 2904. First glass layer 2912 has thickness $T_1$, second glass layer 2916 has thickness $T_2$, third glass layer 2914 has thickness $T_3$, first barrier layer 2922 has thickness $T_4$, and second barrier layer 2924 has thickness $T_5$. Typically, the thickness of the glass article 2900 is the sum of thicknesses $T_1$ through $T_5$.

In embodiments, the glass article 2900 of FIG. 29 is formed, in part, by thermoforming together a first glass sheet, a second glass sheet, and a third glass sheet, with the first barrier layer 2922 positioned between the first glass sheet and the third glass sheet and the second barrier layer 2924 positioned between the second glass sheet and the third glass sheet. The first glass sheet forms the first glass layer 2912, the second glass sheet forms the second glass layer 2916, and the third glass sheet forms the third glass layer 2914. The composition and/or properties of the glasses of first glass sheet, the second glass sheet, and the third glass sheet may be the same or may be different. For glass articles made through a combination of thermoforming and ion exchange, first glass of the glass article may be based on the glass of the first glass sheet, the second glass may be based on the glass of the second glass sheet, and so forth.

In embodiments, the second glass sheet is ion exchanged prior to thermoforming in order to introduce compressive stress into the second glass sheet. As an example, the second glass sheet may comprise first alkali metal ions prior to the ion exchange operation and the ion exchange operation may introduce second alkali metal ions, larger than the first alkali metal ions, into the second glass sheet. The ion exchange operation may occur below a strain point of the glass or below a temperature at which substantial relaxation of the glass network occurs.

The first and second barrier layers 2922, 2924 limit or prevent diffusion of the second alkali metal ions from the third glass layer into the first glass layer and the second glass layer. As a result, the third glass layer of the glass article includes internal compressive stress region 2934 after thermoforming. In some embodiments, the diffusion coefficient for the second alkali metal ions through the first barrier layer 2922 is low relative to the diffusion coefficient for the second alkali metal ions through the second glass. Similarly, in embodiments the diffusion coefficient for the second alkali metal ions through the second barrier layer 2924 is low relative to the diffusion coefficient for the second alkali metal ions through the second glass. Therefore, second alkali metal ions in compressive stress regions of the second glass sheet may preferentially diffuse toward the center of the third glass layer during thermoforming, producing a more even distribution of second alkali metal ions and compressive stress in the third glass layer. For example, the compressive stress region 2934 in the third glass layer may span a thickness of third glass layer after thermoforming. The ion exchanged regions of the third glass sheet need not span the thickness of the glass sheet prior to thermoforming. In some embodiments, any relaxation of the glass network structure in the second glass layer during the thermoforming process is small enough that compressive stress due to the introduction of the second alkali metal ions into the glass network is present in the second glass layer after thermoforming.

The glass article of FIG. 29 further includes a compressive stress region 2932 extending inward from an outer surface 2902 and a compressive stress region 2936 extending inward from an inner surface 2904 the glass article. Compressive stress region 2932 may be referred to as a first surface compressive stress region and compressive stress region 2936 may be referred to as a second surface compressive stress region. In embodiments, compressive stress region 2932 and compressive stress region 2936 may be formed by an ion exchange process following thermoforming. After thermoforming, the first glass layer and the second glass layer of the glass article may comprise alkali metal ions, such the first alkali metal ions. As previously described, when the glass article is immersed in a bath comprising the second alkali metal ions or third alkali metal ions larger than the first alkali metal ions, the larger alkali metal ions may exchange for the smaller alkali metal ions in the glass, creating one or more regions of compressive stress. In additional embodiments, compressive stress region 2932 and compressive stress region 2936 may be formed by an ion exchange process during thermoforming. As previously described, surfaces of the first and the second glass layers may be exposed to a source of alkali metal ions within the thermoforming mold. Compressive stress region 2932 has a depth of layer $DoL_1$ and compressive stress region 2936 has a depth of layer $DoL_2$. In embodiments, $DoL_1$ is equal to or greater than $DoL_2$. The depth of ion exchange may be limited by various parameters as described herein, including materials properties of the second glass and/or the time allowed for ion exchange.

As shown in FIG. 29, glass article 2900 further includes tensile stress regions 2942, 2944. Tensile stress region 2942 is created in first glass layer 2912 and tensile stress region 2944 is created in second glass layer 2916 to balance compressive stresses in the glass article. In embodiments, a profile of stress across a thickness of the glass article shows an abrupt transition (e.g., a step transition or step change) between compressive stress and tensile stress at the position of the barrier layers 2922, 2924.

Figure 30A:
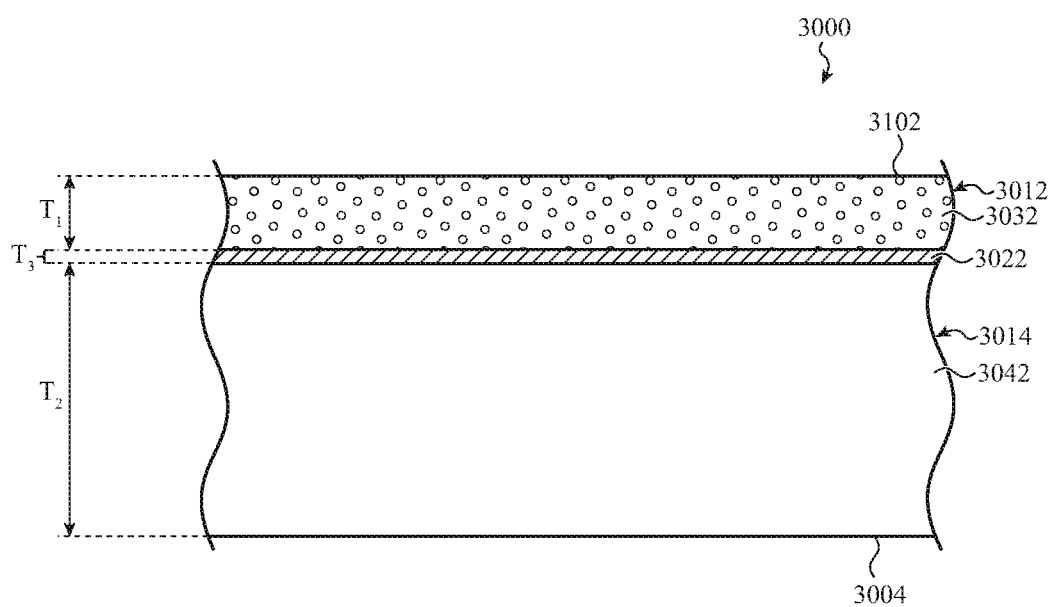
FIG. 30A shows a partial cross-sectional view of an example unitary glass article including a compressive stress region bounded by a barrier layer.

FIG. 30A shows an example of a unitary glass article 3000 that incorporates a barrier layer 3022 between two sheets of glass. The glass article 3000 includes a compressive stress region 3032 extending inward from an outer surface 3002 of the glass article to the barrier layer 3022. As previously discussed, the glass article 3000 may be a cover member. In FIG. 30A, the compressive stress region 3032 is indicated by stippling; the stippling is not intended to illustrate any particular material or ion density.

As shown in FIG. 30A, the glass article 3000 includes a first glass layer 3012 and a second glass layer 3014. The first glass layer 3012 comprises a first glass and the second glass layer 3014 comprises a second glass; the first glass layer 3012 is separated from the second glass layer 3014 by a barrier layer 3022. The first glass layer 3012 is contiguous with the outer surface 3002 and the second glass layer 3014 is contiguous with the inner surface 3004. First glass layer 3012 has thickness $T_1$, second glass layer 3014 has thickness $T_2$, and barrier layer 3022 has thickness $T_3$. Typically, the thickness of the glass article is the sum of thicknesses $T_1$ through $T_3$.

In embodiments, the glass article of FIG. 30A is formed, in part, by thermoforming together a first glass sheet and a second glass sheet with barrier layer 3022 positioned between the first glass sheet and the second glass sheet. The first glass sheet forms the first glass layer 3012 and the second glass sheet forms the second glass layer 3014. The composition and/or properties of the glasses of first glass sheet and the second glass sheet may be the same or may be different.

In embodiments, the first glass in the first glass layer 3012 is ion exchanged after thermoforming in order to introduce compressive stress into the first glass layer. As an example, the first glass layer of the glass article may comprise first alkali metal ions after thermoforming. As previously described, when the glass article is immersed in a bath comprising second alkali metal ions larger than the first alkali metal ions, the larger alkali metal ions may exchange for the smaller alkali metal ions in the glass, creating one or more regions of compressive stress. As a result, the first glass layer 3012 of the glass article includes an compressive stress region extending inward from the outer surface 3002. In embodiments, the compressive stress region 3032 in the first glass layer may span a thickness $T_1$ of first glass layer 3012.

The barrier layer 3022 limits or prevents diffusion of the second alkali metal ions from the first glass layer into the second glass layer. In some embodiments, the diffusion coefficient for the second alkali metal ions through the first barrier layer 3022 is low relative to the diffusion coefficient for the second alkali metal ions through the first glass. Therefore, the concentration of the second alkali metals ions at the interface between the first glass layer and the second glass layer may be larger than if no barrier layer were present. As a result, a more uniform distribution of the second alkali metal ions and compressive stress may be formed in the first glass layer when a barrier layer is present.

As shown in FIG. 30A, glass article 3000 further includes tensile stress region 3042 in second glass layer 3014 which balances compressive stresses in the glass article. In embodiments, a profile of stress across a thickness of the glass article shows an abrupt transition (e.g., a step transition or step change) between compressive stress and tensile stress at the position at barrier layer 3022.

Figure 30B:
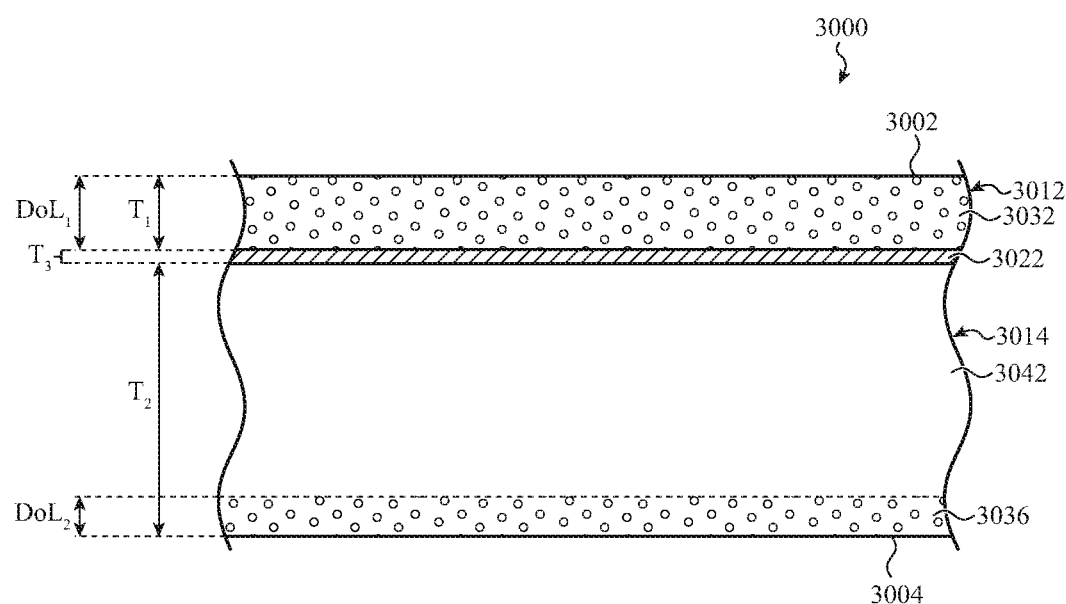
FIG. 30B shows a partial cross-sectional view of an additional example unitary glass article including a compressive stress region bounded by a barrier layer.

FIG. 30B shows another example of a unitary glass article 3000 that incorporates a barrier layer between two sheets of glass. The glass article 3000 includes a compressive stress region 3032 extending inward from an outer surface 3002 and a compressive stress region 3036 extending inward from an inner surface 3004 of the glass article. Compressive stress region 3032 may be referred to as a first surface compressive stress region and compressive stress region 3036 may be referred to as a second surface compressive stress region. As previously discussed, the glass article 3000 may be a cover member. In FIG. 30B, compressive stress regions are indicated by stippling, alone or in combination with a dashed line, both of which are not intended to illustrate any particular material, ion density, or quality other than depth of layer.

As shown in FIG. 30B, the glass article 3000 includes a first glass layer 3012 and a second glass layer 3014. The first glass layer 3012 comprises a first glass and the second glass layer 3014 comprises a second glass; the first glass layer 3012 is separated from the second glass layer 3014 by a barrier layer 3022. The first glass layer is contiguous with the outer surface 3002 and the second glass layer is contiguous with the inner surface 3004. First glass layer 3012 has thickness $T_1$, second glass layer 3014 has thickness $T_2$, and barrier layer 3022 has thickness $T_3$. Generally, the thickness of the glass article 3000 is the sum of thicknesses $T_1$ through $T_3$.

In embodiments, the first glass in first glass layer 3012 is ion exchanged after thermoforming in order to introduce compressive stress into the first glass layer, as described for FIG. 30A. Barrier layer 3022 may produce a similar effect as described for FIG. 30A. In additional embodiments, the second glass in the second glass layer 3016 is also ion exchanged after thermoforming to introduce compressive stress into the second glass layer. For example, the first glass may be ion exchanged in a first ion exchange operation, with inner surface 3004 being masked. After the ion exchange operation, the inner surface 3004 may be unmasked prior to ion exchanging the second glass in a second ion exchange operation. The outer surface 3002 may be unmasked or masked during the second ion exchange operation. In some embodiments the inner surface 3004 may be ion exchanged before the outer surface 3002 if it is desired to produce a greater depth of compressive stress region 3034. The first and the second ion exchange operations may be similar to ion exchange operations previously described herein in which smaller alkali metal ions in the glass are exchanged for larger alkali metal ions to create compressive stress. Compressive stress region 3032 has a depth of layer $DoL_1$ and compressive stress region 3036 has a depth of layer $DoL_2$. In embodiments, $DoL_1$ is equal to or greater than $DoL_2$.

As shown in FIG. 30B, glass article 3000 further includes tensile stress region 3042. Tensile stress region 3042 is created in second glass layer 3014 to balance compressive stresses in the glass article and is positioned between compression stress regions 3032 and 3036. In embodiments, a profile of stress across a thickness of the glass article shows an abrupt transition (e.g., a step transition or step change) between compressive stress and tensile stress at the position of the barrier layer 3022.

Figure 31A:
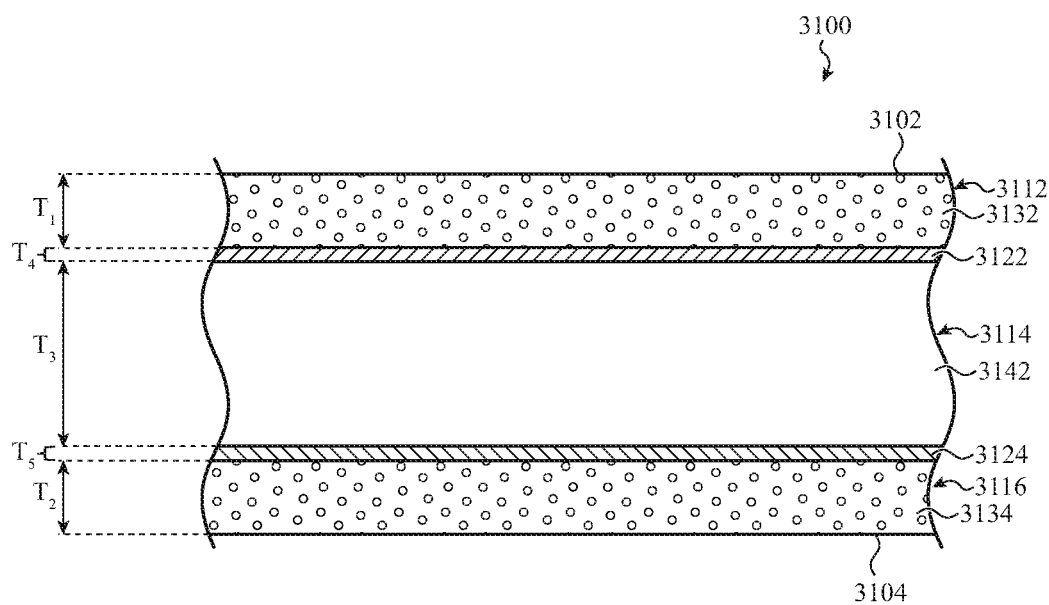
FIG. 31A shows a partial cross-sectional view of an example unitary glass article including two compressive stress regions, each compressive stress region bounded by a barrier layer.

FIG. 31A shows an example of a unitary glass article 3100 that incorporates a first and second barrier layer between three sheets of glass. As shown in FIG. 31A, the glass article 3100 includes a first glass layer 3112, a second glass layer 3116, and a third glass layer 3114. The first glass layer 3112 comprises a first glass, the second glass layer 3116 comprises a second glass, and the third glass layer 3114 comprises a third glass. As previously discussed, the glass article 3100 may be a cover member. In FIG. 31A, compressive stress regions are indicated by stippling; the stippling is not intended to illustrate any particular material or ion density.

The first glass layer 3112 is separated from the third glass layer 3114 by a first barrier layer 3122. The second glass layer 3116 is separated from the third glass layer 3114 by a second barrier layer 3124. The first glass layer is contiguous with the outer surface 3102 and the second glass layer is contiguous with the inner surface 3104. First glass layer 3112 has thickness $T_1$, second glass layer 3116 has thickness $T_2$, third glass layer 3114 has thickness $T_3$, first barrier layer 3122 has thickness $T_4$, and second barrier layer 3124 has thickness $T_5$. Typically, the thickness of the glass article 3100 is the sum of thicknesses $T_1$ through $T_5$. In FIG. 31A, the thickness $T_1$ of the first glass layer 3112 and the thickness $T_2$ of the second glass layer 3116 are shown as substantially equal. However, this is not limiting and in embodiments, the thickness $T_1$ of the first glass layer 3112 may be greater than or equal to that of the second glass layer 3116.

In embodiments, the glass article 3100 of FIG. 31A is formed, in part, by thermoforming together a first glass sheet, a second glass sheet, and a third glass sheet, with the first barrier layer 3122 positioned between the first glass sheet and the second glass sheet and the second barrier layer 3124 positioned between the second glass sheet and the third glass sheet. The first glass sheet forms the first glass layer 3112, the second glass sheet forms the second glass layer 3116, and the third glass sheet forms the third glass layer 3114. The composition and/or properties of the glasses of first glass sheet, the second glass sheet, and the third glass sheet may be the same or may be different.

In embodiments, the first glass in first glass layer 3112 is ion exchanged after thermoforming in order to introduce compressive stress into the first glass layer, as described for FIG. 30A. Barrier layer 3122 may produce a similar effect as described for FIG. 30A. In embodiments, the second glass in second glass layer 3116 is also ion exchanged after thermoforming in order to introduce compressive stress into the second glass layer, in a similar fashion as described for FIG. 30A. For example, the first glass may be ion exchanged in a first ion exchange operation and the third glass may be ion exchanged in a second ion exchange operation. The first ion and second ion operations may occur simultaneously or sequentially (with or without masking). Compressive stress region 3132 has a depth of layer $DoL_1$ and compressive stress region 3134 has a depth of layer $DoL_2$. In embodiments, $DoL_1$ is equal to or greater than $DoL_2$. Compressive stress region 3132 may be referred to as a first surface compressive stress region and compressive stress region 3134 may be referred to as a second surface compressive stress region.

As shown in FIG. 31A, glass article 3100 further includes tensile stress region 3142. Tensile stress region 3142 is created in third glass layer 3114 to balance compressive stresses in the glass article. In embodiments, a profile of stress across a thickness of the glass article shows an abrupt transition (e.g., a step transition or step change) between compressive stress and tensile stress at the position of the barrier layers 3122, 3124.

Figure 31B:
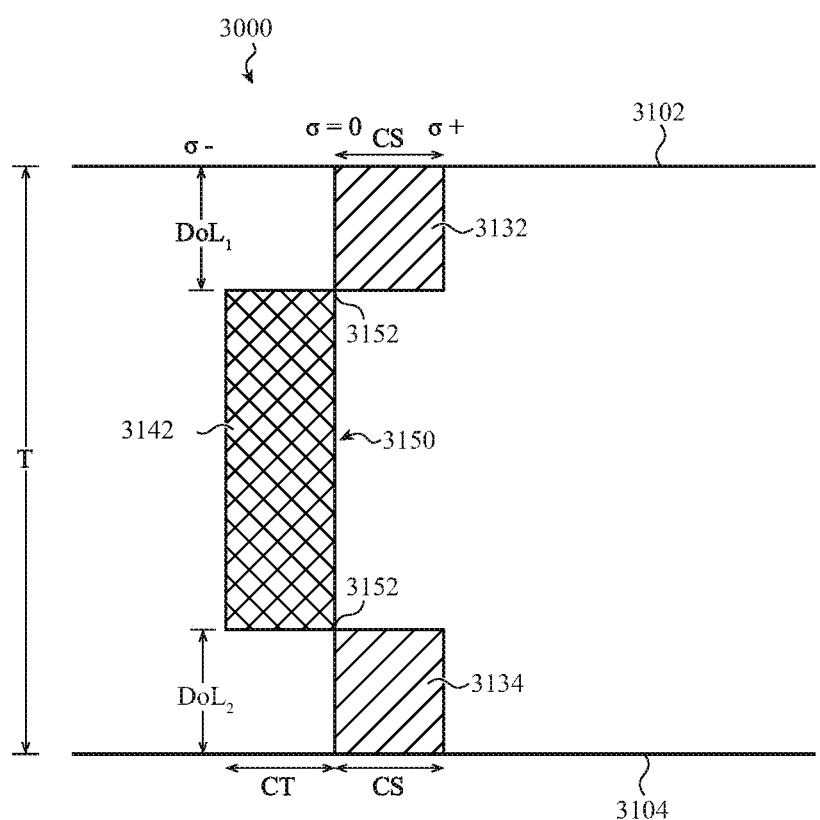
FIG. 31B shows a stress profile for a stepwise strengthened glass article.

FIG. 31B shows an example of stress profile 3150 across a thickness of a unitary glass article 3100 that incorporates a first and second barrier layer between three sheets of glass. In FIG. 31B, thickness (T) of the glass article is shown. The compressive surface stress (CS) of the stepwise unitary glass article is shown at the surfaces 3102, 3104 of the glass article. The compressive stress regions 3132, 3134 for the glass article each have a depth $DoL_1$, $DoL_2$ that extends from the surfaces of the unitary article. As shown in FIG. 31B, $DoL_1$ is substantially equal to $DoL_2$. The tensile stress region 3142 with initial central tension (CT) is in the third glass layer, which would correspond to the third or middle sheet of glass. Note that the stress profile for the unitary glass article has a sharp peak boundary caused by the controlled or stepwise chemical strengthening of the unitary glass article. The barrier layer confines the compressive stress to the first glass layer and second glass layer (corresponding to the first or top sheet and the second or bottom sheet) and forms compression to the depth of compression in the first glass layer and the second glass layer. The compressive stress shows a dramatic stepdown (3152) as the barrier layer prevents compressive stress from extending into the third glass layer. The profile for the tensile stress extends, also stepwise, into the third glass layer in the cross-sectional view of the unitary glass article.

Figure 32A:
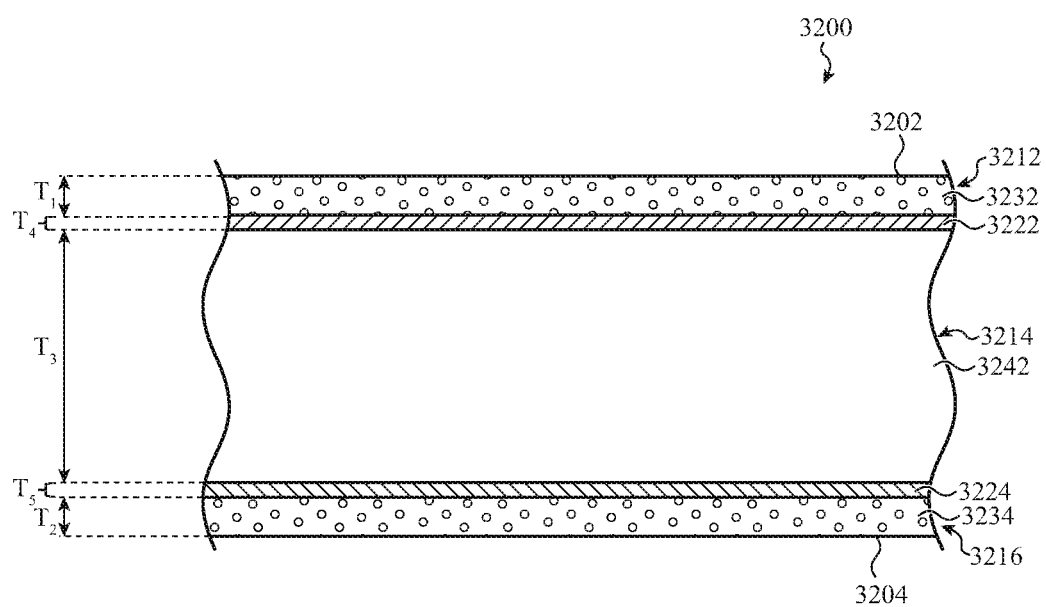
FIG. 32A shows a partial cross-sectional view of an additional example including two compressive stress regions, each compressive stress region bounded by a barrier layer.

FIG. 32A shows another example glass article 3200 that incorporates a first and second barrier layer between three sheets of glass. As previously discussed, the glass article 3200 may be a cover member. In FIG. 32A, compressive stress regions are indicated by stippling; the stippling is not intended to illustrate any particular material or ion density.

As shown in FIG. 32A, the glass article 3200 includes a first glass layer 3212, a second glass layer 3216, and a third glass layer 3214. The first glass layer 3212 is separated from the third glass layer 3214 by a first barrier layer 3222. The second glass layer 3216 is separated from the third glass layer 3214 by a second barrier layer 3224. The first glass layer is contiguous with the outer surface 3202 and the second glass layer is contiguous with the inner surface 3204. First glass layer 3212 has thickness $T_1$, second glass layer 3216 has thickness $T_2$, third glass layer 3214 has thickness $T_3$, first barrier layer 3222 has thickness $T_4$, and second barrier layer 3224 has thickness $T_5$. Generally, the thickness of the glass article 3000 is the sum of thicknesses $T_1$ through $T_5$. As compared to glass article 3100 of FIG. 31A, thicknesses $T_1$ and $T_2$ are smaller relative to thickness $T_3$.

In embodiments, the glass article of FIG. 32A is formed, in part, by thermoforming together a first glass sheet, a second glass sheet, and a third glass sheet, with the first barrier layer 3222 positioned between the first glass sheet and the third glass sheet and the second barrier layer 3224 positioned between the second glass sheet and the third glass sheet. The first glass sheet forms the first glass layer 3212, the second glass sheet forms the second glass layer 3216, and the third glass sheet forms the third glass layer 3214. The composition and/or properties of the glasses of first glass sheet, the second glass sheet, and the third glass sheet may be the same or may be different.

In embodiments, the first glass in first glass layer 3212 is ion exchanged after thermoforming in order to introduce compressive stress into the first glass layer, as described for FIGS. 30A and 31A. Barrier layer 3222 may produce a similar effect as described for FIG. 30A. In embodiments, the second glass in second glass layer 3216 is also ion exchanged after thermoforming in order to introduce compressive stress into the second glass layer, in a similar fashion as described for FIGS. 30A and 31A. Compressive stress region 3232 has a depth of layer $DoL_1$ and compressive stress region 3234 has a depth of layer $DoL_2$. In embodiments, $DoL_1$ is equal to or greater than $DoL_2$. Compressive stress region 3232 may be referred to as a first surface compressive stress region and compressive stress region 3234 may be referred to as a second surface compressive stress region.

As shown in FIG. 32A, glass article 3200 further includes tensile stress region 3242. Tensile stress region 3242 is created in third glass layer 3214 to balance compressive stresses in the glass article. In embodiments, a profile of stress across a thickness of the glass article shows an abrupt transition (e.g., a step transition or a step change) between compressive stress and tensile stress at the position of the barrier layers 3222, 3224.

Figure 32B:
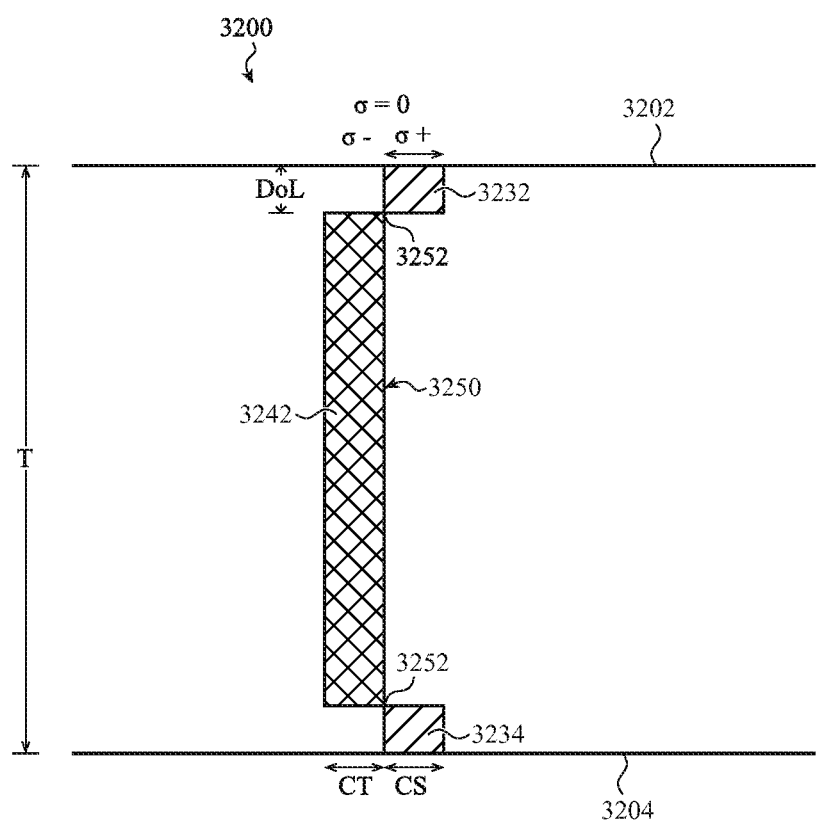
FIG. 32B shows a stress profile for a stepwise strengthened glass article.

FIG. 32B shows an example of a stress profile 3250 for a unitary glass article 3200 that incorporates a first and second barrier layer between three sheets of glass. As discussed in FIG. 32B, the stress profile 3250 includes a sharp transition 3252 between compressive stress regions 3232, 3234 and tensile stress region 3242. Here the depth of the compression (DoL) is lower than in FIG. 31B. The central tension (CT) is also less. The compressive surface stress (CS) of the stepwise unitary glass article is shown at the surface 3204 of the glass article as well as the thickness (T) of the glass article. The embodiments herein allow for any number of different stepwise stress profiles, where the compressive stress can be maximized against tensile stress and thereby provide for maximum protection against crack propagation.

Embodiments herein also include application of adhesives between any two glass sheets or between a glass sheet and a barrier layer to further ensure proper integration of the glass sheets into a unitary glass article. Addition of an adhesive between glass sheets or glass sheets and barrier layers also has the benefit of further adsorbing energy of an impact and limiting crack propagation.

For example, an adhesive is also positioned between the glass sheets and barrier layers prior to thermoforming to further result in a unitary glass article with chemically strengthened glass layers based on the original glass sheets. The adhesive material and the thermoforming conditions are adjusted to avoid undue degradation of the adhesive material.

Figure 33:
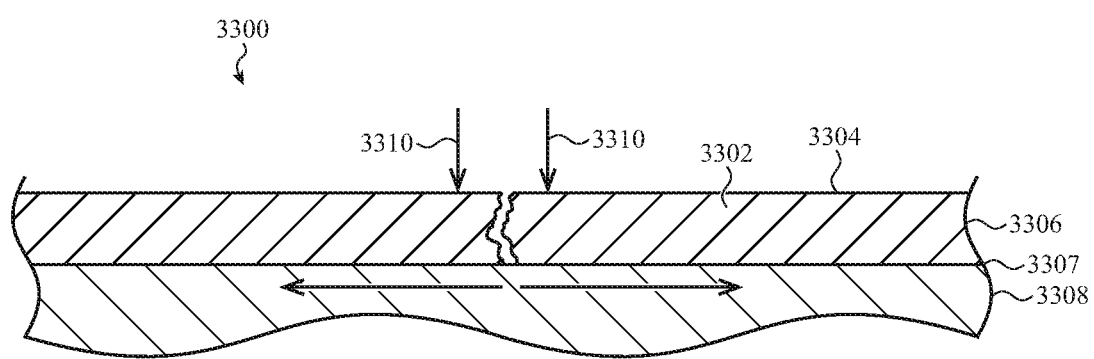
FIG. 33 shows an illustrative crack propagation into a unitary glass article in accordance with an embodiment herein.

FIG. 33 shows a schematic cross-sectional view of a unitary glass article 3300 having a first glass layer 3302 with a top surface 3304 and a barrier layer 3306 positioned between the first glass layer 3302 and the third or middle glass layer 3308 of the glass article 3300. The second or bottom glass layer is not shown in this Figure. A layer of adhesive 3307 is used to adhere the barrier layer and first and third glass layers together upon thermoforming. Upon impact, shown as arrow 3310, a crack forms through the first glass layer, but is turned or pushed along the adhesive layer 3307 and barrier layer 3308 as the force is dissipating. The barrier layer and adhesive layer combination in this embodiment, prevent the crack from moving deeper across the unitary glass article. In some aspects, the two layers could actually be designed to delaminate and prevent the crack from propagating further into the glass. Note that internal compressive stress layers can be designed into the third glass layer to further limit crack propagation.

As discussed throughout, a glass sheet can be chemically strengthened to increase a top and/or bottom compression layer, or can be modified to form internal compression layers within the glass. In either case, the glass sheet is subject to chemical strengthening to move ions through the glass matrix and form areas of compression, i.e., ion diffusion or exchange.

As can be imagined, embodiments herein can be combined to form complete or portions of desired unitary glass cover members for a handheld electronic device. For example, unitary glass cover members formed from two dissimilar glass sheets can have one of the glass sheet surfaces modified with a property-enhancing material during the thermoforming process, the same process that joins the two sheets and contours the cover sheet. For example, a cover sheet formed from two materials having dissimilar CTE could further include a hard ceramic powder embedded in the upper sheet having the lower CTE. A cover sheet formed from two materials having dissimilar elastic properties could further include a localized strengthening in the surface of the glass sheet having a higher Young's modulus. Cladding layers may be required, either internally between two dissimilar glass sheets or externally, to fill in defects on any surface of a glass sheet. Any useful combination can be utilized to maximize the glass article's utility. Also, all embodiments described herein may be further treated via chemical strengthening baths, annealing or other glass modifying techniques. The many options created in the embodiments herein provide for design and formation of a significant number of useful glass articles, particularly in the electronics industry, where the cover sheets require well suited properties for a particular use.

As used herein, the terms "about", "approximately," and "substantially equal to" are used to account for relatively small variations, such as a variation of +/−10%, +/−5%, or +/−2%.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A cover member for an electronic device, comprising:
   a first glass layer defining an outer surface of the cover member and including a first compressive stress region extending from the outer surface, the first compressive stress region comprising a first set of alkali metal ions;
   a second glass layer defining an inner surface of the cover member and including a second compressive stress region extending from the inner surface, the second compressive stress region comprising a second set of alkali metal ions;
   a tensile stress region between the first compressive stress region and the second compressive stress region; and
   a barrier layer between the first glass layer and the tensile stress region and configured to impede diffusion of the first set of alkali metal ions into the tensile stress region.

2. The cover member of claim 1, wherein:
   the first glass layer has a first thickness;
   the first compressive stress region has a first depth substantially equal to the first thickness;

the second glass layer has a second thickness and includes the tensile stress region; and the second compressive stress region has a second depth less than the second thickness.

3. The cover member of claim 2, wherein a stress profile across a thickness of the cover member comprises a step change at the barrier layer.

4. The cover member of claim 2, wherein:
the barrier layer has a thickness less than one micrometer; and
the barrier layer comprises a material selected from aluminum nitride, silicon dioxide, zirconium oxide, and boron oxide.

5. The cover member of claim 2, wherein:
the first set of alkali metal ions defines a first concentration of alkali metal ions;
the second set of alkali metal ions defines a second concentration of alkali metal ions; and
the first concentration is greater than the second concentration.

6. The cover member of claim 1, wherein:
the cover member further comprises a third glass layer positioned between the barrier layer and the second glass layer; and
the third glass layer includes the tensile stress region.

7. The cover member of claim 6, wherein:
the barrier layer is a first barrier layer; and
the cover member further comprises a second barrier layer positioned between the second glass layer and the third glass layer and configured to impede diffusion of the second set of alkali metal ions into the tensile stress region.

8. The cover member of claim 7, wherein:
each of the first glass layer and the second glass layer has a thickness from about 10 μm to 150 μm; and
the third glass layer has a thickness from about 100 μm to about 800 μm.

9. An electronic device comprising:
a display; and
a cover positioned over the display, the cover including a cover member comprising:
a first glass layer defining an outer surface of the cover member and including a first compressive stress region extending from the outer surface and comprising a first set of alkali metal ions;
a second glass layer defining an inner surface of the cover member, including a second compressive stress region extending from the inner surface and comprising a second set of alkali metal ions;
a tensile stress region between the first compressive stress region and the second compressive stress region; and
a barrier layer between the first glass layer and the tensile stress region and configured to impede diffusion of the first set of alkali metal ions into the tensile stress region.

10. The electronic device of claim 9, wherein the first compressive stress region extends to the barrier layer.

11. The electronic device of claim 10, wherein the barrier layer is transparent.

12. The electronic device of claim 11, wherein the barrier layer comprises silicon dioxide.

13. The electronic device of claim 9, wherein the barrier layer extends along an entirety of an interface between the first glass layer and the second glass layer.

14. The electronic device of claim 9, wherein the first glass layer has a different ion diffusion property than the second glass layer.

* * * * *